(12) United States Patent
de Pinto et al.

(10) Patent No.: US 7,080,117 B2
(45) Date of Patent: Jul. 18, 2006

(54) SYSTEM AND METHOD FOR EXCHANGING CREATIVE CONTENT

(75) Inventors: Robert de Pinto, Bondi (AU); Caskey L. Dickson, Stevenson Ranch, CA (US)

(73) Assignee: Robert dePinto, Potts Point (AU)

( * ) Notice: Subject to any disclaimer, the term of this patent is extended or adjusted under 35 U.S.C. 154(b) by 917 days.

(21) Appl. No.: 09/987,690

(22) Filed: Nov. 15, 2001

(65) Prior Publication Data

US 2002/0194112 A1   Dec. 19, 2002

Related U.S. Application Data

(60) Provisional application No. 60/249,286, filed on Nov. 17, 2000.

(51) Int. Cl.
    *G06F 13/00*    (2006.01)
    *G06F 17/60*    (2006.01)
(52) U.S. Cl. .......................... 709/203; 705/11
(58) Field of Classification Search ........ 709/200–203, 709/217–224; 705/7–8, 10–11
    See application file for complete search history.

(56) References Cited

U.S. PATENT DOCUMENTS

| | | | | |
|---|---|---|---|---|
| 4,831,526 A | * | 5/1989 | Luchs et al. | 705/4 |
| 5,058,108 A | * | 10/1991 | Mann et al. | 370/409 |
| 6,199,047 B1 | * | 3/2001 | Dimino et al. | 705/10 |
| 6,480,861 B1 | * | 11/2002 | Kanevsky et al. | 707/103 Y |
| 6,539,392 B1 | * | 3/2003 | Rebane | 707/101 |
| 6,574,608 B1 | * | 6/2003 | Dahod et al. | 705/26 |
| 6,810,383 B1 | * | 10/2004 | Loveland | 705/9 |
| 6,826,543 B1 | * | 11/2004 | Harford et al. | 705/37 |
| 6,895,385 B1 | * | 5/2005 | Zacharia et al. | 705/10 |

OTHER PUBLICATIONS

Elance Enterprise—Enterprise Software and Solutions, from URL http://www.elance.com by Elance Inc. (printed on Feb. 12, 2002).
Elance: Graphic Design & Multimedia Marketplace, from URL http://www.elance.com/c/cats/main/categories.pl?catId=10184&type=buyer, by Elance Inc. (printed on Feb. 12, 2002).
Guru/Welcome, from URL http://www.guru.com, by Guru Worldwide, Inc. (printed on Feb. 12, 2002).
Guru/Find a Guru, from URL http://www.guru.com/find/index.jhtml;$sessionid$VMOCJM010OBRFQFIBMHSFEQ, by Guru Worldwide, Inc. (printed on Feb. 12, 2002).
Guru/Get Started, from URL http://www.guru.com/talent/index.

(Continued)

*Primary Examiner*—Moustafa Meky
(74) *Attorney, Agent, or Firm*—Covington & Burling

(57) ABSTRACT

System and method for exchanging intellectual capital. The present invention provides an exchange that matches buyers and sellers of knowledge and ideas. A reputation rating system is provided so that buyers (i.e., clients) can obtain the highest average quality of response at a given price. When a job is posted by a client, it is first shown to the highest rated sellers (members of the exchange). As time passes, lower rated members are shown the job until the quota of responses or the deadline is reached.

70 Claims, 50 Drawing Sheets

OTHER PUBLICATIONS jhtml;$sessionid$VMOCJM010OBRFQFIBMHSFEQ, by Guru Worldwide, Inc. (printed on Feb. 12, 2002).

HelloBrain—Complex Process Collaboration Solutions, from URL http://www.hellobrain.com, by HelloBrain Corporation (printed on Feb. 12, 2002).

HelloBrain—Services, from URL http://www.hellobrain.com/corporate/services/default.asp, by HelloBrain Corporation (printed on Feb. 12, 2002).

HelloBrain—Platform, from URL http://www.hellobrain.com/corporate/platform/default.asp, by HelloBrain Corporation (printed on Feb. 12, 2002).

HelloBrain—Solutions, from URL http://www.hellobrain.com/corporate/solutions/default.asp, by HelloBrain Corporation (printed on Feb. 12, 2002).

Instant Work, from URL http://www.instantwork.com, by InstantWork/Presenceworks (printed on Feb. 12, 2002).

InstantWork—Find Workers, from URL http://www.instantwork.com/search, by InstantWork (printed on Feb. 12, 2002).

Monster—Never Settle—provided by Monster, from URL http://www.monster.com/, by Monster.com (printed on Feb. 12, 2002).

Monster—Search Jobs, from URL http://jobsearch.monster.com/, by Monster.com/ (printed on Feb. 12, 2002).

* cited by examiner

MEMBER / HOME ← 100

WELCOME!

WHAT WOULD YOU LIKE TO DO TODAY?

<u>CONFIGURE / REVIEW YOUR PROFILE</u> ← 110
<u>SHOP ON VCN</u> ← 120
<u>CHECK OUT SOME NEW JOBS</u> ← 130
<u>SEE YOUR NOTEPAD AND NOTES</u> ← 140
<u>LOGOUT</u> ← 150

REVIEW/SELECT JOBS:

- 📂 PROBLEMS ← 160
  - 📁 A PROB
  - 📁 B PROB
  - 📂 C PROB
    - 📁 C PROB 1
    - 📁 C PROB 2
    - 📂 C PROB 3
      - 📁 C PROB 3A
      - 📁 C PROB 3B
      - 📂 C PROB 3C
        - <u>FCB CREATIVE BRIEF</u> (JOB NUMBER: 0707) — 162
        - <u>XYZ CREATIVE BRIEF</u> (JOB NUMBER: 7070) — 162
        - <u>BIG BAD BBQ'S</u> (JOB NUMBER: 3987) — 162
        - 
        - <u>PETS ON LINE</u> (JOB NUMBER: 1788) — 162
      - 📁 C PROB 3D
      - 📁 C PROB 3E
      - 📁 C PROB 3F
    - 📁 C PROB 4
    - 📁 C PROB 5
    - 📁 C PROB 6
  - 📁 D PROB
  - 📁 E PROB
  - 📂 F PROB
    - 📁 F PROB 1
    - 📁 F PROB 2
    - 📁 F PROB 3
    - 📁 F PROB 4
    - 📁 F PROB 5
    - 📁 F PROB 6

*FIG. 1*

MEMBER / PROFILE                                              ← 200

WELCOME KAISER, THIS IS YOUR PROFILE:

PERSONAL: ← 210

KAISER SOZE
    1234 MYAN STREET
    #124 SF, CA
    945515
    H 415/555-1212
    W 415/555-1212
    SSN# 555-55-5555
    CC# 41289999 9999 9999 (VISA)
    ADDITIONAL IMPORTED INFORMATION FROM ALLIANCE PARTNERS.

CLICK HERE TO MAKE CHANGES

JOBS TAKEN: ← 220

| | |
|---|---|
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |
| XYZ BRIEF: BRAND IMAGE CAMPAIGN | JOB 7070 |

CLICK HERE TO SEE THE JOB DETAILS —— 222

EARNINGS: ← 230

| | |
|---|---|
| TOTAL: | $30,000.00 |
| YEAR TO DATE: | $30,000.00 |
| 3 MONTH: | $18,000.00 |
| 6 MONTH: | $12,000.00 |

REDEEM YOUR MONEY —— 232

TEAM MEMBERS: ← 240

DESIGN SPECIALIST "CHARLIE" VCN MEMBER ID: 126042
    COPY SPECIALIST "JASON" VCN MEMBER ID: 536992

CLICK HERE TO ADD OR REMOVE A TEAM MEMBER —— 242

FIG. 2A

REFERAL MEMBERS: ←――― 250

FROM CLIENT 121642
    SENT TO MEMBER 126042             <u>CHANGE SETTINGS</u>

FROM CLIENT 121642
    SENT TO MEMBER 126042             <u>CHANGE SETTINGS</u>

FROM CLIENT 121642
    SENT TO MEMBER 126042             <u>CHANGE SETTINGS</u>

FROM CLIENT 121642
    SENT TO MEMBER 126042             <u>CHANGE SETTINGS</u>

FROM CLIENT 121642
    SENT TO MEMBER 126042             <u>CHANGE SETTINGS</u>

ON CLIENTS FAVORITE LIST: ←――― 260

CLIENT 121642                262 ――― JOBS DETAIL

CLIENT 121642                              JOBS DETAIL

CLIENT 121642                              JOBS DETAIL

CLIENT 121642                              JOBS DETAIL

CLIENT 121642                              JOBS DETAIL

GO TO <u>JOB SELECTOR</u>
GO TO <u>MEMBER HOME</u> ←――― 270
GO TO <u>IDEA NOTEPAD</u>
<u>REDEEM YOUR MONEY</u>
LOGOUT

FIG. 2B

MEMBER / JOB POSTINGS          ─400

REVIEW/SELECT JOBS:

📂 PROBLEMS
    📁 A PROB
    📁 B PROB
    📂 C PROB
        📁 C PROB 1
        📁 C PROB 2
        📂 C PROB 3
            📁 C PROB 3A
            📁 C PROB 3B
            📂 C PROB 3C
                📄 <u>FCB CREATIVE BRIEF</u> (JOB NUMBER: 0707)
                📄 <u>XYZ CREATIVE BRIEF</u> (JOB NUMBER: 7070)
                📄 <u>BIG BAD BBQ'S</u> (JOB NUMBER: 3987)
                📄
                📄 <u>PETS ON LINE</u> (JOB NUMBER: 1788)
            📁 C PROB 3D
            📁 C PROB 3E
            📁 C PROB 3F
        📁 C PROB 4
        📁 C PROB 5
        📁 C PROB 6
    📁 D PROB
    📁 E PROB
    📂 F PROB
        📁 F PROB 1
        📁 F PROB 2
        📁 F PROB 3
        📁 F PROB 4
        📁 F PROB 5
        📁 F PROB 6

GO TO <u>MEMBER HOME</u>
GO TO <u>IDEA NOTEPAD</u>
<u>MY PROFILE</u>
<u>LOGOUT</u>

*FIG. 4*

MEMBER / NOTEPAD

NOTES:

- WE NEED A TAG LINE THAT CAN BE WRAPPED AROUND OUR NAME THAT WILL BE GOOD FOR MULTIMEDIA CAMPAIGNS.
- BY CONTINUING ON FROM HERE YOU'VE MADE A COMMITMENT, YOU ARE INDEED PURCHASING THE JOB CAPSULE

NEW NOTES:

[ CLEAR ]  [ UPLOAD ]

GO TO JOB SELECTOR
GO TO MEMBER HOME
REDEEM YOUR MONEY
LOGOUT

*FIG. 5*

CLIENT / HOME

WELCOME!

WHAT WOULD YOU LIKE TO DO TODAY?

SUBMIT A NEW JOB ← 610

CHECK ON CURRENT JOBS ← 620

REVIEW YOUR FINANCIAL ACCOUNT ← 630

SEE YOUR FAVORITE MEMBERS ← 640

GO TO YOUR PRIVATE SITE ← 650

REVIEW YOUR HISTORY OF COMPLETED PROJECTS ON VCN ← 660

LOGOUT ← 670

*FIG. 6*

CLIENT / SUBMIT
 PROBLEM DESCRIPTION FORM ← 700

TAG LINE:
[_____] ← 710

FULL DESCRIPTION OF PROBLEM:
[_____] ← 720

UPLOAD FILES NECESSARY FOR SOLUTION:
    FILE: [_____] [BROWSE]
    FILE: [_____] [BROWSE]  ← 730
    FILE: [_____] [BROWSE]

CHOOSE A TEXT FORMAT FOR THE SOLUTION:
    WORD DOCUMENT (.DOC) ☐
    RICH TEXT FILE (.RTF) ☐   ← 740
    PLAIN TEXT (.TXT) ☐
    HARD COPY ☐

CHOOSE AN IMAGE FORMAT FOR THE SOLUTION:
    JPG ☐
    GIF ☐
    PSD ☐   ← 750
    EPS ☐
    AI ☐
    TIF ☐

CHOOSE A SOUND FORMAT FOR THE SOLUTION:
    WAV ☐
    RAM ☐   ← 760
    MP3 ☐

CHOOSE A VIDEO FORMAT FOR THE SOLUTION: ← 770

*FIG. 7A*

```
                    MPG ☐
                    MOV ☐    ─ 770
                     AVI ☐
WHO WOULD YOU LIKE TO SOLVE YOUR PROBLEM?
            ADVERTISING ☐
              MUSICIANS ☐
              ENGINEERS ☐
                ARTISTS ☐    ─ 780
          PROFESSIONALS ☐
                RETIREES ☐
                STUDENTS ☐
              GRADUATES ☐
            NON-SPECIFIC ☐
FURTHER DESCRIBE WHO WOULD YOU LIKE TO SOLVE YOUR PROBLEM:
       GEOGRAPHY: [---DOESN'T MATTER---▼]
              AGE: [---DOESN'T MATTER---▼]
         POSITION: [---DOESN'T MATTER---▼]  ─ 790
       HAIR COLOR: [---DOESN'T MATTER---▼]
CHOOSE YOUR LEVEL OF RESPONSE:
                 EXPERT ☐
                   HIGH ☐
                 MEDIUM ☐    ─ 715
                   BASE ☐
SELECT A FAVORITE MEMBER:
              [---NO PARTICULAR MEMBER---▼]   ─ 725
HOW MANY RESPONSES DO YOU WANT FROM THE SELECTED VCN COMMUNITY?
                  [1 ▼]
                          ─ 735
HOW LONG WOULD YOU LIKE YOUR PROBLEM LISTED?
              WEEKS: [0 ▼]
               DAYS: [0 ▼]   ─ 745
              HOURS: [0 ▼]
                                    ─ 755
HOW LONG DO YOU WANT MEMBERS TO SPEND SOLVING THE PROBLEM?
I.E. WHAT IS THE RESPONSE TIME FROM ACCEPTING THE JOB CAPSULE TO SUBMITTING A SOLUTION?
```

FIG. 7B

DAYS: 0
HOURS: 0  ～ 755
MINUTES: 0

POSTING PRICE:
BASED ON THE CRITERIA YOU HAVE SELECTED THIS JOB WILL BE AN INVESTMENT OF:

$1500    ～ 765

～ 775
[SUBMIT]   [CLEAR] ～ 785

GO TO CLIENT HOME
LOGOUT

FIG. 7C

CLIENT / RECAP     ╱— 776

TAG LINE IS:
MAKING BEER ATTRACTIVE TO WOMEN!

NECESSARY FILES:
XYZPRODUCT.JPG
XYZDETAIL.DOC
XYZMARKET.XLS
CLICK <u>HERE</u> TO UPLOAD ANOTHER FILE.

RESPONSE FORMAT:
A ONE PAGE MSWORD DOCUMENT
THREE JPG IMAGES

SOLVING YOUR PROBLEM WILL BE:
YOUR VIRTUAL TEAM MEMBER: VCN MEMBER ID: 671251
PROFESSIONALS
STUDENTS

YOU WILL BE RECEIVING A "<u>HIGH</u>" LEVEL OF RESPONSE.

YOU WILL ISSUE 50 JOB CAPSULES AND WILL RECEIVE 50 UNIQUE RESPONSES.

YOUR PROBLEM WILL BE REMOVED FROM THE VCN SITE IN ONE WEEK.

YOU HAVE GIVEN EACH SELECTED VCN MEMBER 30 MINUTES TO RESPOND
AND SUBMIT THE SOLUTION

POSTING PRICE:
BASED ON THE CRITERIA YOU HAVE SELECTED THIS JOB WILL BE AN INVESTMENT OF:

$ 1500

╱— 778

<< CHANGE SELECTIONS   |   <u>POST TO SITE</u> >>

CLIENT / CONFIRMATION      779

YOUR JOB HAS BEEN POSTED   799

CLICK HERE TO SEE YOUR PROBLEM ON THE LIVE SITE

GO TO CORRECT LIVE JOBS
GO TO CLIENT HOME
LOGOUT

FIG. 7E

CLIENT / CURRENT JOBS                    800

THE FOLLOWING JOBS ARE POSTED:

JOB # 7070 "XYZ CREATIVE BRIEF: BRAND IMAGE CAMPAIGN"
STATUS: LIVE ON VCN / FIRST SUBMISSIONS:
CLICK HERE TO VIEW SOLUTIONS SUBMITTED SO FAR.

GO TO CLIENT HOME
LOGOUT                   802

*FIG. 8*

CLIENT / ACCOUNT

CLIENT ACCOUNT REVIEW

⟵ 900

| | |
|---|---|
| TOTAL INVESTED IN VCN SERVICES: | $60,000.00 |
|     JOBS POSED: | 12 |
|     JOBS COMPLETED: | 10 |
|     CURRENT LIVE JOBS: | 2 |
|     MEMBERS SOLICITED: | 985 |
|     SOLUTIONS SUBMITTED: ⟵ 902 | 932 |
|         CLICK HERE TO VIEW THE MASTER LIST OF MEMBERS WHO SUBMITTED SOLUTIONS | |
|     SOLUTIONS ACCEPTED: ⟵ 904 | 14 |
|         CLICK HERE TO VIEW MEMBERS WHO'S SOLUTIONS HAVE BEEN ACCEPTED | |

| | | |
|---|---|---|
| JOBS POSTED: | | 12 |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
|   XYZ BRIEF: BRAND IMAGE CAMPAIGN | JOB 7070 | |
| SOLUTIONS SUBMITTED: | | 932 |
|     CLICK HERE TO VIEW THE MASTER LIST OF SOLUTIONS SUBMITTED | | |
| SOLUTIONS ACCEPTED: | | 14 |
|     CLICK HERE TO VIEW THE MATTER LIST OF SOLUTIONS ACCEPTED | | |
| CURRENT PREPAID BALANCE: | | $2,500.00 |

GO TO CURRENT LIVE JOBS
GO TO CLIENT HOME
LOGOUT

FIG. 9

CLIENT / FAVORITE MEMBERS

⟵ 1000

| | |
|---|---|
| VCN MEMBER ID | 671251 |
| JOBS COMPLETED: | 7 |

XYZ BRIEF: BRAND IMAGE
    CAMPAIGN                         JOB 7070
    XYZ BRIEF: BRAND IMAGE
    CAMPAIGN                         JOB 7070
    XYZ BRIEF: BRAND IMAGE
    CAMPAIGN                         JOB 7070
    XYZ BRIEF: BRAND IMAGE
    CAMPAIGN                         JOB 7070
    XYZ BRIEF: BRAND IMAGE
    CAMPAIGN                         JOB 7070
    NOTES:               RARE SKILL OF BEING ABLE TO
               1010    INCORPORATE COPY AND LOGO DESIGN.
CLICK HERE TO SEE ENTIRE MEMBER PROFILE.

| | |
|---|---|
| VCN MEMBER ID | 736552 |
| JOBS COMPLETED: | 3 |

XYZ BRIEF: BRAND IMAGE
    CAMPAIGN                         JOB 7070
    XYZ BRIEF: BRAND IMAGE
    CAMPAIGN                         JOB 7070
    XYZ BRIEF: BRAND IMAGE
    CAMPAIGN                         JOB 7070
    NOTES:               THIS MEMBER IS GREAT ON SEEDING
                              COPY AND RAW IDEA GENERATION.
CLICK HERE TO SEE ENTIRE MEMBER PROFILE.

| | |
|---|---|
| VCN MEMBER ID | 736552 |
| JOBS COMPLETED: | 5 |

XYZ BRIEF: BRAND IMAGE
    CAMPAIGN                         JOB 7070
    XYZ BRIEF: BRAND IMAGE
    CAMPAIGN                         JOB 7070
    XYZ BRIEF: BRAND IMAGE
    CAMPAIGN                         JOB 7070
    XYZ BRIEF: BRAND IMAGE
    CAMPAIGN                         JOB 7070
    XYZ BRIEF: BRAND IMAGE
    CAMPAIGN                         JOB 7070
    NOTES:               THIS MEMBER IS GREAT ON SEEDING
                              COPY AND RAW IDEA GENERATION.
    CLICK HERE TO SEE ENTIRE MEMBER PROFILE.

GO TO CURRENT LIVE JOBS
GO TO CLIENT HOME
LOGOUT

FIG. 10

CLIENT / PRIVATE SITE

PRIVATE SITE LOGIN:
    NAME:

PASSWORD:

[ SUBMIT ]

GO TO CURRENT LIVE JOBS
GO TO CLIENT HOME
LOGOUT

CLIENT / HISTORY  ———1200

ALL JOBS ON THIS PAGE HAVE BEEN CLOSED.

JOB # 7562
BDM COPY BRIEF: NEW TAG FOR "MILK"  ———1202
CLICK HERE FOR THE SOLUTIONS SUBMITTED.

JOB # 9921
BDM: LOGO BRIEF: NEW LOGO FOR BDM
CLICK HERE FOR THE SOLUTIONS SUBMITTED.

JOB # 0809
KIMO: COPY BRIEF: KIMO FOR PRESIDENT CAMPAIGN
CLICK HERE FOR THE SOLUTIONS SUBMITTED.

JOB # 3087
SINGAPORE: COPY BRIEF: JUSTICE IN SINGAPORE
CLICK HERE FOR THE SOLUTIONS SUBMITTED.

JOB # 5634
XYZ: INTERFACE BRIEF: DOES THIS SUCK
CLICK HERE FOR THE SOLUTIONS SUBMITTED.

JOB # 7456
XYZ: GRAPHIC BRIEF: SOUND FOR TV
CLICK HERE FOR THE SOLUTIONS SUBMITTED.

JOB # 6601
XYZ: COPY BRIEF: SCRIPTED RADIO
CLICK HERE FOR THE SOLUTIONS SUBMITTED.

JOB # 6600
XYZ: COPY BRIEF: BRAND IMAGE CAMPAIGN
CLICK HERE FOR THE SOLUTIONS SUBMITTED.

GO TO CURRENT LIVE JOBS
GO TO CLIENT HOME
LOGOUT

FIG. 12

MEMBER: AREISTER    [LOGOUT]

ACCOUNT UTILITIES: PROFILE | ACCOUNT | COMPLETED JOBS

| MEMBER OVERVIEW ↗ |
| FIND JOBS ↗ |
| ACTIVE JOBS ↗ |
| YOU HAVE 0 ACTIVE JOBS |
| MESSAGES ↗ |
| REPUTATION ↗ |
| OVERALL RATING: 5 |

LiquidWit

— 1600

PROFILE

PREFERENCES | PAYMENT INFORMATION  ~1601

MEMBER INFORMATION  ~1602 — EDIT  [?]

NAME:
EMAIL:
SCREEN NAME: AREISTER
JOB PREFERENCES: ~1603
☐ TAGLINE/SLOGANS        ☐ COPY
☐ GENERAL                ☐ LOGO CONCEPTS
☐ MARKETING CONCEPTS     ☐ AD BANNERS
☐ NAMING

NOTIFICATION PREFERENCES: ~1604   [?]
☐ PREFERRED JOBS AVAILABLE
☐ CLIENT RATING OF RESPONSE
☐ DAILY JOBS AVAILABLE SUMMARY
  (5:00PM PST)
☐ WEEKLY LIQUIDWIT UPDATE

1605

LIQUIDWIT WILL SEND AN EMAIL YOU TO:
• CONFIRM RESPONSE SUBMISSIONS
• CONFIRM PROFILE UPDATES
• REQUEST RESPONSE CLARIFICATION
• WHEN YOU HAVE BEEN TARGETED
  FOR A JOB

1606 ~ [UPDATE]

PARTNERS | ABOUT US | PRIVACY POLICY | CONTACT US | TERMS OF USE

MEMBER: ABRAHM [LOGOUT]

ACCOUNT UTILITIES: PROFILE | ACCOUNT | COMPLETED JOBS

REPUTATION

AS YOUR REPUTATION GROWS IN EACH CATEGORY YOU WILL HAVE ACCESS TO MORE AND BETTER PAYING JOBS. LEARN MORE ABOUT YOUR REPUTATION BY CLICKING ON THE HELP ICONS. — 2101

[?] WANT TO KNOW MORE ABOUT HOW REPUTATION WORKS?

CATEGORY RATINGS: — 2103
TAGLINES/SLOGANS: 0|⊥⊥⊥⊥⊥⊥⊥⊥⊥|5
3 JOB(S) RATED
COPY: 0|⊥⊥|5
NO JOBS RATED YET
GENERAL: 0|⊥⊥⊥|5
1 JOB(S) RATED
LOGO CONCEPTS: 0|⊥⊥⊥⊥⊥⊥⊥⊥⊥|5
NO JOBS RATED YET
MARKETING CONCEPTS: 0|⊥⊥⊥⊥⊥⊥⊥⊥⊥|5
1 JOB(S) RATED
AD BANNERS: 0|⊥⊥⊥⊥⊥⊥⊥⊥⊥|5
1 JOB(S) RATED
NAMING: 0|⊥⊥⊥⊥⊥⊥⊥⊥⊥|5
4 JOB(S) RATED

Chart - RATING (1-5):
NAMING TAGLINES BANNERS GENERAL
 COPY LOGOS MKTG

STATISTIC SUMMARY — 2102

| STATISTIC | COUNT |
|---|---|
| TOTAL JOBS ACCEPTED | 34 |
| MADE FAVORITE | 1 |
| FAVORITE REQUESTS | 6 |
| FOLLOW UP REQUESTS | 0 |
| CLIENT BLOCKS | 0 |
| JOB NON DELIVERY | 3 |
| REQUEST NON DELIV. | 1 |

[?] RATING SCALE
5 - EXCELLENT. THE RESPONSE IS PERFECT
4 - VERY GOOD. WELL EXECUTED RESPONSE.
3 - SATISFACTORY. A COMPLETE RESPONSE.
2 - FAIR. THE RESPONSE SHOWS LITTLE EFFORT.
1 - POOR. POORLY EXECUTED.

[CLIENT OVERVIEW]
[POST A NEW JOB]
[ACTIVE JOBS]
[YOU HAVE 0 ACTIVE JOBS]
[MESSAGES]
[REPUTATION]

LiquidWit — 2100

PARTNERS | ABOUT US | PRIVACY POLICY | CONTACT US | TERMS OF USE

FIG. 21

| CLIENT: ROBERTO | | LOGOUT | |
|---|---|---|---|

ACCOUNT UTILITIES: FAVORITE MEMBERS | PROFILE | ACCOUNT | COMPLETED JOBS

ACCOUNT 2501

TRANSACTIONS FOR THE PAST 60 DAYS

| DATE | MEMO | AMOUNT | BALANCE |
|---|---|---|---|
| 2001-05-26 | JOB POSTED: JOB COST | -25.00 USD | -25.00 USD |
| 2001-05-26 | JOB POSTED: FEE | -6.25 USD | -31.25 USD |
| 2001-05-26 | JOB POSTED: JOB COST | -5.00 USD | -36.25 USD |
| 2001-05-26 | JOB POSTED: FEE | -1.25 USD | -37.50 USD |
| 2001-05-26 | JOB POSTED: JOB COST | -25.00 USD | -62.50 USD |
| 2001-05-26 | JOB POSTED: FEE | -6.25 USD | -68.75 USD |
| 2001-05-27 | JOB POSTED: JOB COST | -25.00 USD | -93.75 USD |
| 2001-05-27 | JOB POSTED: FEE | -6.25 USD | -100.00 USD |
| 2001-05-29 | JOB RETIRED | 5.00 USD | -95.00 USD |
| 2001-05-29 | JOB RETIRED | 5.00 USD | -90.00 USD |
| 2001-05-30 | JOB RETIRED | 25.00 USD | -65.00 USD |

CLIENT OVERVIEW
POST A NEW JOB
ACTIVE JOBS
TESTING AGAIN 6 H 5 M
MESSAGES

PARTNERS | ABOUT US | PRIVACY POLICY | CONTACT US | TERMS OF USE

LiquidWit

| CLIENT: ROBERTO | | LOGOUT |
|---|---|---|

ACCOUNT UTILITIES: FAVORITE MEMBERS | PROFILE | ACCOUNT | COMPLETED JOBS

COMPLETED JOBS 2601

COMPLETED JOBS

| DATE | JOB NAME | COST | RESPONSES |
|---|---|---|---|
| 2001-05-30 | TESTING MORE | $0.0 | 0 |
| 2001-05-30 | TESTING AGAIN | $20.0 | 4 |
| 2001-05-29 | TESTING AS ROBERTO WITH NO CREDIT LIMIT | $20.0 | 4 |
| 2001-05-29 | FOLLOW UP: TESTING AS ROBERTO WITH NO CREDIT LIMIT | $0.0 | 0 |

- CLIENT OVERVIEW
- POST A NEW JOB
- ACTIVE JOBS
- YOU HAVE 0 ACTIVE JOBS
- MESSAGES

2602

2600

LiquidWit

PARTNERS | ABOUT US | PRIVACY POLICY | CONTACT US | TERMS OF USE

*FIG. 26A*

| CLIENT: ROBERTO | | LOGOUT |

ACCOUNT UTILITIES: FAVORITE MEMBERS | PROFILE | ACCOUNT | COMPLETED JOBS

TESTING AGAIN

PLEASE REVIEW THE RESPONSE THAT HAVE COME IN AND RATE THEM ON A SCALE OF 1 TO 5. RATING RESPONSES HELPS IMPROVE THE QUALITY OF OUR MEMBERSHIP WHICH WILL IMPROVE YOUR EXPERIENCE ON LIQUIDWIT. ONCE YOU HAVE RATED THEM, YOU CAN VIEW THEM UNDER "RATED RESPONSES."

🔲 LEARN MORE ABOUT RESPONSE LISTINGS

| | | |
|---|---|---|
| CATEGORY: | LOGO CONCEPTS | EXPIRED: 2001-05-30 |
| | | REWARD: $5.00 USD |
| | | SUGG. TIME: 15 MINUTES |
| JOB VIEWED: | 85 | REMAINING: 1 |
| | COMPLETED: 4 | TOTAL REQUESTED: 5 |
| | IN PROGRESS: 0 | SEE FULL JOB DETAILS >> |

NEW RESPONSES
SEE RATED RESPONSES (1) >>

[SUBMIT RATINGS]

R1  📄 TESTING BIG ATTACHMENT
　　　　　　　　　　　RATE THIS RESPONSE　　1○　2○　3○　4○　5○

R2  📄 TESTING FROM T1 WITH LARGE ATTACHMENT
　　　　　　　　　　　RATE THIS RESPONSE　　1○　2○　3○　4○　5○

ANDY　RESPONSE TO TEST
　　　　　　　　　　　RATE THIS RESPONSE　　1○　2○　3○　4○　5○

PARTNERS | ABOUT US | PRIVACY POLICY | CONTACT US | TERMS OF USE

*FIG. 26B*

CLIENT: ROBERTO  [LOGOUT]

ACCOUNT UTILITIES: FAVORITE MEMBERS | PROFILE | ACCOUNT | COMPLETED JOBS

ACTIVE JOBS                                               *Liquid*Wit

[CLIENT OVERVIEW]                              [?] LEARN MORE ABOUT RESPONSE
[POST A NEW JOB]                                   LISTINGS
[ACTIVE JOBS]
[MESSAGES]

TESTING AGAIN

| CATEGORY: | LOGO CONCEPTS | EXPIRED: | 2001-05-30 |
| JOB VIEWED: | 85 | REWARD: | $5.00 USD |
| | COMPLETED: | SUGG. TIME: | 15 MINUTES |
| | IN PROGRESS: | REMAINING: | 1 |
| FROM: R1 | | TOTAL REQUESTED: | 5 |

— 2651

TESTING BIG ATTACHMENT

[📄] FILE 1 >>  — 2654
                           [+] ADD TO FAVORITES  — 2655
                           [✕] BLOCK MEMBER  — 2656
                           [↩] FOLLOW UP

RATE THIS RESPONSE   1 ○   2 ○   3 ○   4 ○   5 ○    [SUBMIT RATINGS ➚]

2652            2653

[↑] NEXT RESPONSE

— 2650

PARTNERS | ABOUT US | PRIVACY POLICY | CONTACT US | TERMS OF USE

*FIG. 26C*

CLIENT: LW_MARKETING    LOGOUT

ACCOUNT UTILITIES: FAVORITE MEMBERS | PROFILE | ACCOUNT | COMPLETED JOBS

POST FOLLOW UP
PAM SCOTT QUALITATIVE AGENCY NAME

POST A FOLLOW UP TO GET ADDITIONAL INPUT ON A PREVIOUS JOB FROM MEMBERS WHOSE RESPONSES YOU WERE INTERESTED IN. USE THIS OPPORTUNITY TO ASK FOR FURTHER WORK OR TO GIVE MORE DETAILED GUIDELINES THAT WILL OFFER YOUR TARGETED MEMBERS THE OPPORTUNITY TO BUILD ON THEIR PAST RESPONSES TO THE PREVIOUS JOB. FOR EXAMPLE, YOU CAN ASK FOR ADJUSTMENTS TO A LOGO CONCEPT, MORE OR DIFFERENT EXAMPLES OF NAME POSSIBILITIES, OR ADJUSTMENTS TO COPY BASED ON MORE SPECIFIC GUIDELINES.

TEASER — 3002

↳ FOLLOW UP: NAME A UNIQUE NEW
QUALITATIVE RESEARCH COMPANY — 3003

DESCRIPTION

DUE: 3 DAYS
SUGG TIME: 15 MINUTES
REWARD: $5 — 3004

TARGETED MEMBERS

| NAME | RATING |
|---|---|
| ☐ CHEEKY | 4.0 |
| ☐ ABRAHM | 4.0 |
| ☐ CONTENT | 3.0 |
| ☐ FUNKWRENCH | 5.0 |
| ☑ WICKEDWIT | 5.0 |
| ☐ ELEMENT | 4.0 |
| ☐ 268 | 4.0 |
| ☐ FURIOUS_GEORGE | 4.0 |
| ☐ WILLIT | 3.0 |
| ☐ TENFOLD | 4.0 |

BROWSE...

TO CONTINUE VIEWING RESPONSES AND SAVE THIS FOR FOLLOWUP LATER, CLICK "NEXT RESPONSE". IF YOU ARE READY TO POST THIS FOLLOWUP JOB NOW, CLICK "POST FOLLOWUP".

POST FOLLOW UP — 3006

CLIENT OVERVIEW
POST A NEW JOB
ACTIVE JOBS
YOU HAVE 0 ACTIVE JOBS
MESSAGES

PARTNERS | ABOUT US | PRIVACY POLICY | CONTACT US | TERMS OF USE

SYSTEM AND METHOD FOR EXCHANGING CREATIVE CONTENT

CROSS-REFERENCE TO RELATED APPLICATIONS

This application claims priority under 35 U.S.C. § 119(e) to Provisional Application No. 60/249,286, filed Nov. 17, 2000, the entirety of which is incorporated herein by reference.

BACKGROUND OF THE INVENTION

1. Field of the Invention

The present invention relates generally to electronic transactions. More particularly, the present invention relates to electronic transactions for exchanging intellectual capital and for buying and selling various types of services.

2. Related Art

In a conventional model for generating intellectual capital, such as creative content, individuals are hired by, for example, an advertising or marketing agency to generate ideas, designs, and other creative content. Such individuals (sometimes referred to herein as "creatives") form an in-house creative staff to such well known agencies as Ogilvy & Mather, J. Walter Thompson, and Saatchi & Saatchi. Clients of the agencies would pay for and receive the creative content generated by such in-house staffs. In such a model, a client receives the benefit of the creativity of the particular agency staff, and typically there is an emphasis on building a sustainable and exclusive relationship between the client and the agency. Usually, the cost for obtaining services from well known agencies that presumably employ the more creative and effective designers is substantial, and typically is out of reach for many small and start-up enterprises. Moreover, such businesses may not have the time or resources to devote to fostering the personal relationship, negotiating and executing written contracts, and engaging in the other activities associated with conventional transactions for creative content or other intellectual capital.

With the advent of the Internet and the growing use of electronic transactions to conduct business, some web sites have developed that provide a mechanism for locating and obtaining creative services at least partially through electronic transactions. Some of these sites function primarily as recruiting services, primarily for individuals functioning as "freelancers." Examples of such sites include Monster.com, elance.com, guru.com, and instantwork.com. Other sites, such as HelloBrain.com, focus more on soliciting ideas. However, such sites suffer from numerous drawbacks. Such sites do not allow the many creative individuals to select the jobs on which they want to work, while providing timely solutions to the clients by individuals having the highest median reputation rating. Such sites do not easily provide for participation by a diverse group of creative talent. Such sites are primarily aimed at freelancers or persons looking for part-time jobs. Therefore, creative talent employed full-time who are only looking for a quick (on the order of minutes or hours) creative job are left out of the pool of possible respondents.

There is a need for an intellectual capital exchange that provides for electronic exchange of various types of intellectual capital, including creative content. Such an intellectual capital exchange would implement a reputation rating system so that buyers of intellectual capital would receive content prepared by highly creative sellers of intellectual capital. Such an exchange would balance job disclosure to members and job fill rate so that the job quota of responses is filled by a client's deadline with the highest possible average respondent reputation rating. Such an exchange would operate as a one-to-many exchange, (i.e., many potential sellers for each buyer), allowing the sellers of intellectual capital to select the projects on which they want to work, while maintaining a high level of quality solutions delivered to each buyer. Such an intellectual capital exchange would also include a diversity of creative talent, from freelancers and part-time workers, to those employed full-time.

SUMMARY OF THE INVENTION

The present invention is directed toward a system and method for exchanging intellectual capital. The present invention provides an exchange that matches buyers and sellers of knowledge and ideas, referred to collectively herein as "intellectual capital." The exchange of the present invention matches buyers and sellers of such intellectual capital, allowing quality creative solutions to be produced quickly and cost-effectively. In one aspect, the present invention is implemented using a public network, such as the Internet and the world wide web. In another aspect, the present invention is implemented using a private network, such as an intranet. Preferably, all aspects of the one-to-many buyer/seller matching and transaction fulfillment is carried out electronically over the network in an "online" manner. The economics of the intellectual capital exchange of the present invention are much more attractive than exchanges for physical goods as distribution costs are minimal, payment challenges are significantly reduced, and there is value added by the exchange in rating traded items through the member reputation rating system of the present invention. While the rating system described herein refers to the member's reputation, other types of ratings could also be used.

The present invention can be used in a variety of industries, to solve a number of different problems. In one aspect, the present invention is implemented in the advertising and marketing industry to provide business and advertising agency clients with access to a rich community of creative professionals who quickly and affordably generate product names, taglines, logos, banner ads, marketing copy, and other creative solutions. The sellers on the exchange, known as "members," provide the creative solutions and can work independently on interesting projects at competitive rates.

The present invention includes a member reputation rating system (also referred to herein as a reputation system) that quickly builds a reputation rating for members due to the frequency of rating. For example, a member could be rated sixteen times in one day for sixteen half-hour jobs. The reputation rating system allows the exchange of the present invention to match clients with members who have proven creative abilities in specific areas. The present invention also allows clients to choose members as "favorite" members and to build their own preferred member sub-community, thus increasing the value of the present invention to both members and clients.

The present invention advantageously allows members to enjoy choice, recognition, reward and stimulation. The members choose, when, where, and what to work on, and at what price to work. They contribute in the manner that best suits their skills and interests (naming, logo design, copywriting, etc.) and on their own terms (financial reward, time of day, current workload, etc.). In a preferred aspect of the present invention, the posted jobs are short, self-contained tasks. As such, a member can make use of the briefest slack period (as short as, for example, 15 minutes) to earn money, without any further commitment. In addition to monetary rewards, members gain recognition within the exchange community for completing quality work in a timely manner. The reputation rating system of the present invention provides a quantitative rating of the quality and timeliness of the member's work, and is preferably used to determine whether a member is exposed to and qualifies for high paying jobs.

The reputation rating system of the present invention also benefits buyers of intellectual capital, such as creative services. For example, buyers are matched with sellers or members who have proven expertise in the relevant area of creative work. The reputation rating system is the primary mechanism for maintaining quality within the creative member community. Clients (buyers of intellectual capital) rate responses on a rating scale (for example, 1 to 5 with 1 being the lowest and 5 being the highest). Any client rating scale can be used that provides a mechanism whereby clients can indicate their satisfaction with the quality of the work product. In a preferred embodiment of the present invention, clients can also choose "favorite" members or "block" members whose work falls below their standards. Preferably, blocked members are not exposed to jobs of clients by whom they have been blocked. Being blocked negatively affects a member's reputation rating, while being designated a favorite positively affects a member's reputation rating. In a particularly preferred embodiment of the present invention, when a job is posted by a client, it is disclosed using staged disclosure. Using the staged disclosure process, top-performing members (i.e., with a high reputation rating) are given first access to the job description or brief, with lower-rated members given access to the job over time, and only if the client's quota is not fulfilled by top-performing members. For example, the job may be initially disclosed only to those members with a reputation rating at or above a certain threshold reputation rating. As time progresses, the job may then be disclosed to members with lower reputation ratings. Predictive models may be used to assist in determining the number of members to whom the job is initially disclosed, and at what rate the job should be disclosed to lower-rated members. Further, highly rated members gain access to higher paying jobs, while low-rated members gain access only to lower-paying jobs. Low-rated members may eventually have their membership revoked if they consistently produce sub-standard (or untimely) work product.

Transactions completed on the exchange of the present invention will generate data indicating the price range over which top performers and lower-rated performers are willing to perform certain tasks. For example, a highly-rated member may not be willing to write a tagline for less than $43, but a lower-rated member would be willing to do so for $10. A suggested price range for a client posting a job for writing a tagline would be $10 to $43, with the understanding that a higher price will bring in responses from higher-rated performers.

In one aspect of the present invention, a method for staged disclosure of a job request is provided. The job request comprises a quota that indicates the number of responses to be received and a deadline for receipt of the responses. The method comprises determining a reputation rating for each of a plurality of service providers, disclosing the job request to those service providers with a reputation rating that is above a particular reputation rating threshold, receiving a response to the job request from at least one of those service providers to whom the job request was disclosed, comparing, at some point prior to the deadline, the number of responses received and the quota, and disclosing the job request to additional, lower-rated, service providers if the number of responses received is less than the quota.

In another aspect of the present invention, a method for staged disclosure of a job request is also provided. Again, the job request comprises a quota that indicates the number of responses to be received and a deadline for receipt of the responses. The method comprises determining a reputation rating for each of a plurality of service providers, determining an acceptance probability rate, which indicates the likelihood that a service provider will provide a response to the job request, as a function of service provider reputation rating, and selecting, based on this acceptance probability rate, a group of service providers. This group of service providers is selected such that it will provide, based on the acceptance probability rate, a sufficient number of responses to meet the quota, while also having the highest possible mean reputation rating. After the group of service providers is selected, the job request is disclosed to them, and responses to the job request are received. At some point prior to the deadline, the number of responses predicted by the acceptance probability rate is compared with the actual number of responses received. If the number of responses received is less than the quota, the job request is disclosed to additional service providers.

In another aspect of the present invention, a method for rating service providers is provided. The method comprises receiving a numerical rating from a client for a service performed by a service provider, and determining the occurrence of a reputation event, such as when the client designates the service provider as either a preferred or unacceptable provider, requests the service provider to perform a particular job, refuses to compensate the service provider, or the service provider fails to perform a service after accepting the job. A numerical value is assigned for the occurrence of each of the reputation events. A reputation rating is calculated based on the numerical ratings from clients and the numerical values associated with reputation events. Alternatively, the reputation rating of the service provider may determined and then adjusted based on quality assessments made by clients, and the occurrence of reputation events, such as those described above.

In yet another aspect of the present invention, a method for facilitating the buying and selling of services is provided. The method comprises receiving a job request from a client which comprises a description of a service to be performed, a deadline, and a quota indicating the number of responses to be received. A group of service providers is then selected such that the group is sufficiently large to generate a number of responses equal to the quota, and the job request is disclosed to those service providers. Responses from at least one service provider is received. At some point prior to the deadline, the number of responses received is compared with the quota, and the number of service providers in the group is adjusted based on this comparison.

In still another aspect of the present invention, a method for facilitating the buying and selling of services is again provided. The method comprises receiving a job request from a client which comprises a description of a service to be performed, a deadline, and a quota indicating the number of responses to be received. The reputation rating of each of a plurality of service providers is then determined and a group of service providers is selected such that the mean reputation rating of the group is higher than the mean reputation rating of the plurality of service providers. The job request is disclosed to this group service providers, and responses from at least one of these service providers is received. Prior to the deadline, the number of responses received and the quota are compared, and, if the number of responses received is less than the quota, the job request is disclosed to a second group of service providers, in which the second group of service providers have a mean reputation rating lower than the initial group.

In still another aspect of the present invention a method for facilitating the buying and selling of services is again provided. The method comprises receiving a plurality of job requests from clients, each of which comprises a description of a service to be performed, a deadline, and a quota indicating the number of responses to be received. The reputation rating of each of a plurality of service providers is then determined and a group of service providers is selected for each job request such that the mean reputation rating of the group is higher than the mean reputation rating of the plurality of service providers. Capsules, describing the job request, are then disclosed to each service provider in the group service providers, and capsule deliveries comprising responses are received from at least one of these service providers. Prior to the deadline, the number of delivered capsules and the quota are compared, and, if the number of delivered capsules is less than the quota, the job request is disclosed to a second group of service providers, in which the second group of service providers have a mean reputation rating lower than the initial group.

BRIEF DESCRIPTION OF THE FIGURES

The accompanying drawings, which are incorporated in and constitute a part of this specification, illustrate embodiments of the invention and, together with the description, serve to explain the features, advantages, and principles of the invention. In the figures, like reference numbers indicate identical or functionally similar elements.

FIG. 1 depicts one embodiment of a member home page for an exchange of the present invention;

FIGS. 2A and 2B depict one embodiment of a member profile page for an exchange of the present invention;

FIG. 4 depicts one embodiment of a job postings page for an exchange of the present invention;

FIG. 5 depicts one embodiment of a member notepad page for an exchange of the present invention;

FIG. 6 depicts one embodiment of a client home page for an exchange of the present invention;

FIGS. 7A though 7C depict one embodiment of a client submit page for an exchange of the present invention;

FIG. 7D depicts one embodiment of a client recap page for an exchange of the present invention;

FIG. 7E depicts one embodiment of a client confirmation page for an exchange of the present invention;

FIG. 8 depicts one embodiment of a client current jobs page for an exchange of the present invention;

FIG. 9 depicts one embodiment of a client account page for an exchange of the present invention;

FIG. 10 depicts one embodiment of a client favorite members page for an exchange of the present invention;

FIG. 11 depicts one embodiment of a private site login page for an exchange of the present invention;

FIG. 12 depicts one embodiment of a client history page for an exchange of the present invention;

FIG. 16A depicts an alternative embodiment of a member profile page for an exchange of the present invention;

FIG. 19A depicts one embodiment of a member find jobs page for an exchange of the present invention;

FIG. 21 depicts one embodiment of a member reputation rating page for an exchange of the present invention;

FIG. 25 depicts an alternative embodiment of a client account page for an exchange of the present invention;

FIG. 26A depicts one embodiment of a client completed jobs page for an exchange of the present invention;

FIG. 26B depicts one embodiment of a client new response listing page for an exchange of the present invention;

FIG. 26C depicts one embodiment of a client detailed response page for an exchange of the present invention;

FIG. 26F depicts one embodiment of a client follow up request page for an exchange of the present invention;

Figure 27A:
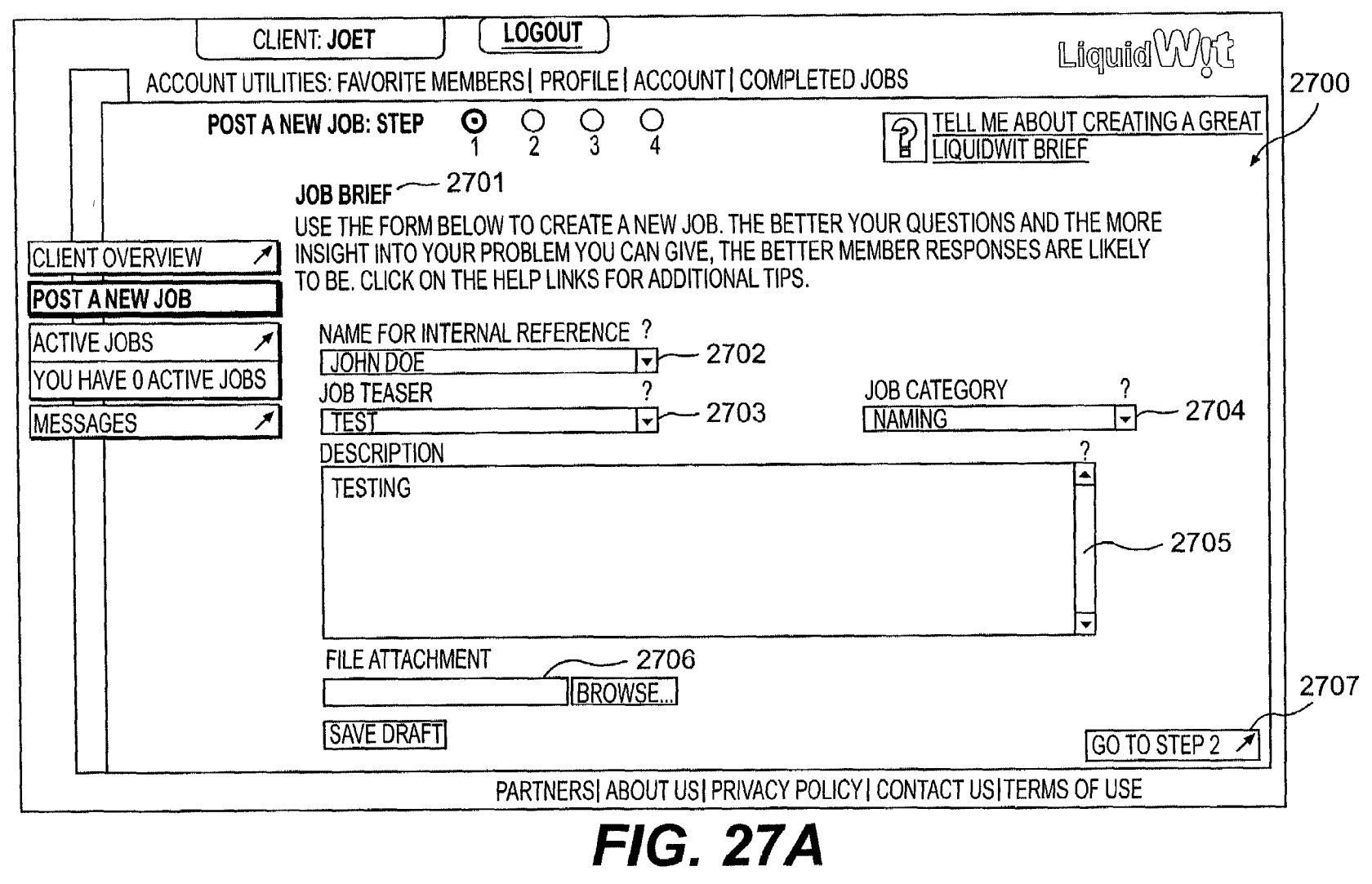

FIG. 27A depicts one embodiment of a client job post page for an exchange of the present invention;

FIG. 27D depicts one embodiment of a client review job page for an exchange of the present invention;

DETAILED DESCRIPTION OF THE PREFERRED EMBODIMENTS

Overview

Figure 3A:
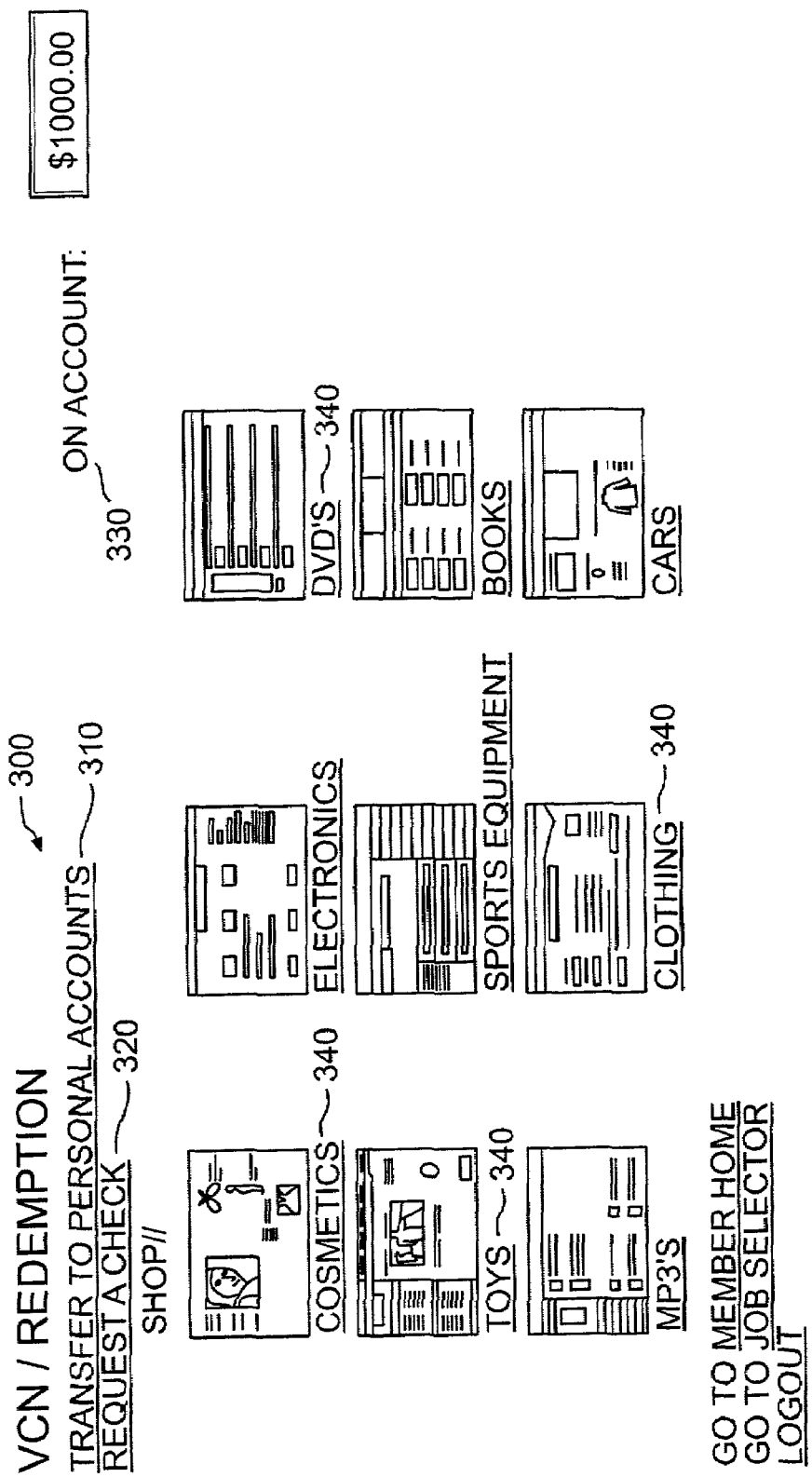
FIGS. 3A and 3B depict one embodiment of redemption pages for an exchange of the present invention.

In a preferred aspect of the present invention, there are two primary classes of users of the exchange: clients who are requesting intellectual capital; and members (or, generally, "service providers") who are providing the intellectual capital in response to a client request. In a preferred embodiment, the identity of clients and members is not revealed during the transaction. Rather, clients and members interact with each other through the use of aliases selected by the participants, or though member and client numbers assigned by the exchange system. The identity and personal information for clients and members are maintained by the exchange system to effect payment to members, collect payment from clients, etc. In alternate preferred embodiments, the identities of the clients or members, or both, are revealed.

Clients can be, for example, businesses that need any kind of intellectual capital, such as creative development for promotions, tradeshows, newsletters, advertising and marketing material, and the like. Clients can also be marketing service firms and advertising agencies that need to balance workload between internal and external creative resources to deliver fresh creative output to their clients, particularly in short timeframes. The present invention is particularly advantageous for agencies that have multiple offices, offices in different time zones, or agencies that work on regional executions of worldwide campaigns.

Members can be virtually any entity that can produce intellectual capital, including but not limited to, freelance creative personnel, creative personnel employed full or part-time, students, or even a business entity such as an advertising agency or marketing firm. Preferably, clients can also be members, and members can also be clients. As an example, if an advertising agency loses a significant client, or is otherwise in a situation with creative individuals having spare time, the advertising agency can itself become a member on the exchange of the present invention. In such a situation, the employees of the member agency can accept work and submit responses in the exchange. The member agency then gets paid for the responses submitted by the agency employees. In this manner, the employees are fully engaged, the agency is receiving revenue for the work performed by the agency employees, and the clients are being serviced via the exchange.

Additionally, members and clients may be part of the same organization such as when the present invention is carried out using a private network such as an intranet. When one individual within the organization is in need of intellectual capital, that individual can post a job request to the intranet exchange service. This job request may then be disclosed to individuals throughout the organization, who may submit responses to the job request. In this fashion, intellectual capital may be efficiently exchanged within an organization.

Similarly, the present invention may be carried out using a private network that links two or more organizations. Such organizations may be engaged in a joint venture or have some other common business interest. Thus, an individual at an organization linked to the private network may post a job request, and this job request is preferably disclosed to individuals across the private network.

In one aspect of the invention, creatives wanting to become members of the exchange are allowed to enroll and submit "free" responses to client job requests that will be presented to clients separately from the paid responses of full members. Once the prospective member receives sufficiently high ratings from clients across several jobs, the prospective member becomes a full member. Preferably, members can also refer other members. However, to encourage referrals while maintaining accountability in a preferred embodiment, member reputation ratings will be affected positively and negatively by referred members' performance. In another embodiment of the invention, creatives who wish to become full members without waiting for the online rating and assessment process, pay an initiation fee that is used at least in part to fund verification of the prospective members credentials (identity, education, employment, certifications, and the like), and position them accordingly in the creative community (e.g., expert, high, medium, base).

EXAMPLE

An advertising agency executive is seeking name ideas for a new health drink that the agency's client is about to launch in Singapore. The executive asks for fifty (50) ideas from top professional creatives (members) with naming expertise in Singapore to be delivered in 24 hours, offering $50 per response. The creative membership base visits the site during lunch, on the bus via wireless access, or from home in the evening. All members who are qualified (based on area of expertise and reputation rating) see the $50 naming job. Interested members can then review the creative brief, elect to take the job, submit their naming idea, and earn the $50. Twenty-four hours later, the executive returns to the exchange site, reviews and rates the fifty suggestions, and chooses twenty (20) for his staff to refine and deliver to the client. Once the client has chosen a name, the executive can return to the site seeking logo, tagline, packaging, and marketing ideas for launch.

Implementation of the Present Invention

In a preferred embodiment, the present invention is implemented over a public network, such as the Internet. Public networks such as the Internet are becoming the world's new market place. The number of people and businesses that have access to the Internet is growing rapidly. Businesses are increasingly interested in selling and marketing products and services over the Internet, particularly via the World Wide Web ("WWW"). Alternatively, the present invention can be implemented over a private network, such as an intranet. In such an intranet embodiment, only the clients and members having access to the intranet would be able to participate in the exchange. Such an embodiment could be used, for example, in an advertising agency with multiple offices to solicit creative content from all offices for a particular job. Alternatively, the present invention can be implemented on a public exchange such as the Internet, with a mechanism provided for access to a private exchange section for authorized users of the private intranet.

The following definitions are intended to provide clarity to various terms used in the present invention, and to provide a description of various hardware and software tools that may be used to implement the present invention. Any reference to products is done for exemplary and/or explanatory purposes only. The breadth and scope of the present invention should not, however, be limited by any of the exemplary products or definitions disclosed herein.

ActiveX Data Objects (ADO) is an application program interface (API) from Microsoft Corporation, Redmond, Wash. ("Microsoft") that lets programmers writing Windows® (a registered trademark of the Microsoft Corporation, Redmond, Wash.) applications get access to relational and non-relational databases from both Microsoft and other database providers. For example, if it was desired to write a program that would provide users of a Web site with data from an IBM DB2 database or an Oracle database, ADO program statements could be included in an HTML file that was identified as an Active Server Page (ASP). When a user requested the page from the Web site, the page sent back could include appropriate data from a database, obtained using ADO code.

Active X is a software module based on Microsoft's Component Object Model (COM) architecture. It enables a program to add functionality by calling ready-made components that blend in and appear as normal parts of the program. They are typically used to add user interface functions, such as 3-D toolbars, a notepad, calculator or even a spreadsheet.

An ActiveX control is a component program object that can be re-used by many application programs within a computer or among computers in a network. The technology for creating ActiveX controls is part of Microsoft's overall ActiveX set of technologies, chief of which is the Component Object Model (COM). ActiveX controls can be downloaded as small programs or animations for Web pages, but they can also be used for any commonly-needed task by an application program in the latest Windows® and Macintosh® (a registered trademark of Apple Computer, Inc., Cupertino, Calif.) environments.

An animated GIF is a graphic image on a Web page that moves—for example, a twirling icon or a banner with a hand that waves or letters that get larger. In particular, an animated GIF is a file in the Graphics Interchange Format specified as GIF89a that contains within the single file a set of images that are presented in a specified order. An animated GIF can loop endlessly or it can present one or a few sequences and then stop the animation.

A browser system is a program that provides a way to look at, read and hear information on the World Wide Web. A browser typically interprets hypertext links and allows the user to view sites and navigate from one Internet node to another. A brief overview of web browsers and their interactions within the World Wide Web is set forth in U.S. Pat. No. 5,774,670, the entirety of which is herein incorporated by reference. As apparent to one skilled in the art, "browsing" refers to a process that can describe moving between web page files associated with the exchange web site of the present invention. "Browsing" can also refer to browsing the World Wide Web, which is also described in U.S. Pat. No. 5,774,670.

A Common Gateway Interface (CGI) is a program written in a script language such as Perl that functions as the glue between HTML pages and other programs on the Web server. For example, a CGI script would allow search data entered on a Web page to be sent to a DBMS (database management system). It would also format the results of that search onto an HTML page, which is sent back to the user.

Client/server is an architecture in which the client machine (personal computer or workstation) is the requesting machine and the server is the supplying machine, both of which are connected via a local area network (LAN) or wide area network (WAN). As would be understood by one skilled in the art from the context of its usage, client as used in this context is different from the "client" who is the requestor of services, as described elsewhere herein. Since the early 1990s, the client/server architecture has been used to build applications on LANs in contrast to centralized minicomputers and mainframes with dedicated terminals. The client machine contains the user interface and, in terms of the present invention, preferably performs none or very little of the application processing. A client machine may also be referred to herein as a "user machine" or "user." Servers can be high-speed microcomputers, minicomputers or even mainframes. A database server maintains the databases and processes requests from the client machine to extract data from, or update, the database. An application server may provide additional business processing for the client machine.

A cookie is a special text file that a Web site puts on a hard disk or other memory device of a user machine accessing the web site so that it can remember something about the user at a later time. Typically, a cookie records a user's preferences when using a particular site. Using the Web's Hypertext Transfer Protocol (HTTP), each request for a Web page is usually independent of all other requests. For this reason, the Web page server usually has no memory of what pages it has sent to a user previously or anything about the user's previous visits. A cookie is a mechanism that allows the server to store its own file about a user on the user's own computer. The file is stored in a subdirectory of the browser directory. The cookie subdirectory will contain a cookie file for each Web site the user has been to that uses cookies. An exemplary specification for cookies can be found at http://www.netscape.com/newsref/std/cookie_spec.html, which is herein incorporated by reference in its entirety. A detailed description of cookies, and the storage of state information, is also contained in U.S. Pat. No. 5,774,670.

An Active Server Page is a Web page that contains programming code written in VB Script or Javascript. This code was developed by Microsoft starting with Version 3.0 of its Internet Information Server (IIS). When the IIS server encounters an Active Server page that is requested by the browser, it executes the embedded program. Active Server Pages are Microsoft's alternative to CGI scripts, which allow Web pages to interact with databases and other programs.

Encryption is the conversion of data into a form, called a cipher, that cannot be easily intercepted by unauthorized people or machines. Decryption is the process of converting encrypted data back into its original form, so it can be understood. Typically, when an encrypted document arrives at its destination, the encrypted document is converted back to its original form through decryption. The readable document is generally referred to as a "decrypted" document. A basic introduction to encryption and decryption is described in the text written by Bruce Scheiner entitled "*Applied Cryptography: Protocols, Algorithms And Source Code in*

C," published by John Wiley & Sons, 1994, the entirety of which is hereby incorporated by reference. Moreover, more detailed descriptions of systems and apparatus for accomplishing encryption and decryption in computer networks are set forth in U.S. Pat. Nos. 5,903,652, 5,850,442, and 5,850,446, the entirety of each of which is hereby incorporated by reference.

HTML (Hypertext Markup Language) is the set of "markup" symbols or codes inserted in a file intended for display on a World Wide Web browser. The markup tells the Web browser how to display a Web page's words and images for the user. Hypertext Transfer Protocol (HTTP) is the set of rules for exchanging files (text, graphic images, sound, video and other multimedia files) on the World Wide Web. Relative to the TCP/IP suite of protocols, HTTP is an application protocol. The World Wide Web is based on the concept of "hypertext" and the transfer method known as HTTP. HTTP is typically designed to ran primarily over TCP/IP and uses the standard Internet setup, where a server issues the data and a client machine or "client browser" displays the data. One format for information transfer is to create documents using HTML page, which are preferably made up of standard text as well as formatting codes which indicate how the page should be displayed. The Web client machine, reads these codes in order to display the page. The hypertext conventions and related functions of the World Wide Web are described in the appendices of U.S. Pat. No. 5,715,314, the entirety of which is herein incorporated by reference. HTTPS (HTTP Secure) is a Web protocol developed by Netscape and built into its browser that encrypts and decrypts user page requests as well as the pages that are returned by the Web server. HTTPS uses Netscape's Secure Socket Layer (SSL) as a sublayer under its regular HTTP application layer. SSL can use a 40-bit or 120 bit key size for the stream encryption algorithm.

In general computer usage, logon is the procedure used to get access to an operating system or application, usually in a remote computer. Generally, a logon procedure requires that the user have (1) a user ID and (2) a password. Often, the user ID must conform to a limited length such as eight characters and the password must contain at least one digit and not match a natural language word. The user ID can be freely known and is visible when entered at a keyboard or other input device. The password must be kept secret (and is not displayed as it is entered). A similar procedure, called registration, is required to enter some Web sites.

TCP/IP (Transmission Control Protocol/Internet Protocol) is the basic communication language or protocol of the Internet. It can also be used as a communications protocol in the private networks called intranets and in extranets. When a computer is set up with direct access to the Internet, the computer is provided with a copy of the TCP/IP program just as every other computer that messages are sent to, or information is received from, also has a copy of TCP/IP.

A URL is the address of a file (resource) accessible on the Internet. The type of resource depends on the Internet application protocol. Using the World Wide Web's protocol, the Hypertext Transfer Protocol (HTTP), the resource can be an HTML page, an image file, a program such as a CGI application or Java® applet, or any other file supported by HTTP. The URL contains the name of the protocol required to access the resource, a domain name that identifies a specific computer on the Internet and a hierarchical description of a file location on the computer. Additional descriptions of URLs can be found in U.S. Pat. No. 5,774,670 and the appendices to U.S. Pat. No. 5,715,314, the entirety of each of which is herein incorporated by reference.

The World Wide Web is defined as all of the resources and users on the Internet that are using the Hypertext Transport Protocol (HTTP).

In one embodiment of the present invention, the exchange is carried out on a public exchange such as the Internet using a series of HTML pages accessed, for example, by a browser. Such an embodiment could include, for example, a home page from which a member or a client could logon to a member home page and a client home page in a manner known to one skilled in the art. An exemplary member home page 100 is depicted in FIG. 1. As would be readily apparent to one skilled in the art, the pages depicted in the figures are illustrative in nature and could be implemented in a variety of ways so that the present invention is not limited to any particular page layout, implementation or design.

With reference now to FIG. 1, member home page 100 includes a plurality of links to other pages on the exchange web site. Link 110 navigates the user to a member profile page 200 as shown in FIGS. 2A and 2B. Link 120 navigates the user to a shop or redemption page 300 (FIG. 3A) that allows the user to shop for items with the rewards earned on the exchange. Link 130 navigates the user to a job postings page 400 (FIG. 4) that allows the user to review and select jobs. Link 140 navigates the user to a member notepad page 500 (FIG. 5) that allows members to make notes and record ideas and solutions. Link 150 navigates the user to a logout page that allows the user to logout from the site in a well known manner.

Member home page 100 also includes access to a problems folder 160 that includes a variety of sub-folders of problems or jobs. The member can review the job, and select the one(s) on which the member would like to work. For example, sub-folder "c prob 3c" includes five jobs 162, each identified by a description and a job number (e.g., XYZ Creative Brief, job number 7070).

A member can configure, review and update the member profile via member profile page 200 shown in FIG. 2A. Member profile page 200 includes a personal section 210 that includes, for example, name, address, home and work telephone numbers, social security number (SSN) for purposes of providing appropriate tax information for earnings, credit card number, email address, and the like. The privacy and security of such information is preserved by the exchange of the present invention in a suitable manner known to one skilled in the art.

Member profile page 200 also includes a jobs taken section 220 that lists the job description and job number for all jobs that have been taken or accepted. All of the jobs listed in FIG. 2A are the same for exemplary purposes only and could, of course, be different. In any figure in which the data is the same, this has been done for exemplary purposes only. Preferably, a "click here" link 222 is provided so that the member can see the job details.

An earnings section 230 is provided that allows the member to view total earnings, as well as earnings year to date, and in the past 3 month and 6 month time periods. A link 232 is provided to redemption page 300 (explained in more detail below with respect to FIGS. 3A and 3B) to allow the member to redeem earnings.

A team members section 240 is provided to list team members of the particular member. A member can refer other members to the exchange. Accepted members then become part of a team for the member that referred them. Team members can buy and sell intellectual capital on the exchange. Members can also refer specific tasks to their team members. In order to maintain quality throughout the exchange and provide an incentive to refer only high quality creative individuals, the performance, and reputation rating of team members affects (positively and negatively) the member that referred those team members. Team member section 240 lists a description of the type of work performed by the team member (e.g., design or copy specialist), the alias of the team member (e.g., Charlie or Jason), and the member identification of the team member as assigned by the exchange. A link 242 is provided to add or remove team members.

Turning now to FIG. 2B, a referral members section 250 is shown. This section illustrates referrals from clients that are sent to team members.

A clients favorites list section 260 lists the clients that have identified that member as a favorite. A jobs detail link 262 allows the member to navigate to the details of the job that resulted in the favorite rating. A navigation section 270 allows the member to navigate to other parts of the site.

Figure 3B:
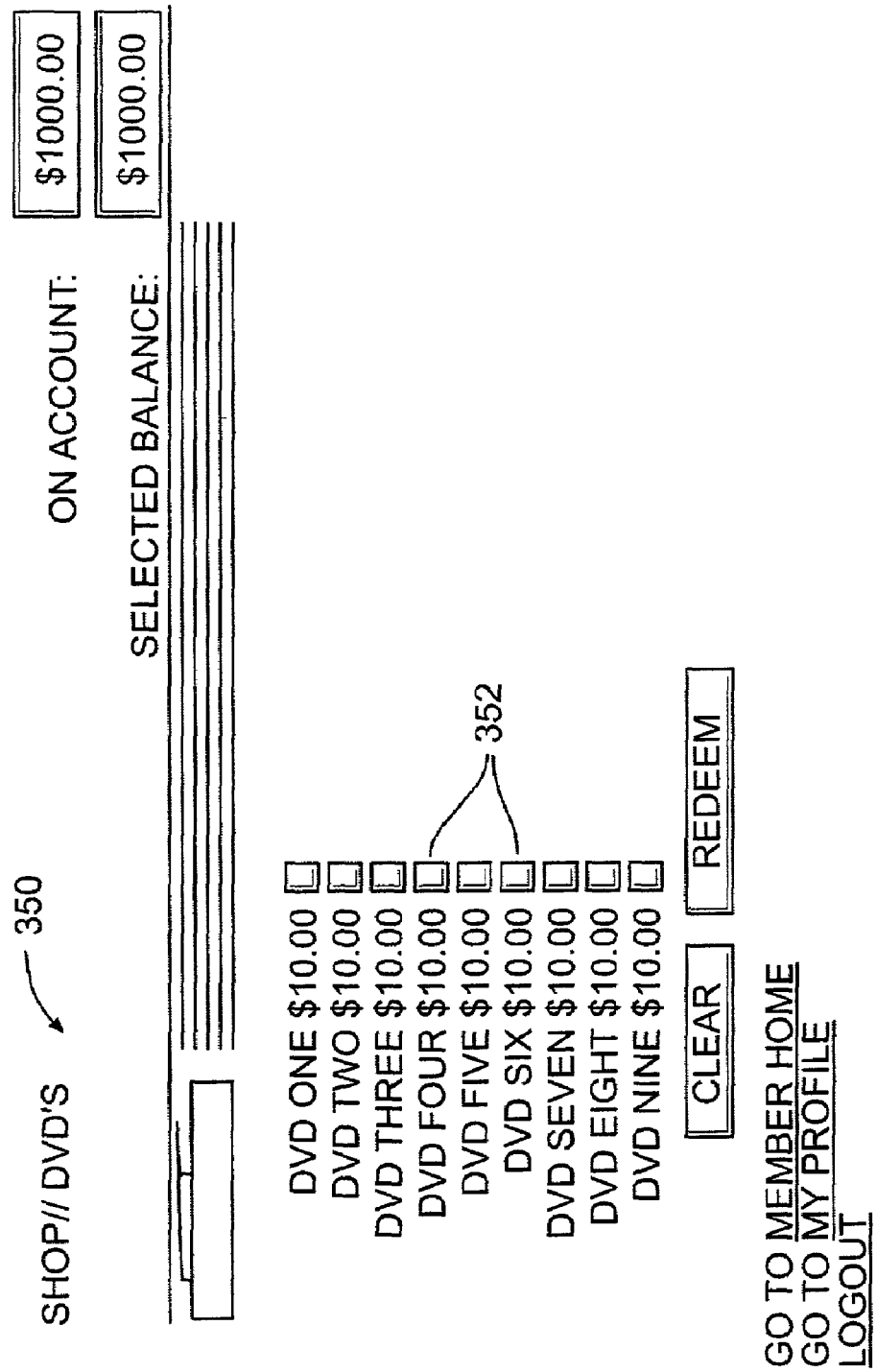

Redemption page 300 is illustrated in FIG. 3A. Redemption page 300 includes the balance on account 330 for the member. A link 310 is provided to allow the member to navigate to a personal account page that shows details regarding earnings, checks issued to them, electronic funds transfers, purchases, etc. A link 320 is provided to navigate the member to a page to request payment via check. Redemption page 300 also includes a plurality of links 340 to navigate the member to pages for purchase of various categories of items, such as for example, cosmetics, DVD's, toys, and clothing. An exemplary DVD page 350 is shown in FIG. 3B. DVD page 350 allows the member to select one more DVD's 352 to purchase using the earnings from the exchange.

Job postings page 400 is illustrated in FIG. 4. Jobs on job postings page 400 are preferably listed into problems folders in a manner similar to that described above with respect to member home page 100. Job postings page 400 allows a member to search for and review new jobs that have been posted on the exchange site. In one embodiment of the invention, a member can review all job postings either through job postings page 400 or through problems folder 160 that appears on member home page 100.

With reference now to FIG. 6, client home page 600 includes a plurality of links to other pages on the exchange web site. Link 610 navigates the user to a client submit page 700 as shown in FIGS. 7A, 7B, and 7C. Link 620 navigates the user to a client current jobs page 800 (FIG. 8) that allows the client to view the jobs currently posted on the exchange. Link 630 navigates the user to a client account page 900 (FIG. 9) that allows the client to review the client's account. Link 640 navigates the user to a favorite members page 1000 (FIG. 10) that allows clients to view favorite members selected by that client. Link 650 navigates the user to a private site login page 1100 (FIG. 11). Authorized users of the private site could then login to gain access to this aspect of the exchange of the present invention. Link 660 navigates the user to a client history page 1200 (FIG. 12) that allows the client to view a history of completed projects. Link 670 navigates the user to a logout page that allows the client to logout from the site in a manner known to those of skill in the art.

Turning now to FIGS. 7A through 7C, client submit page 700 is shown. Client submit page 700 includes a tag line section 710 for the client to enter a brief description or "tag line" that describes the job or project. A full description section 720 is provided which explains the job in full detail. Sections are provided for the client to select the text format for the solution (740), image format for the solution (750), and format for the solution (760), and video format for the solution (770). As would be readily apparent to one skilled in the art, not all formats will be applicable to every job. As shown on client submit page 700, the client selects the appropriate box (or boxes if more than one format is acceptable) with a mouse or other suitable type of pointing device. The selection could of course be done in other ways, such as through the use of drop-down menus, dialog boxes, or radio buttons as would be readily apparent to one skilled in the art. Moreover, the present invention is not limited to any particular format for the solution, either for text, image, sound, or video. Any format can be used that is suitable for transmission between communication devices, such communication devices including, but not limited to, computers, personal digital assistants, palm top computers, telephones, paging devices, computer terminals and the like. Suitable formats could include formats that produce digital files, compressed files, encrypted files, streaming media, and the like, including those now known to one skilled in the art, as well as those developed in the future.

Section 780 of client submit page 700 (see FIG. 7B) allows a client to select one or more groups of individuals for the pool of prospective problem solvers. Alternatively, the client can select "non-specific" if the client has no specific group preference. Further descriptions of the problem solvers can be entered into section 790 to provide further attributes if desired.

In section 715, the client selects the level or quality reputation rating of prospective respondents, for example, expert, high, medium, and base. Even though most clients would always want responses from the higher rated members, higher rated members may not be willing to accept a job at the price the client is willing to pay. In some instances a client is willing to accept solutions from lower rated members for economic or other reasons.

Section 725 allows a client to select a favorite member to be one of the prospective respondents for the job. In the embodiment shown in FIG. 7B, the default is shown as no particular member to increase the diversity of prospective respondents. If the client does want to target the job to a favorite member as one respondent, clicking on the down arrow displays a drop down list of favorite members previously identified by that client. The client can choose one or more of the listed favorite members for this job.

The number of responses to the job (or job quota) is selected by the client in section 735. The time period for which the job is posted is selected in section 745. The client can specify how long the client wants a member to spend solving the problem or working on the job in section 755. In one embodiment, this time period is the time between accepting the job and submitting a solution.

As shown in section 765 of FIG. 7C, a posting price is suggested to the client based on the criteria selected for the job (determined at least in part from similar prior transactions conducted on the exchange). Alternatively, a range of prices could be suggested to the client. In yet another alternative embodiment, the client could enter a price without any suggestions.

After completion of the information requested by client submit page 700, the job is submitted for posting by selecting submit button 775. Alternatively, client submit page 700 can be cleared of data by selecting clear button 785. If submit button 775 is selected, a client recap page 776 (FIG. 7D) is presented to the user that summarizes or recaps the job. If any entries or selections need to be changed or edited, the client can select a change selections link 777 to return to an appropriate section of client submit page 700 to carry out the editing. Alternatively, if the items present in client recap page 776 are correct, the job can be posted to the site by selecting a post to site link 778. To confirm that the job has been posted to the site, a client confirmation page 779 (FIG. 7E) is presented to the client. Client confirmation page 779 includes a link 799 to allow the client to view the job posted on the live exchange.

Client current jobs page 800 is shown in FIG. 8. Client current jobs page 800 provides a list of the jobs that are currently posted on the exchange for that client, as well as the status of the jobs. A link 802 is provided to allow the client to view the solutions that have already been submitted.

Client account page 900 is shown in FIG. 9. Client account page 900 includes a variety of client account information, including but not limited to, the total dollar (or other currency) value invested in services on the exchange, the number of jobs posted, the number of jobs completed, the number of current live jobs, the number of members solicited, the number of solutions submitted, the number of solutions accepted, and the current prepaid balance in the client account. Preferably, client account page 900 includes a link 902 to allow the client to view the master list of members who submitted solutions for all jobs of the client and a link 904 to allow the client to view the master list of members whose solutions have been accepted for all jobs of the client.

Favorite members page 1000 (FIG. 10) allows clients to view favorite members selected by that client. For each favorite member, page 1000 preferably identifies the member identification number, a description and job number for each job completed for that client (preferably with a link to job details), and notes by the client regarding the favorite member. A link 1010 is provided to view the entire member profile for each favorite member.

Private site login page 1100 is shown in FIG. 11. Authorized users of the private site login to gain access to this aspect of the exchange by entering a name and password in a well known manner. Private site login page 1100 allows an authorized user to gain access to a private exchange section, such as one conducted over an intranet, from the public exchange section implemented over a public exchange such as the Internet. In such an embodiment, clients (and members) could post and respond to jobs over the public exchange, as well as post and respond to jobs over a private exchange to which they had access as an authorized user. In this manner, creative talent can be solicited from a large number of sources, including members inside and outside of a particular organization or agency. Such an embodiment could be used, for example, in an advertising agency with multiple offices to solicit creative content from all offices for a particular job. Creative personnel in the advertising agency could respond to jobs posted on the public section of the exchange, as well as to jobs posted on the private section of the advertising agency.

Client history page 1200 (FIG. 12) allows the client to view a history of completed projects. In a preferred embodiment, all of the jobs listed on client history page 1200 are closed. Client history page 1200 preferably includes, for each listed job, a link 1202 to enable the client to view the solutions submitted for that job.

Clients (buyers of intellectual capital, such as creative services or content) can receive the deliverable from the member sellers in a variety of ways. Preferably, the content is delivered for exchange over a network (discussed above with respect to FIGS. 7A–7C). The client can return to the exchange site to retrieve solutions at the end of the job posting period, or during the period to check on responses submitted so far. Alternatively, all the responses can be sent to the client at the end of the job posting period via, for example, electronic mail. In another alternative embodiment, the client is notified by electronic mail when all responses have been received, or when the posting period ends.

One embodiment of a rating system of the present invention will now be described. As would be apparent to one skilled in the art, while the rating system described herein refers to the member's reputation, other types of ratings could also be used. In such an embodiment, the member's reputation rating is affected by explicit client ratings or quality assessments (such as a numeric scale of 1 to 5 with 1 being the lowest and 5 being the highest), and the occurrence of "reputation events" such as (1) a client adding the member as a favorite or designating the member as a preferred provider of services; (2) a client blocking the member or designating the member as an unacceptable provider of services; (3) a client targeting a job to the member as a special request or otherwise requesting the member to perform a particular job; (4) a client denying payment or refusing to compensate the member for a completed job; (5) non-delivery or failure to perform a job after accepting it; and (6) non-delivery or failure to perform a special request after accepting it. In a preferred embodiment, reputation rating is calculated on a category basis, that is, for a specific category of work. Categories of work can include, for example, creating slogans, writing copy, and designing logos. Client ratings and reputation events 1 through 4 occur on a category-specific basis, while reputation events 5 and 6 do not. Therefore, in calculating category reputation rating, client ratings and reputation events 1 through 4 vary across categories while reputation events 5 and 6 remain constant across categories. These ratings and events are given numerical values and weighted to compute the category reputation rating. In a preferred embodiment, the calculation of a member's reputation rating (RR) may be performed as follows:

$$RR = K*[SNR + N1*RE1 + N2*RE2 + \ldots + Nn*RNn]$$

wherein,

K is a constant,

SNR is the sum of all numerical ratings from clients regarding services performed by the member, Nn is the number of occurrences of a given reputation event, REn is the numerical value assigned for the occurrence of a given reputation event.

In a alternative preferred embodiment, the calculation of a member's reputation rating (RR) may be performed as follows:

$$RR = K*[SNR/NNR] + (1-K)*[N1*RE1 + N2*RE2 + \ldots + Nn*REn]$$

where,

K is a constant between 0 and 1 inclusive,

SNR is the sum of all numerical ratings from clients regarding services performed by the member, NNR is the total number of numerical ratings from clients regarding services performed by the member, Nn is the number of occurrences of a given reputation event, REn is the numerical value assigned for the occurrence of a given reputation event.

The specific manner in which reputation rating is calculated may vary according to the circumstances of implementation, and need not necessarily follow the formulae described above. Nevertheless, a specific example of a reputation rating calculation will now be provided, using a formula adapted from the first formula described above, as would be understood by one skilled in the art. It should be understood, however, that the present invention is not limited to the following calculation.

Client numerical rating: the 1 to 5 rating scale is normalized to a zero to one (0 to 1) scale (+0.2, +0.4, +0.6, +0.8, and +1, respectively). An average is computed based upon the last ten jobs in the category.

Numerical values for reputation events:

Added as a favorite: +1

Blocked by a client: −1

Targeted with a special request: +1.5

Deny payment: −2 (In a particularly preferred embodiment, this reputation event results in a total of −3 because the member is also automatically blocked for that client by the exchange system when the client denies payment for that member's work).

Failure to deliver: −2.5

Failure to deliver special request: −3

Assume a member has the following reputation statistics for the last ten jobs.

Client numerical ratings: 5,5,5,4,5,4,3,4,4,5

Added as favorite: 3

Blocks: 0

Targeted with special request: 1

Deny payment: 0

Job non-delivery: 0

Special request non-delivery: 0

The member's category reputation rating would be calculated as follows:

0.2[(sum of client numerical ratings)+(numerical value for "added as favorite"×number of occurrences)+(numerical value of "special requests"× number of occurrences)]/10×100%.

0.2[(5+5+5+4+5+4+3+4+4+5)+(3×1)+(1×1.5)]/10× 100%=97%

Preferably, special requests include jobs specifically targeted at, for example, favorite members, as well as follow-up requests to a member based upon a submitted job response. A member can receive a follow-up request based on a job submitted to a client even though that member may not have been designated as a favorite member by that client. In a follow-up request, a client wants additional information or additional work from the member related to the job and response. In a special request, a client targets a new job initially to a particular member.

The highest average quality of response at a given price can be ensured through a staged disclosure embodiment of the present invention. In such an embodiment, when any job is posted, it is only shown or disclosed to the highest rated members first. As time passes, lower rated members are shown the job until either the quota for responses is filled, or the deadline imposed by the client is reached. One factor for the staged disclosure system of the present invention is job fill rate, i.e., the rate at which job responses are delivered. The job fill rate will vary according to category, job post date, price of the job, the number of available jobs, and the time remaining before the deadline. Job exposure (or disclosure to members of various reputation ratings) is based upon the category reputation rating as described above.

Figure 13A:
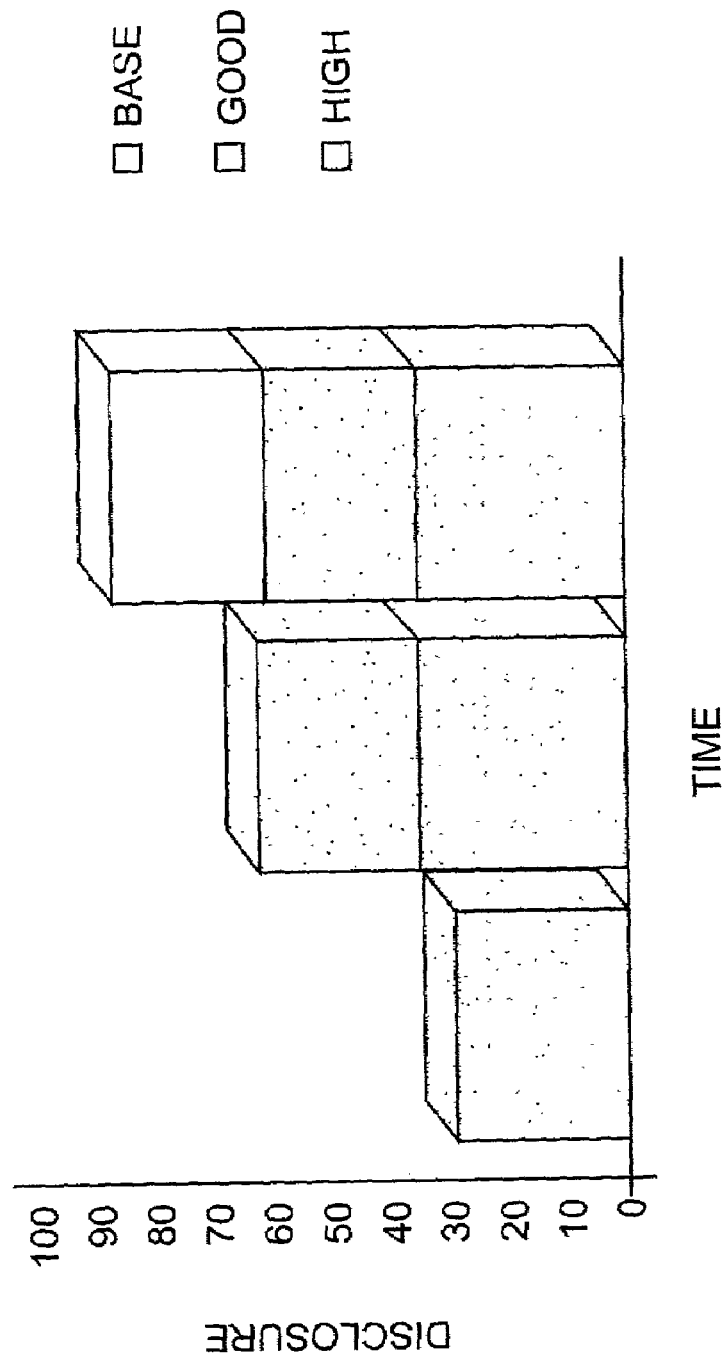
FIG. 13A depicts a graph of job disclosure percentage as a function of time for member reputation categories of high, good, and base.
Figure 13B:
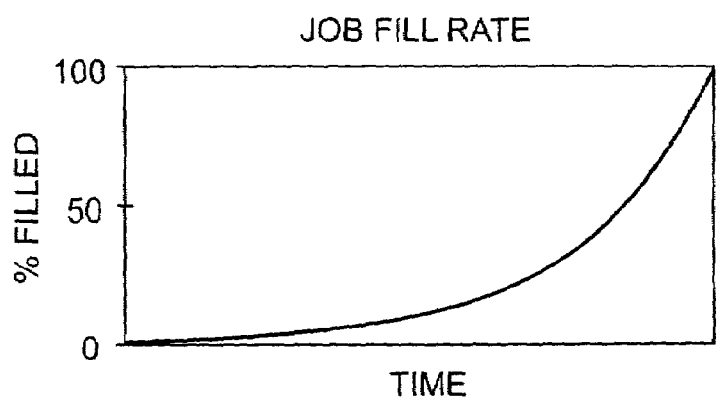
FIG. 13B depicts a graph of percentage of the job filled as a function of time (job fill rate)

Job fill rate and disclosure are balanced to ensure the highest quality of response (as a function of price) and delivery of all the responses requested by the client. FIG. 13A illustrates a graph of one embodiment of disclosure as a function of time. In the embodiment illustrated in FIG. 13A, members are divided into three categories, high, good, and base, depending upon their category reputation rating. As can be seen from FIG. 13A, the job is disclosed to members in the high reputation category throughout the available time period (3 bottom blocks), to members in the good reputation category later and for a shorter duration in the available time period (2 middle blocks), and to members in the base category the latest and for the shortest duration in the available time period (1 top block). FIG. 13B illustrates a graph of job fill rate, the percentage of the job that is filled or completed as a function of time. The higher the job fill rate early on, the later the job will be disclosed to lower ranked members. Similarly, the lower the job fill rate early on, the earlier the job will be disclosed to lower ranked members. The staged disclosure system of the present invention balances job disclosure to members and job fill rate so that the job quota of responses is filled by a client's deadline with the highest possible average respondent reputation rating.

Figure 13C:
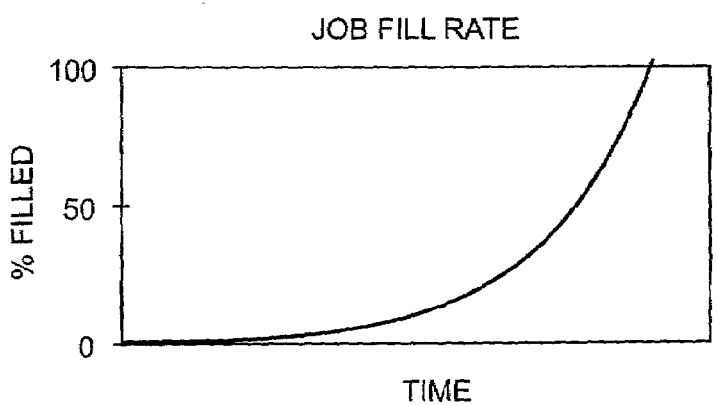
FIG. 13C depicts a graph of job fill rate for a situation in which the job was filled before the deadline.
Figure 13D:
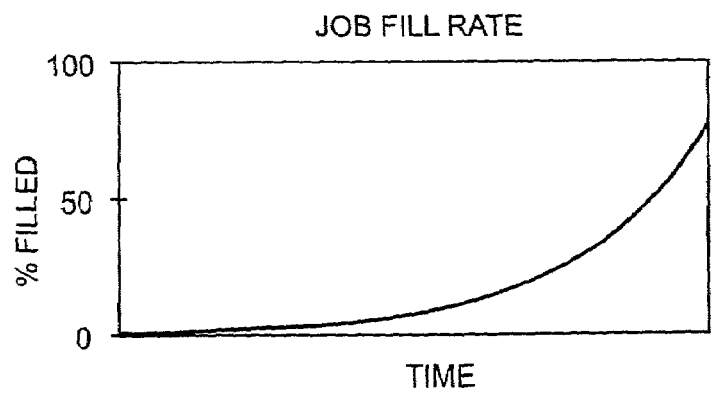
FIG. 13D depicts a graph of job fill rate for a situation in which the job was not filled before the deadline.

If the staged disclosure system does not provide an optimal balance between job disclosure and job fill rate then either a lower average respondent reputation rating will result or the quota will not be completed by the deadline. For example, if the job is disclosed to lower rated members too quickly, the quota of responses will be reached before the client's deadline, and the average respondent reputation rating will be lower than if the disclosure to the lower rated members was delayed. This situation is illustrated in the graph shown in FIG. 13C. Alternatively, if the job is not disclosed to lower rated members early enough, then the quota of job responses may not be reached before the client deadline. This situation is illustrated in the graph shown in FIG. 13D. In order to achieve an optimal balance of job disclosure and job fill rate, job disclosure is preferably monitored and adjusted throughout the available time period to ensure that the job quota is reached by a client's deadline with the highest quality responses from the highest possible average respondent reputation rating.

Figure 14:
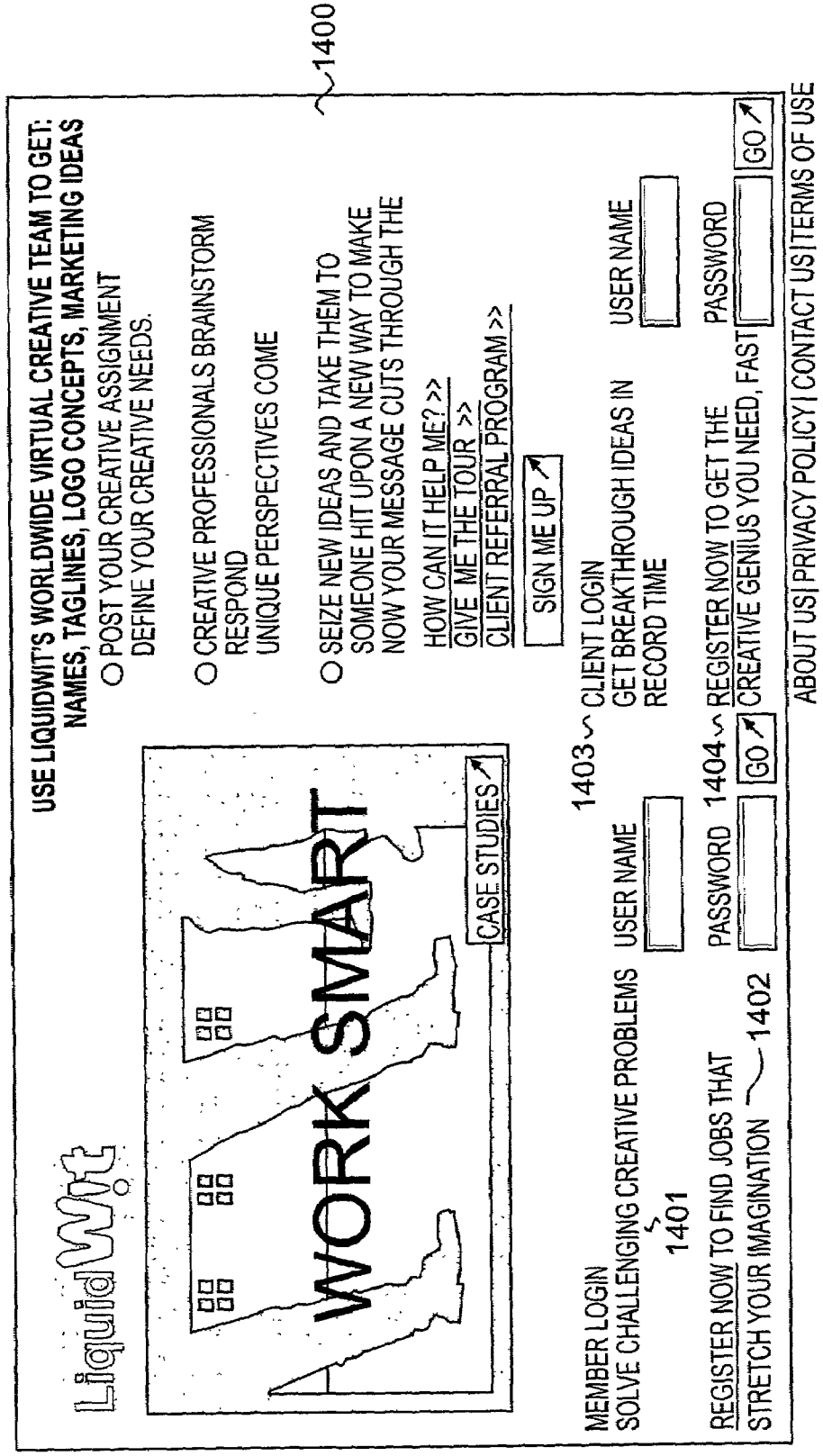
FIG. 14 depicts one embodiment of a combined member/client home page for an exchange of the present invention.

In an alternate preferred embodiment, the exchange of the present invention is again carried out on a public exchange such as the Internet using a series of HTML pages. This embodiment includes a combined member and client home page. As described above, there are two primary classes of users of the exchange: clients who are requesting intellectual capital, such as creative content or other services; and members who are providing the intellectual capital in response to a client request. An exemplary combined member/client home page 1400 is shown in FIG. 14. Once again, the pages depicted in these figures are illustrative and could be implemented in variety of ways. The present invention is not limited to any particular page layout, implementation or design.

With reference to FIG. 14, member login 1401 allows current members of the exchange to login by entering a user name and password. In this preferred embodiment, access to the member portions of the exchange are restricted to those individuals who have registered and obtained a user name and password. Home page 1400 also contains a link 1402 which navigates users to a member registration page, where non-members can submit registration materials in order to attempt to obtain a membership.

Similarly, home page 1400 also includes client login 1403, which allows clients to access the client portions of the exchange by entering a user name and password. Also included is link 1404 which navigates users to a client registration page, where users can submit registration materials to be registered as clients.

Figure 15:
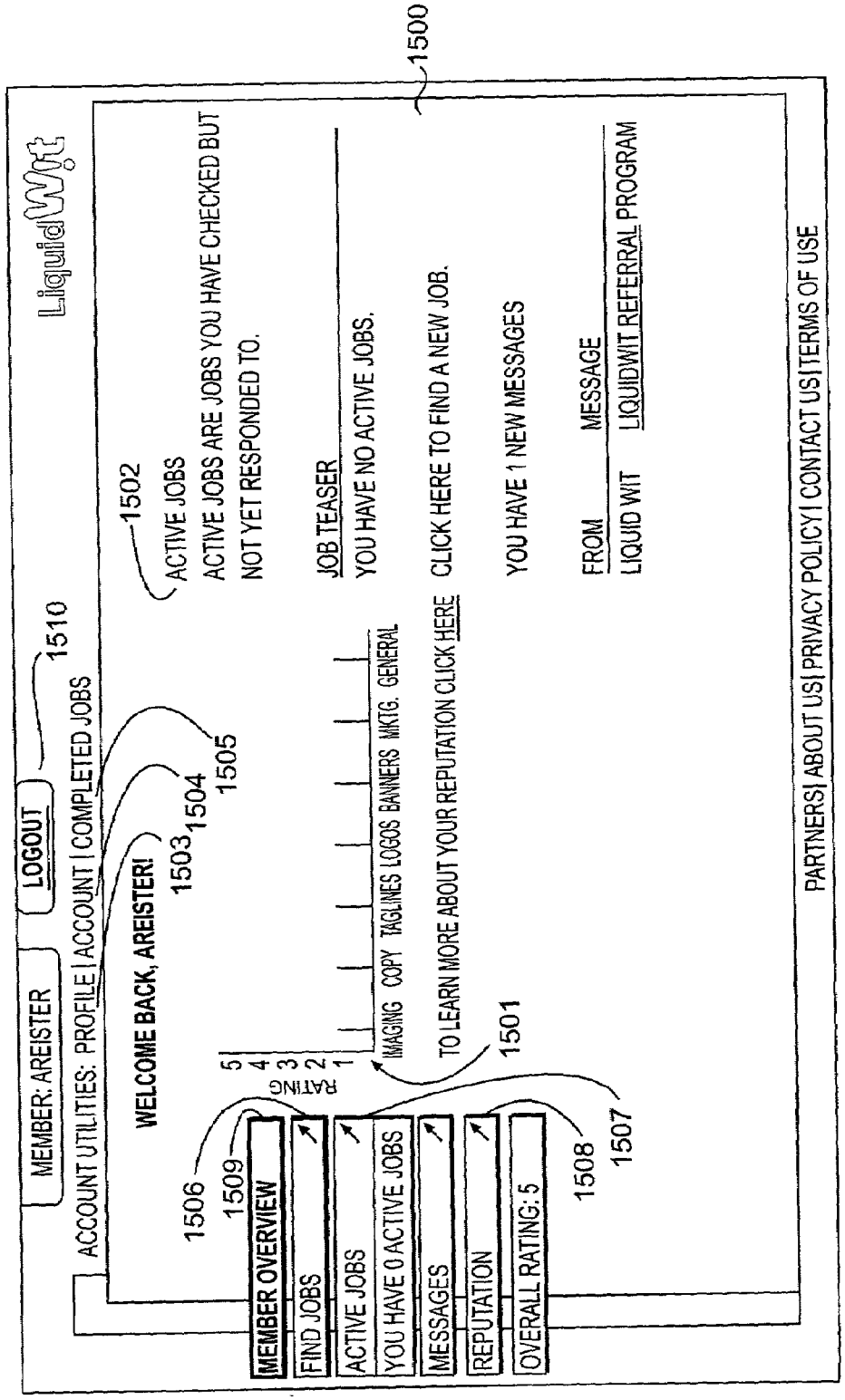
FIG. 15 depicts one embodiment of a member overview page for an exchange of the present invention.

Reference now will be made to the member portion of the exchange. Once successfully logged in, a member is taken to member overview page 1500, shown in FIG. 15. Preferably, member overview page 1500 contains reputation rating information chart 1501. Reputation rating information chart 1501 indicates the member's category specific reputation rating in several categories. Additionally, member overview page 1500 may also contain a list of active jobs 1502. Active jobs are jobs the member has "checked out" (selected to perform) but not yet completed. These may also be referred to as active or checked-out "capsules."

Member overview page 1500 may also include links to other pages on the exchange web site. Similar links may be found on the other member pages to allow for easy and convenient navigation of the member portions of the exchange. Link 1503 navigates the member to member profile page 1600, shown in FIG. 16A. Link 1504 navigates the member to member account information page 1700, shown in FIG. 17. Link 1505 navigates the member to member completed jobs page 1800, shown in FIG. 18. Link 1506 navigates the member to member find jobs page 1900, shown in FIG. 19A, where a member may search for and select new jobs. Link 1507 navigates the member to member active jobs page 2000, shown in FIG. 20. Link 1508 navigates the member to member reputation rating page 2100, shown in FIG. 21, which shows detailed reputation rating information. Link 1509 navigates the member to member overview page 1500. Finally, link 1510 allows the member to logout of the exchange, using techniques well known in the art, navigating the member back to home page 1400.

Member profile page 1600, shown in FIG. 16A, preferably includes member information 1601 such as name, e-mail address and screen name. This information may be edited by using link 1602, which navigates the member to a page where member profile information may be edited (not shown). In a preferred embodiment, while the member can edit the screen name, the exchange is able to track that user by means of another identifier that may not be changed. Thus, even if the member changes screen name, this new screen name will continue to be associated with the member's previous activity on the exchange (e.g., the reputation rating, listings as favorites, blocks etc.) Further, member profile page 1600 indicates the member's job preferences 1603. Thus the member may indicate which of the various job categories he/she prefers. Job categories may include, but are not limited to, taglines/slogans, copy, general, logo concepts, marketing concepts, ad banners, naming, and the like. Member profile page 1600 also contains notification preferences 1604, by which a member can request information of various types. Preferably, these notifications may be provided to the member using e-mail. In this particular preferred embodiment, job and notification preferences may be indicated by the member by clicking the appropriate boxes, using a mouse or other pointing device, and then selecting the "update" link 1606.

Figure 16B:
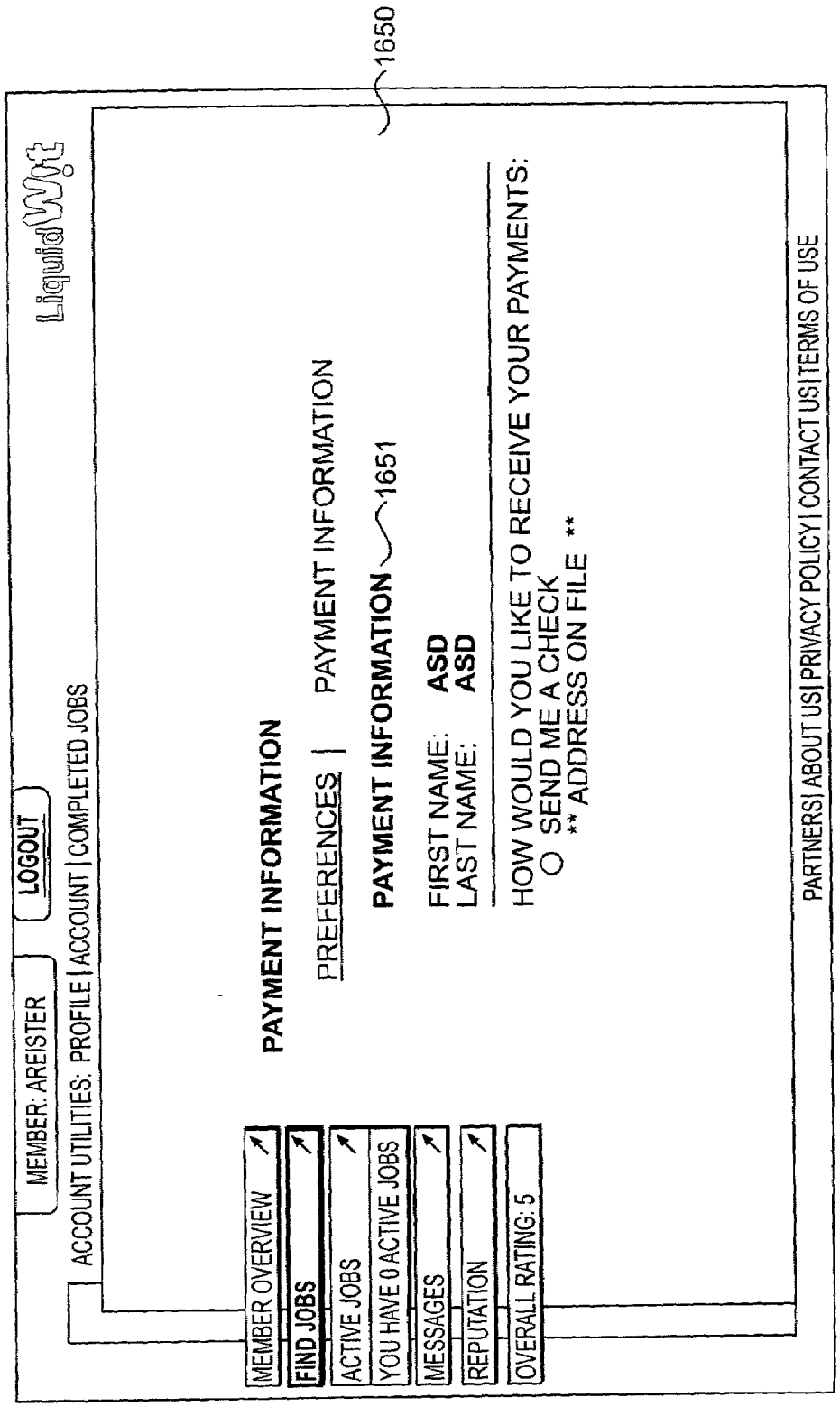
FIG. 16B depicts one embodiment of a member payment information page for an exchange of the present invention.

Member profile page 1600 also contains link 1605, which navigates members to member payment information page 1650, shown in FIG. 16B. Member payment information page 1650 includes payment information 1651, such as the name of the member, and the preferred payment method.

Figure 17:
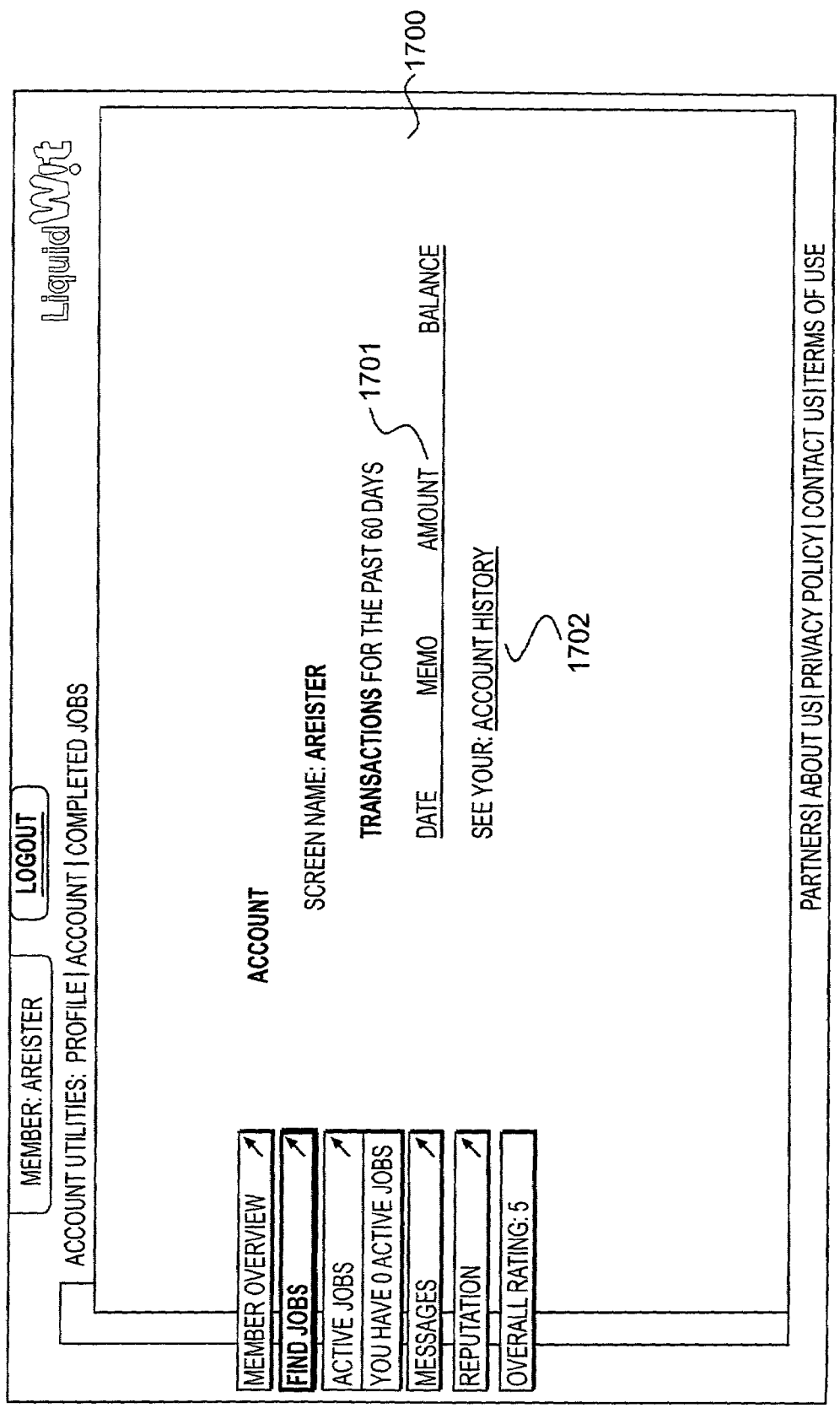
FIG. 17 depicts one embodiment of a member account information page for an exchange of the present invention.

Member account information page 1700, shown in FIG. 17, preferably includes transaction information 1701 relevant to recent transactions, such as the date of the transaction, a short memo describing the transaction, the amount of the transaction, and the member's balance. Member account information page 1700 may also contain link 1702 which navigates the member to member completed jobs page 1800.

Figure 18:
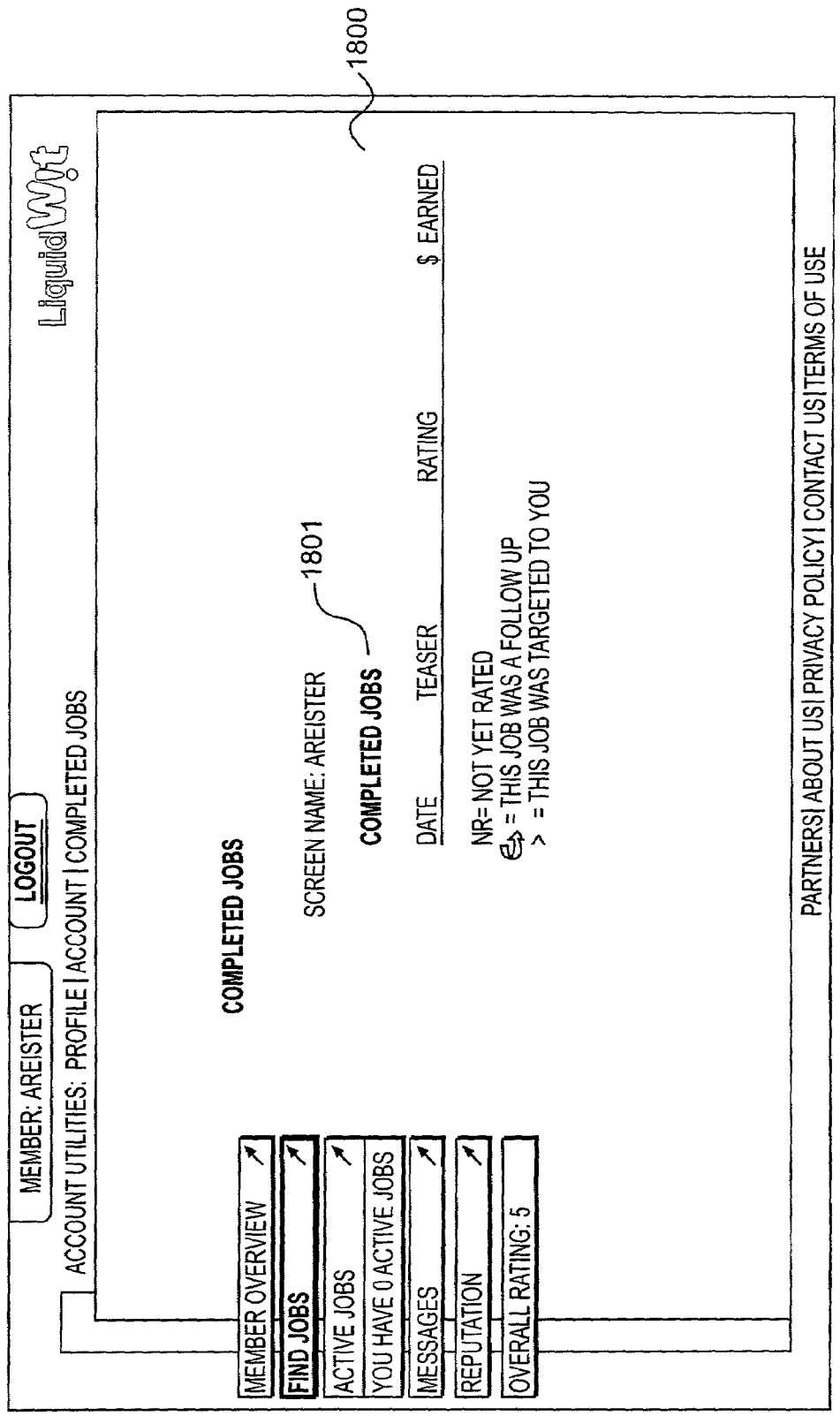
FIG. 18 depicts one embodiment of a member completed jobs page for an exchange of the present invention.

Member completed jobs page 1800, shown in FIG. 18, preferably contains completed jobs list 1801. Completed jobs list 1801 itemizes information relevant to jobs completed by the member, such as the date the job was completed, the job "teaser" or short description of the job (also referred to herein as the job "tag line"), the rating that the client gave the member for the job, and the amount earned for completing the job. Additionally, completed jobs list 1801 contains an indication of whether the job was a follow up or whether the job was specifically targeted to the member.

Figure 19A:
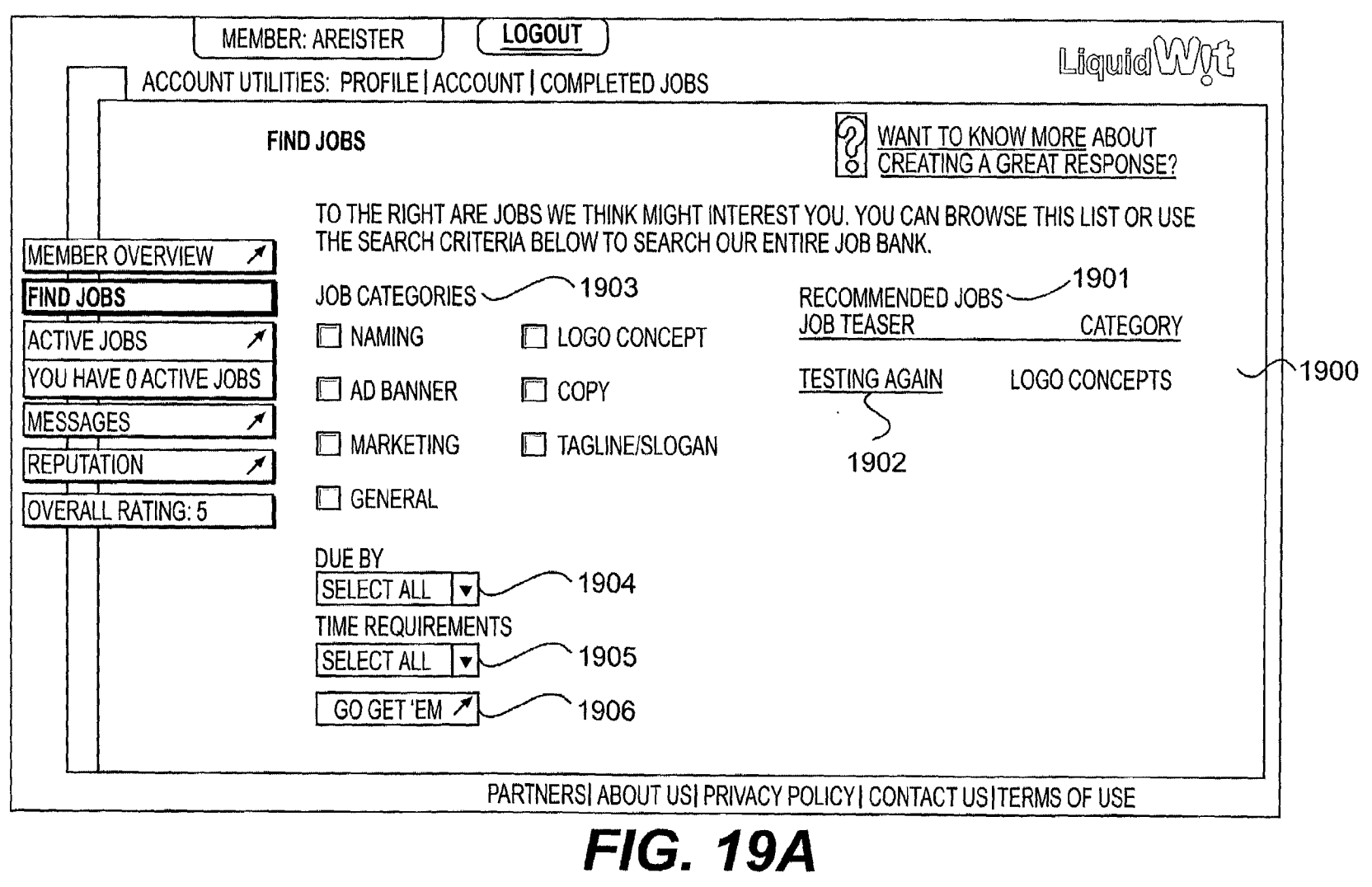
Figure 19B:
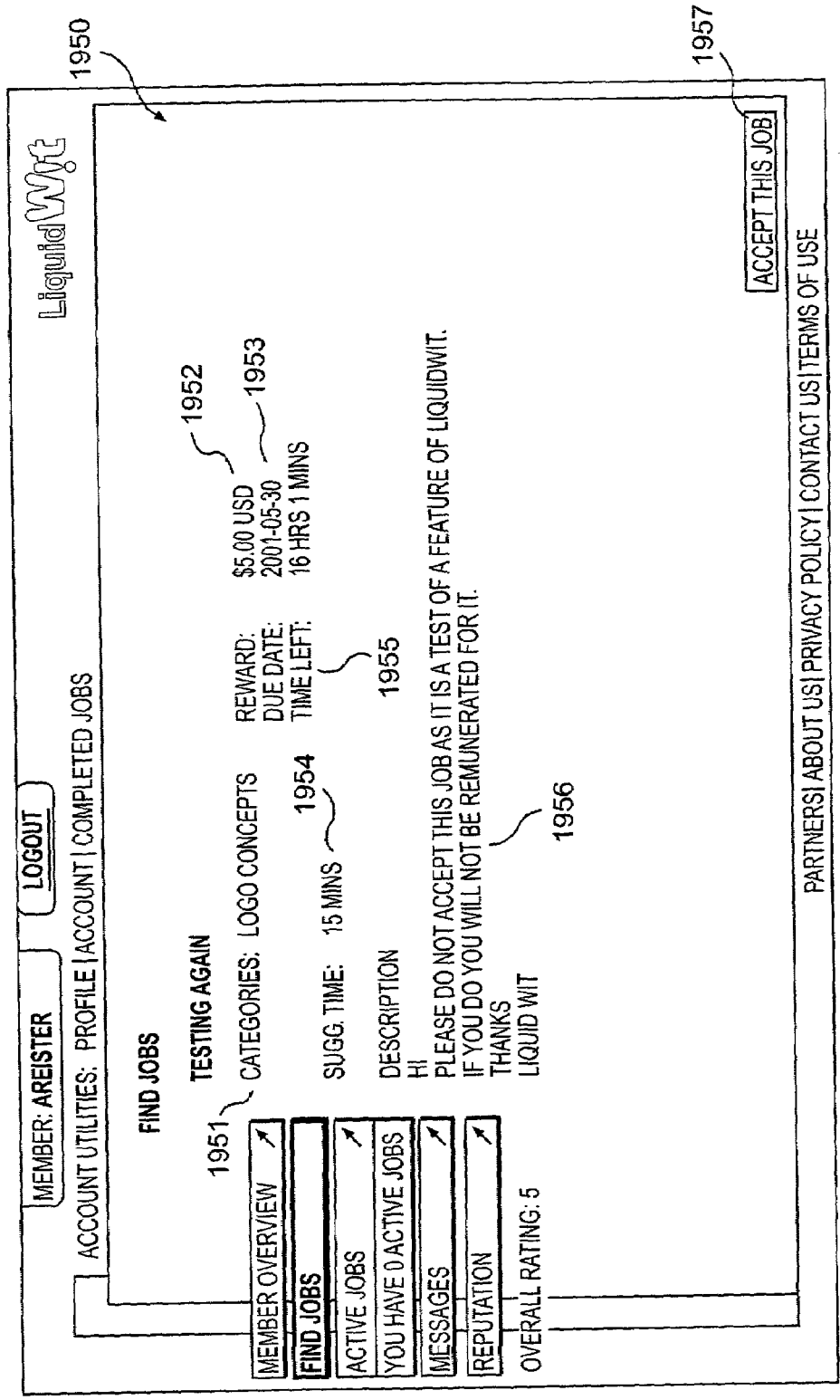
FIG. 19B depicts one embodiment of a member job description page for an exchange of the present invention.

Member find jobs page 1900, shown in FIG. 19A, preferably provides a recommend jobs list 1901, itemizing jobs available for the member to perform and indicating the job teaser and the category to which the job belongs. Each listed job may be referred to as a "capsule." Preferably, each job contains a link 1902, which navigates the member to job description page 1950 for that particular job, an example of which is shown in FIG. 19B. Member find jobs page 1900 may also contain a job searcher 1906. By indicating the desired job category or categories 1903, the desired due time 1904, and the desired time requirements 1905, the member may search for additional jobs. Preferably, the job request is identified as a follow up, targeted job request, or general request, such as by use of a particular icon for each job type.

The intellectual capital exchange of the present invention also allows members to forward jobs or "capsules" to others, including members and non-members. This feature provides the ability for members of the exchange to give another the opportunity to perform the job. Members are likely to forward a job because they themselves do not have the time, desire and/or skill to do the specific job reviewed but know another who may. Members who forward jobs may be called "connectors" and, in a preferred embodiment, a "connection rating" may be developed for members, which may help their overall reputation rating in the exchange, as they are adding value to other members and clients. Such forwarding may occur using the exchange directly, when the member knows the other member's "alias" on the exchange, by e-mail, or by other similar methods that are known in the art. When a member receives a forwarded job, that member can then choose to login to the exchange and see the job on their find jobs page (FIG. 19A). As with follow ups and targeting, forwarded jobs are identified as such, for example by means of a unique icon differentiating them from standard jobs.

If the job is forwarded to someone via, for example, an email gateway within the exchange and that person is not a member of the exchange, that person will have to register before they can get to and perform the job.

Member job description page 1950, shown in FIG. 19B, provides additional information about a particular job. The job category 1951, the reward 1952, and the due date or time 1953 may be listed. Additionally, suggested time 1954, which indicates the approximate amount of time required to complete the job, and time left 1955 before the due date or time 1953 may be listed. Further, a more detailed description of the job requirements may be provided at description 1956. Link 1957 is utilized to indicate acceptance of the job or capsule. Once the job is accepted, it becomes an "active job." At that point, the member may perform the job requested by the client, and submit the response, also referred to as "capsule delivery." Preferably, responses are submitted electronically by members to the exchange, so that exchange can directly post the responses on client new response listing page 2620 (FIG. 26B). Alternatively, the job response may be delivered in any number of ways, such as by e-mail.

Figure 20:
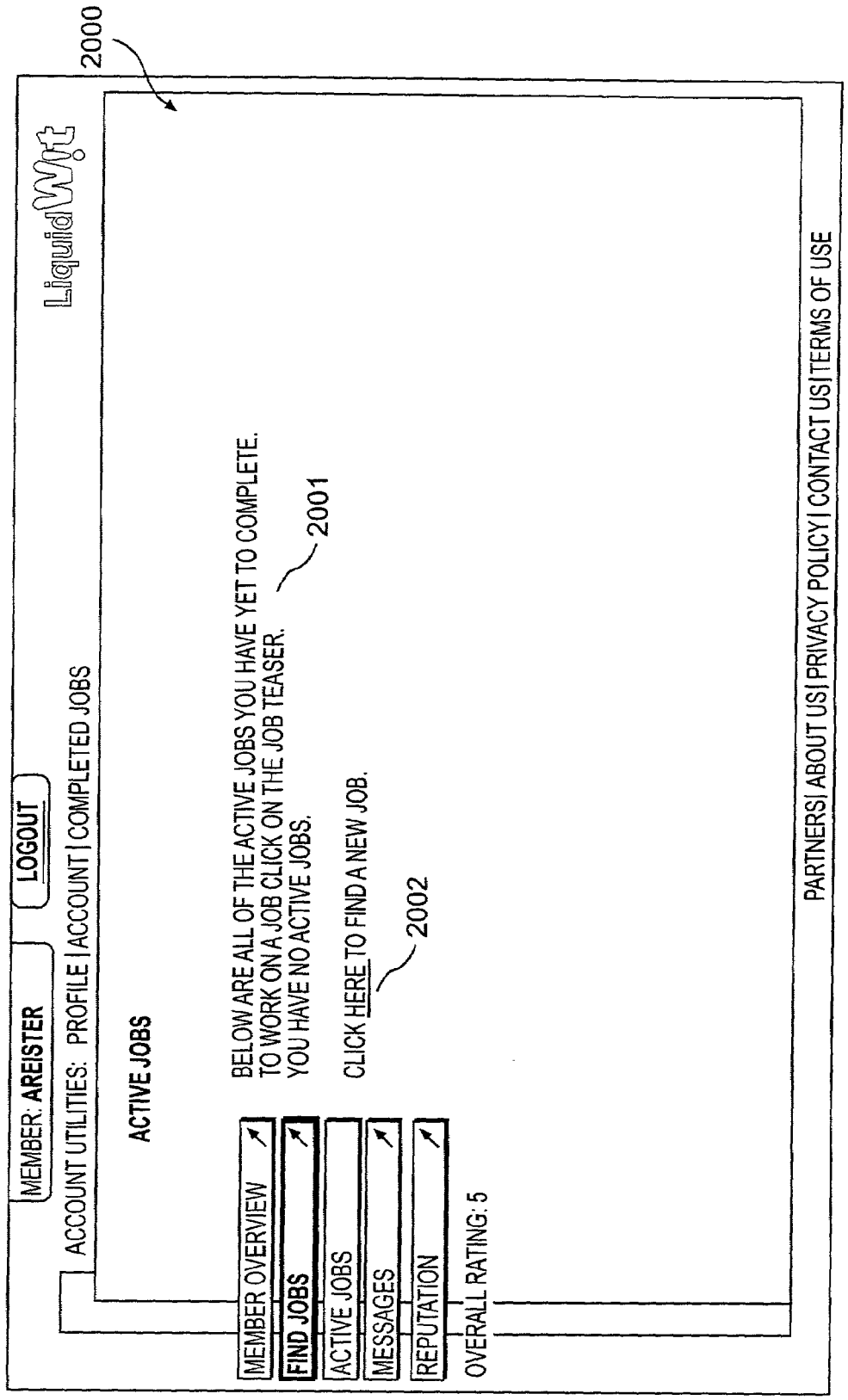
FIG. 20 depicts one embodiment of a member active jobs page for an exchange of the present invention.

Member active jobs page 2000, shown in FIG. 20, preferably includes an active jobs list 2001, in which the jobs that have been accepted, but not yet completed by the member are itemized. Member active jobs page 2000 may also contain link 2002, which navigates a user to member find jobs page 1900, described above.

Because there are only a certain number of jobs available for members on the exchange at any given time, it is desirable to limit the number of active jobs for each member. This may also be referred to as "capsule limiting." This will prevent particular members from accepting a large number of jobs, effectively preventing other members from participating in the exchange. Thus, in a preferred embodiment, each member is limited to a set number of jobs that can be "active" at any given time. For example, a member may be prohibited from accepting a job when that member has already accepted five jobs that he/she has not yet completed. In an alternate embodiment, the maximum number of "active" jobs for each member could vary based on that member's past performance. Thus, members that submit timely responses to accepted jobs may be permitted to maintain more active jobs than members who are chronically late. Finally, the maximum number of active jobs for each member may be limited based on total number of job available on the exchange. For example, if the total number of jobs available greatly exceeded the number of members available to perform those jobs, then the limit on the number of active jobs may be set at a high level. If, on the other hand, the number of active jobs is low compared to the number of available members, the limit on active jobs may be lowered.

Member reputation rating page 2100, shown in FIG. 21, preferably contains additional detail regarding the member's reputation rating. Member reputation rating page 2100 may contain reputation rating information chart 2101, which indicates the member's category specific reputation rating in several categories. As described in detail above, a category specific reputation rating may be computed for each member based on explicit client ratings received for jobs performed in those categories, as well as the occurrence of reputation events, such as being designated a "favorite member" or being "blocked" by a client. Statistical summary 2102 contains additional information about the occurrence of reputation events, which are described in detail above. Additionally, category reputation rating list 2103 includes the explicit client ratings received by the member for performance of jobs in the various categories. Various methods by which reputation rating may be calculated, using information such as reputation events and explicit client ratings, are described above.

Figure 22:
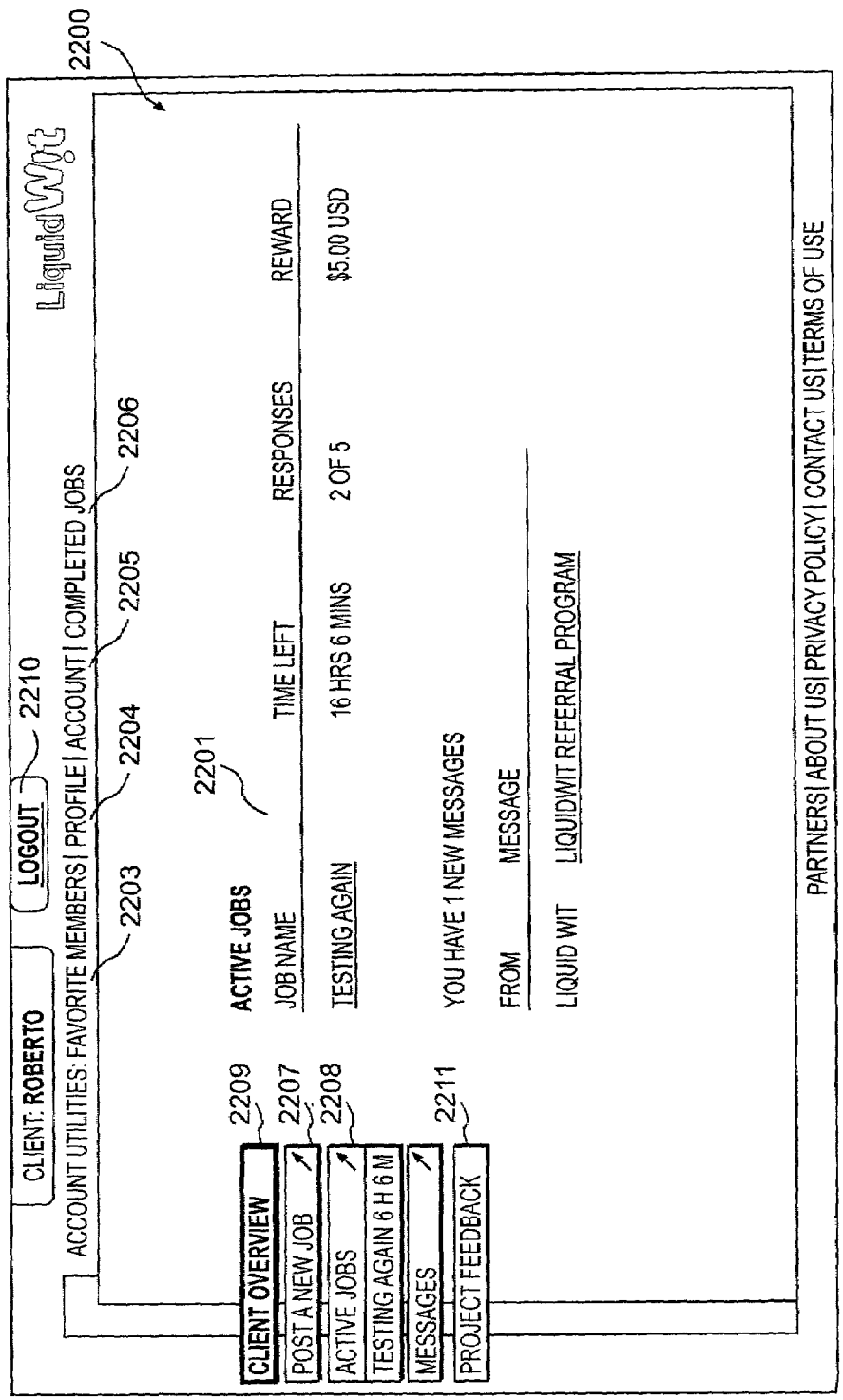
FIG. 22 depicts one embodiment of a client overview page for an exchange of the present invention.

Now will be described the client portion of the exchange. After a successful client login at page 1400, a client is taken to client overview page 2200, shown in FIG. 22. Client overview page 2200 preferably contains client active jobs list 2201. Client active jobs list 2201 may contain information about the jobs that the client has posted on the exchange such as the job name, the time left before the due time, the number of responses received, and the reward owed to the members. Using active jobs list 2201, the client is able to monitor the progress of posted jobs.

Client overview page 2200 also preferably contains several links to other pages on the client portion of the exchange. Similar links may be found on the other pages on the client portion of the exchange to allow for convenient navigation of the site. Link 2203 navigates clients to client favorite members page 2300, shown in FIG. 23A, where clients may review members designated as favorite members. Link 2204 navigates clients to client profile page 2400, shown in FIG. 24, where the client can review and edit identification information. As with members, clients can edit screen names. However, the exchange associates previous activity with the edited screen name. Link 2205 navigates clients to client account page 2500, shown in FIG. 25, where clients can review recent transactions. Link 2206 navigates clients to client completed jobs page 2600, shown in FIG. 26A, where the client can review completed jobs. Link 2207 navigates clients to client job post page 2700, shown in FIG. 27A, where the client can initiate the process of posting new job. Link 2208 navigates clients to client active jobs page 2800, shown in FIG. 28, where the client can review currently active jobs that he/she has posted. Link 2209 navigates the client to client overview page 2200. Finally, link 2210 allows the client to logout, in a manner well known in the art, and navigates the client to home page 1400.

Figure 23A:
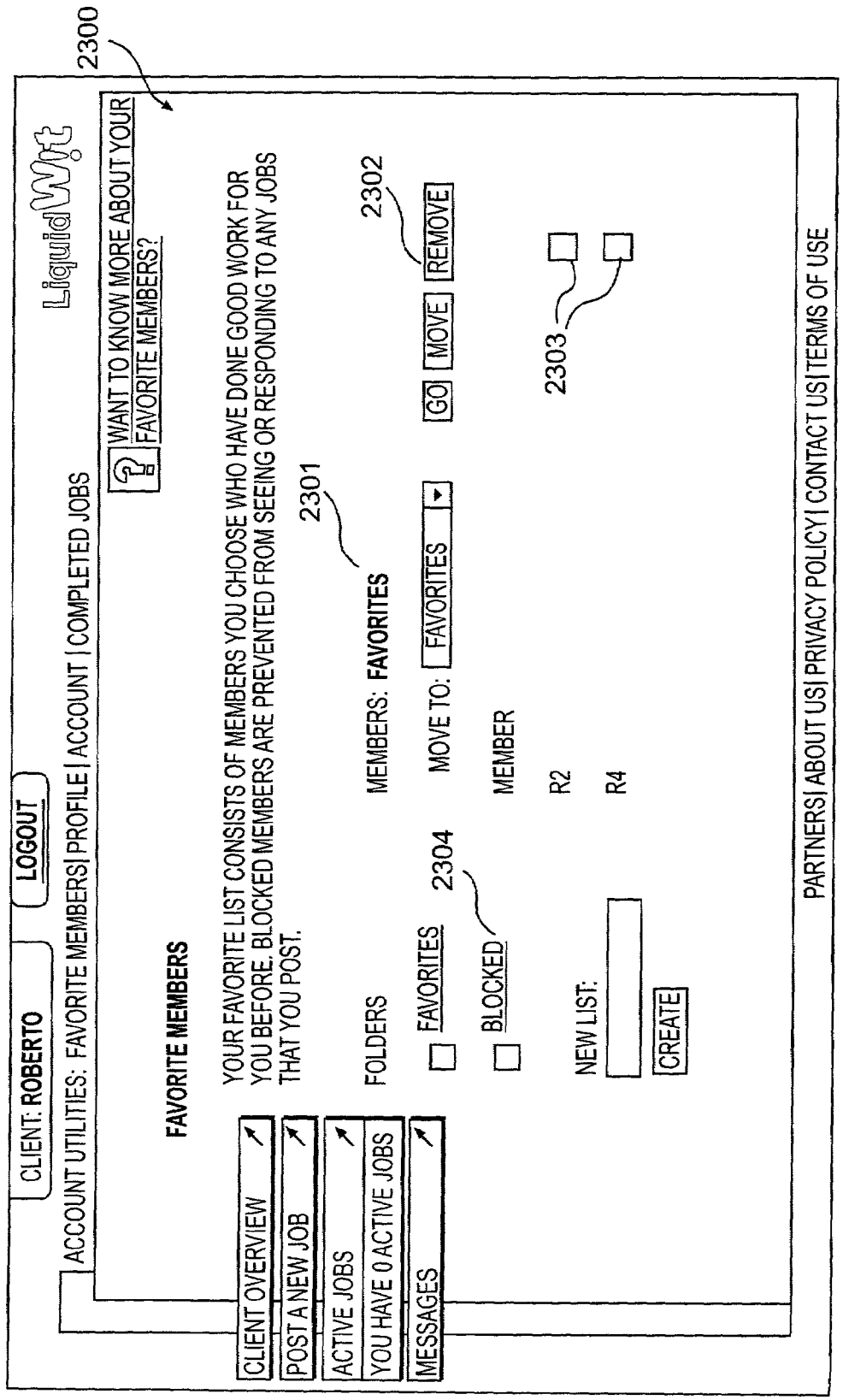
FIG. 23A depicts an alternative embodiment of a client favorite members page for an exchange of the present invention.
Figure 23B:
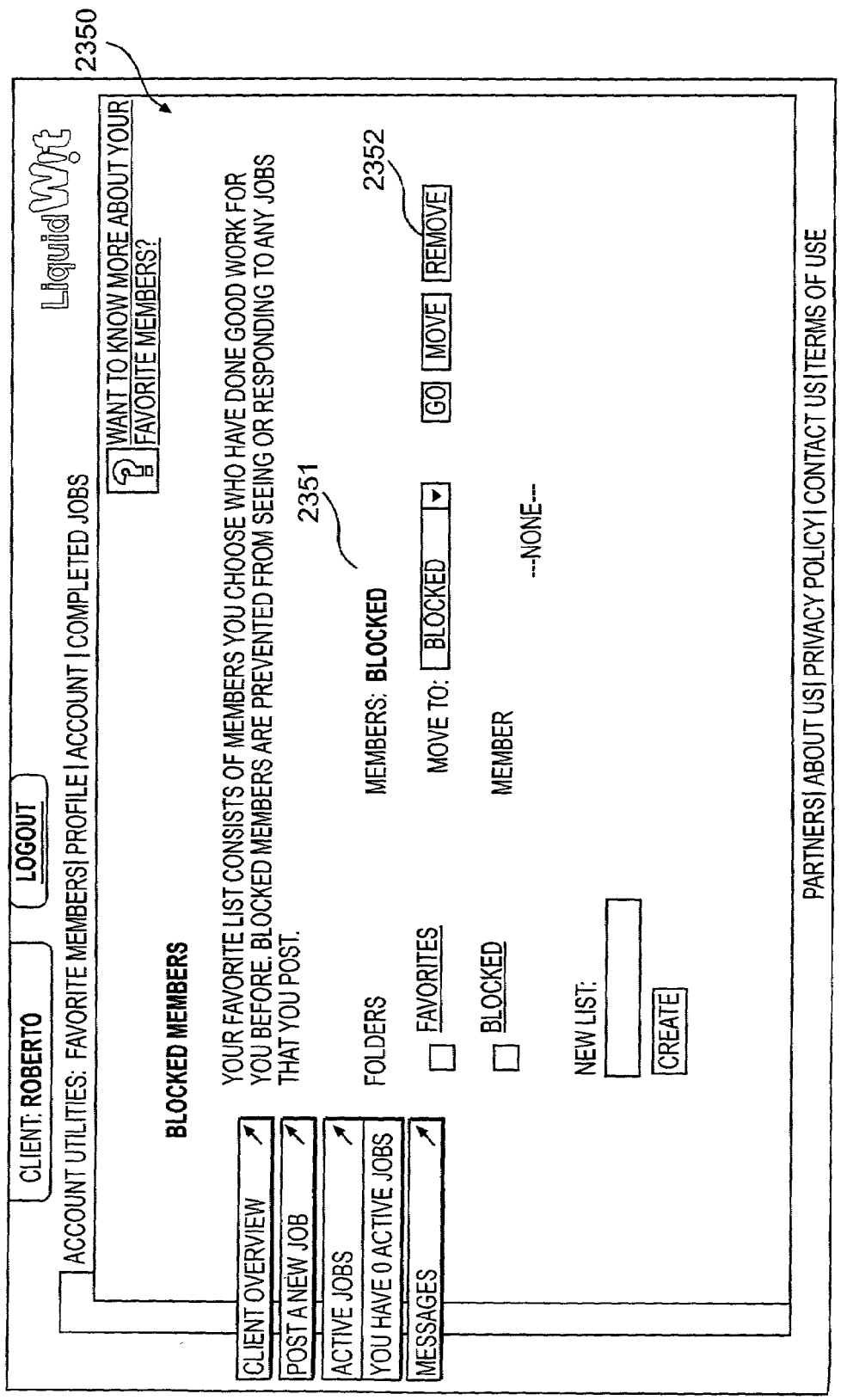
FIG. 23B depicts one embodiment of a client blocked member page for an exchange of the present invention.

Client favorite member page 2300, shown in FIG. 23A, preferably includes favorite member list 2301. Favorite member list 2301 may contain the names of members designated by the client as "favorite members." A client may choose to designate a member as a "favorite member" after a particularly good response. As described above, designation as a favorite member also impacts the reputation rating of the member. Additionally, clients may remove members from the favorite member list. This is done by using checkbox 2303 to indicate which member or members should be removed. Then, link 2302 may be selected to remove the members so indicated. Additionally, link 2304 navigates a user to client blocked member page 2350, shown in FIG. 23B. Preferably, when a client designates a member as a "blocked member," no jobs from that client will be revealed to that member, and the member's reputation rating is affected. Client blocked member page 2350 contains blocked member list 2351. Similar to favorite member page 2300, the client may remove members from the blocked member list using link 2352. In addition to "favorite" and "blocked" members, clients can create additional folders containing lists of members for various purposes. Thus, a client could create a folder that contains a list of members who are particularly skilled at tag lines. Further, the client could create a hierarchy of folders. Thus, within the "favorite" member list, the client could identify a sub-set of particularly favorite members.

Figure 24:
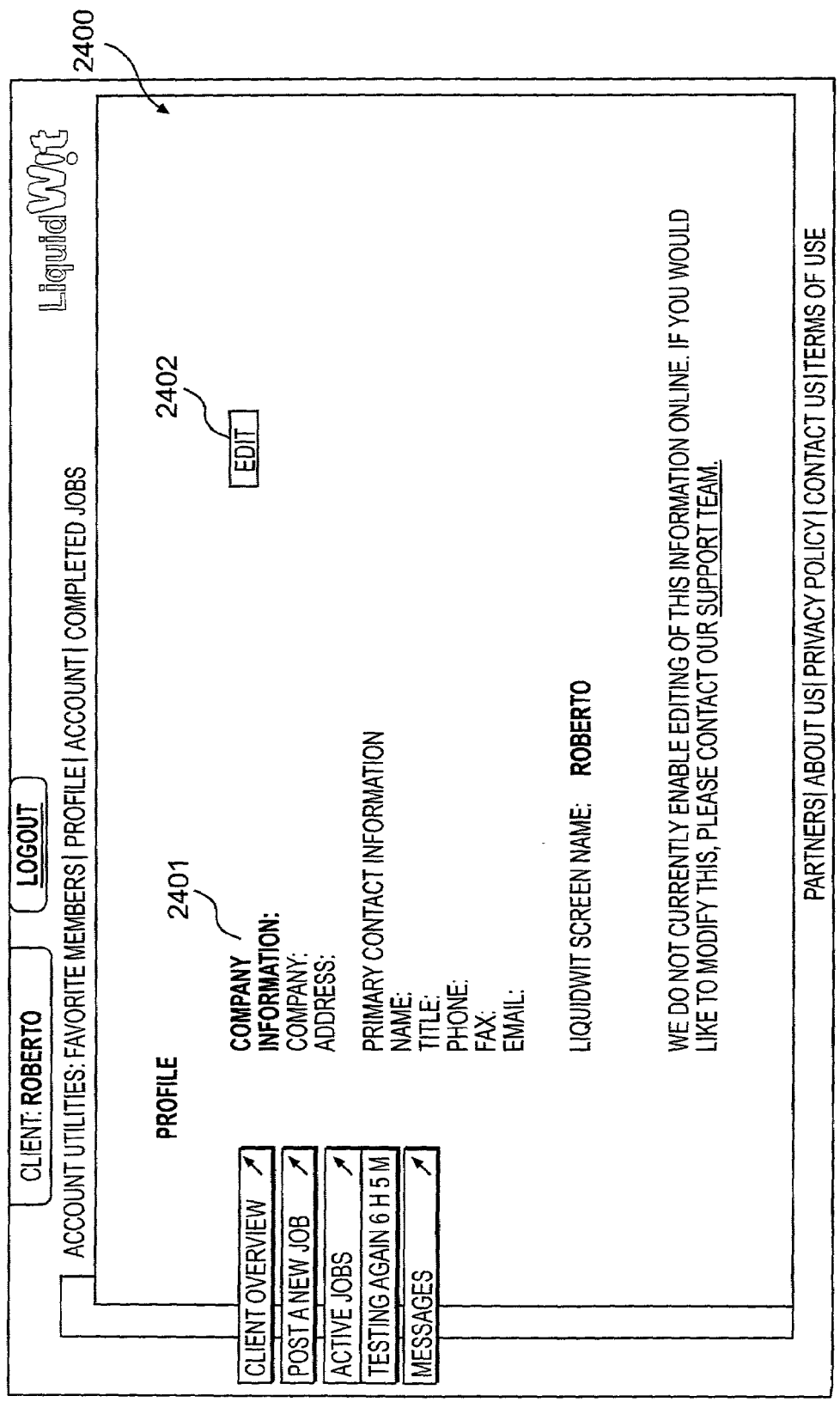
FIG. 24 depicts one embodiment of a client profile page for an exchange of the present invention.

Client profile page 2400, shown in FIG. 24, preferably contains company information 2401 regarding the client, such as company name, address, and contact person information. Link 2402 navigates the client to an edit page, not shown, where the client may edit company information 2401, using techniques well known in the art. Alternatively, the exchange may prevent the on-line editing of company information 2401, and require the client to edit the information in some other manner, such as by telephoning a service representative.

Client account page 2500, shown in FIG. 25, preferably contains transaction list 2501. This transaction list may include information such as the date of the transaction, a short description of the transaction, the amount, and the balance due. This transaction list may be limited by some specific period of time (e.g., only showing transaction occurring during the previous 90 days), and may contain other information as necessary or desirable in a particular circumstance.

Client completed jobs page 2600, shown in FIG. 26A, preferably contains a completed jobs list 2601. Completed jobs list 2601 includes information regarding completed jobs such as the date of completion, the job name, the cost, and the number of responses. Links 2602 navigate the client to client new response listing page 2620, shown in FIG. 26B, where the client may review responses newly submitted by members.

Client new response listing page 2620 (FIG. 26B) preferably includes new response list 2621, which contains a listing of all new (un-rated) responses to the job request. Client new response listing page 2620 may also contain additional information about the job, such as the category of the job, the day it expired, the reward, the suggested time, the number of times the job was viewed by members, the number of responses completed, the number of responses in progress, the number of remaining desired responses, and the total number of requested responses. Preferably, the client may access each response by using a link, such as link 2622, which navigates the client to client detailed response page 2650, shown in FIG. 26C, and described below. Further, link 2625 navigates the client to client full description page 2690, shown in FIG. 26E, where the client may review additional information about the job.

Figure 26D:
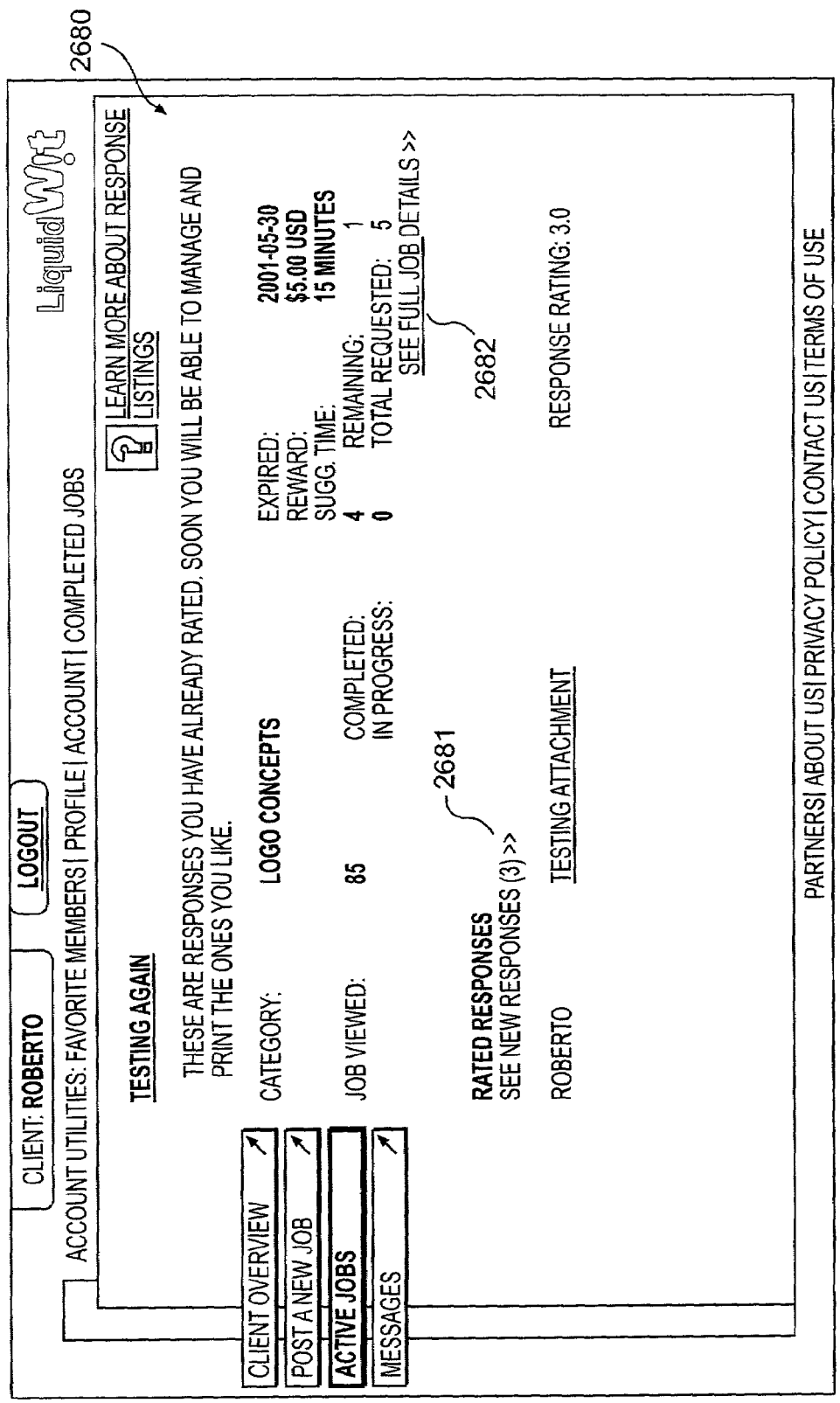
FIG. 26D depicts one embodiment of a client rated response page for an exchange of the present invention.
Figure 26E:
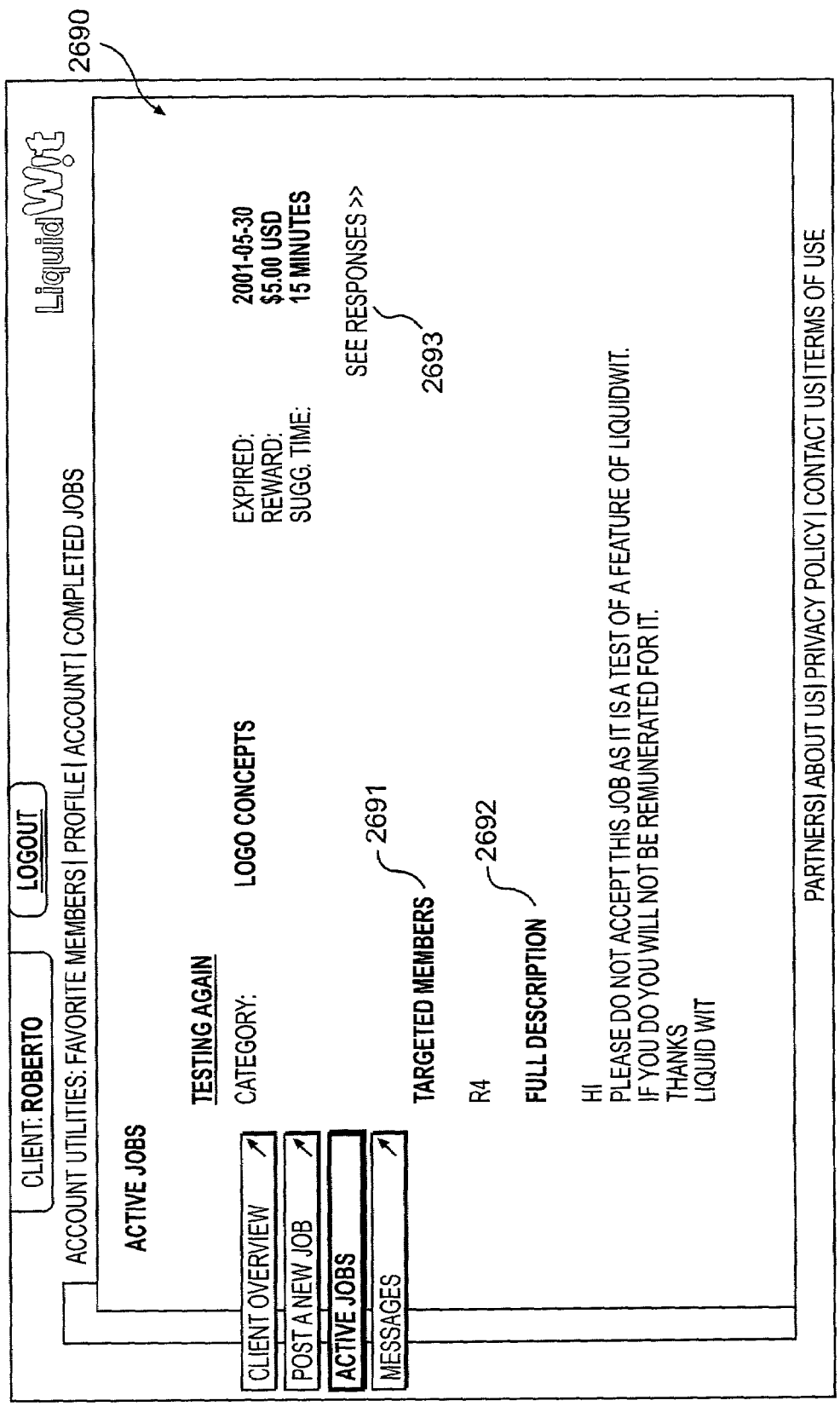
FIG. 26E depicts one embodiment of a client full description page for an exchange of the present invention.
Figure 27B:
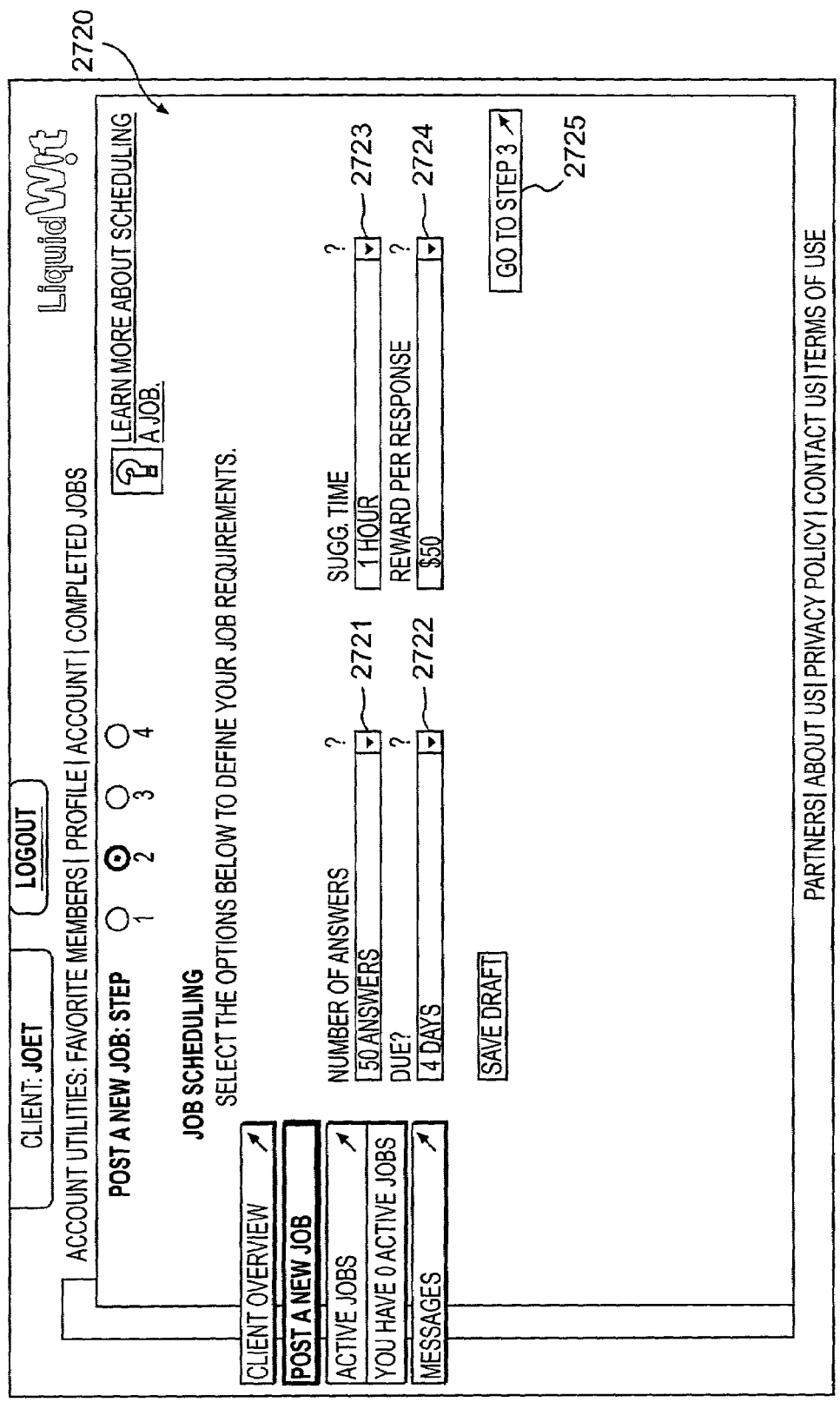
FIG. 27B depicts one embodiment of a client job scheduling page for an exchange of the present invention.

Responses may be rated from client new response listing page 2620 (FIG. 26B). "Radio buttons" or circles 2623 may be used to select the rating of the response; selecting box 2624 submits the selected rating. Finally, link 2626 navigates the client to client rated response page 2680 (FIG. 26D), which includes a listing of responses that have been rated by the client for this particular job.

Client detailed response page 2650 (FIG. 26C) preferably includes the detailed response 2651 that was submitted by the member. Additional information about the job, such as job category, may also be shown. Furthermore, the client may submit a rating for the response using radio buttons or circles 2652 and link 2653 in a manner described above or known in the art. In addition to rating the response, the client may also designate the member as a favorite member using link 2654, block the member using link 2655, or submit a follow up assignment to the member using link 2656. Designating the member as a favorite or blocking the member causes that member to appear in the appropriate listing in FIGS. 23A-B. A follow up assignment is a new job posted by the client to the member that the member is free to accept or reject. It usually involves a request for additional information or additional work from the member related to the current job and response. Preferably, being targeted for a follow up assignment affects the reputation rating of a particular member, preferably in a positive manner. A client follow up page 3000 (FIG. 26F), is described in more detail below.

Client rated response page 2680 (FIG. 26D) preferably contains a rated response list 2681, which includes the responses that have been rated for a particular job. Encouraging the clients to promptly and accurately provide ratings for responses is advantageous to the staged disclosure system. Thus, in a preferred embodiment, the client is able to manage, e-mail and print the responses appearing in rated response list 2681, but not those appearing in new response list 2621. Finally, link 2682 navigates the client to client full description page 2690, shown in FIG. 26E, where the client may review additional information about the job.

Client full description page 2690 (FIG. 26E) includes additional information about the job, such as a list of targeted members 2691 and a full description of the job requirements 2692. The targeted members list contains those members specifically selected by the client for disclosure of the job request, as described below. Link 2693 navigates the client to client new response page 2620 (FIG. 26B).

Client follow up page 3000 (FIG. 26F) allows the client to post an additional job request to a member who had previously responded, or to other members as desired by the client. For example, the client may wish to ask a specific member to build on a previously submitted response. Alternatively, a team of members could be asked to deliver fresh responses to a job request that had previously been posted. This follow up process could take place at any time, including after the initial job request has been completed and the responses archived in the client completed jobs page (FIG. 26A). Client follow up page 3000 has description box 3001 where the client can input the follow up job request. In boxes 3002, 3003, and 3004, the client can input the due time for responses to the job request, a suggested amount time that the member should spend working on a response, and an amount of compensation that the client will pay for responses, respectively. From list 3005, the client may identify, such as by checking a box or other method known in the art, which member(s) the follow up request should be posted to. After the client has entered the above-described information, the client can post the job by selecting link 3006.

Client job post page 2700, shown in FIG. 27A, facilitates the creation and submission of new jobs by clients. Preferably, in the first step in the process, the client creates a job brief by filling out form 2701. The client gives the job a name for internal reference, which could also identify an organizational project or initiative, and enters that name in box 2702. Preferably, this name is not disclosed to the members. A client may post several job requests using a single internal reference name. For example, several job requests may relate to a single project that the client is undertaking. As clients enter these internal reference names, the exchange stores these names. When the client then posts a subsequent job, a list of previously used internal reference names may be presented to the client. Furthermore, the list of previously used internal reference names may be presented to clients other than the client who entered the internal reference name. This may be particularly useful when the exchange is implemented within an organization, such as on an intranet.

Additionally, the client provides a "job teaser" and enters it in box 2703. Preferably, the job teaser includes a short description of the job. In a preferred embodiment, this job teaser will be disclosed to members who are seeking jobs to perform, as described above with reference to member find jobs page 1900 (FIG. 19A). Additionally, the client classifies the job into a job category, such as naming, logo concepts, ad banners, copy, marketing concepts, taglines/slogans or general. The appropriate job category may be selected in box 2704 using a pull-down menu, as known to one skilled in the art. In a preferred embodiment, the client may be permitted to define its own job categories, and need not necessarily use the default job categories provided by the exchange (e.g. naming, logo concepts, etc.). These categories may then be selected from box 2704 as described above.

The client also provides a more detailed description of the job in box 2705. Here, the client may describe the goals of the job or provide any special instructions. Also, the client may use box 2706 to attach any files necessary for performance of the job. Link 2707 navigates the client to client job scheduling page 2720, shown in FIG. 27B.

Figure 27C:
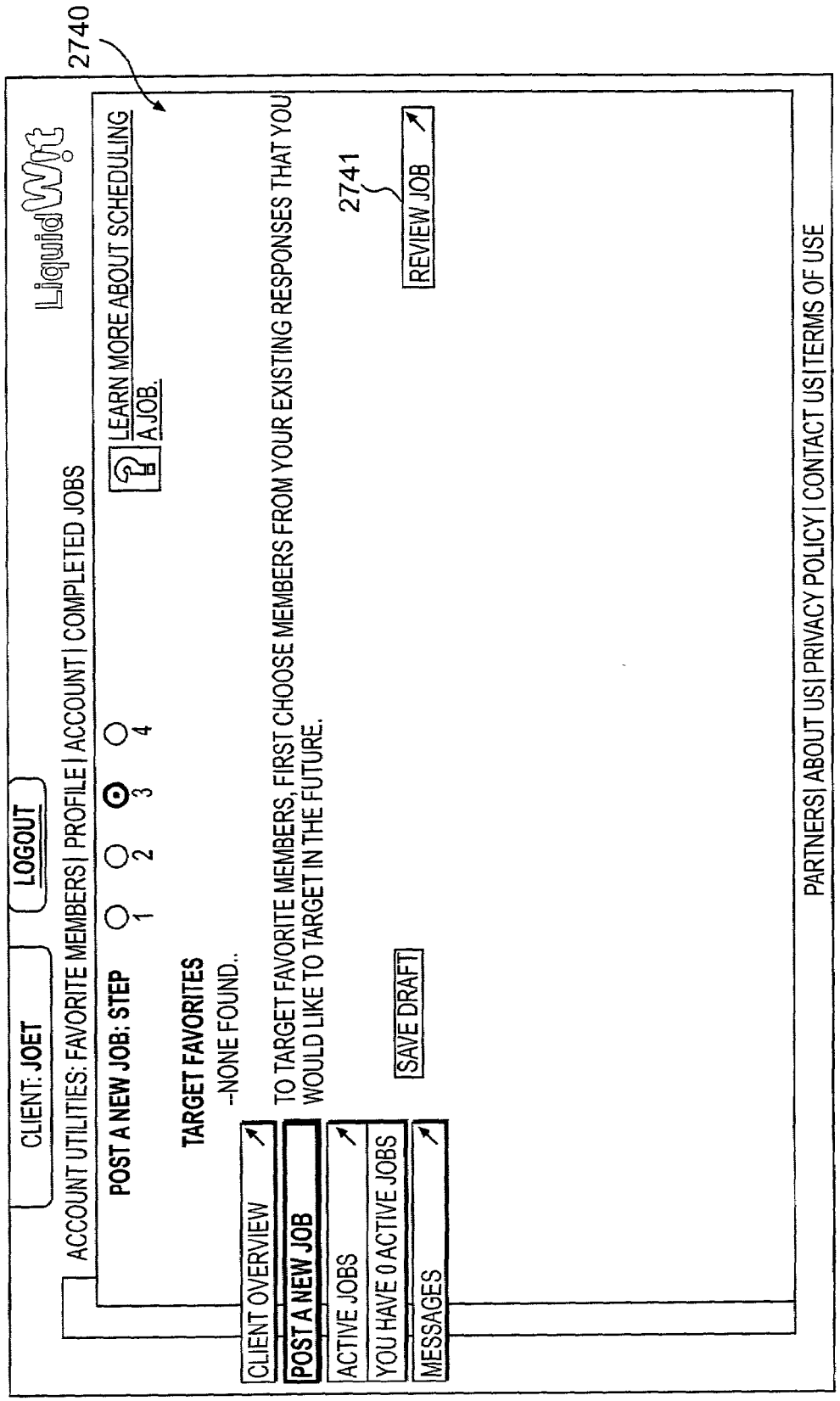
FIG. 27C depicts one embodiment of a client favorites targeting page for an exchange of the present invention.

Client job scheduling page 2720 preferably allows the client to select options regarding timing, number of responses (quota), suggested time, and reward for each response. Conventional pull-down menus may be used for selection of the desired value for each option. Box 2721 allows the client to select the number of responses desired for the particular job. Box 2722 allows the client to select the deadline for receipt of responses. Box 2723 allows the client to suggest a particular amount of time that the client believes that a member should spend on the assignment. Box 2724 allows the client to select the amount of reward to be paid for each response. Link 2725 navigates the client to client favorites targeting page 2740, shown in FIG. 27C.

Figure 27D:
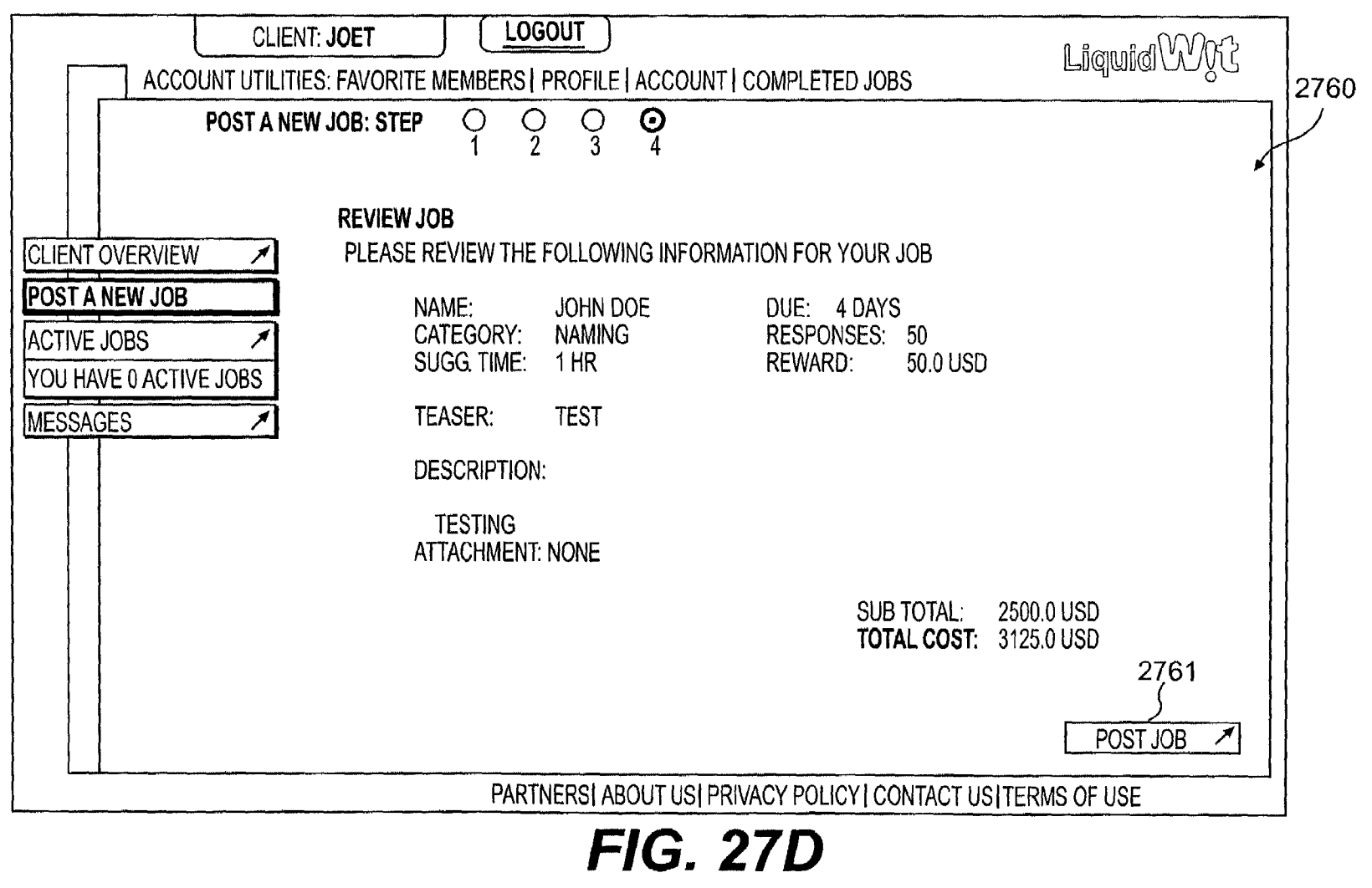

Client favorites targeting page 2740 allows the client to identify certain favorite members and target them for receipt of a particular job request. Thus, the client may believe that a particular favorite member is skilled in providing logo concepts, and may target that member when he/she posts a logo concepts job. By targeting a certain member, the client is indicating a desire that the exchange disclose the job to that member. As described above, being targeted for a job request may affect the member's reputation rating. Link 2741 navigates the client to client review job page 2760, shown in FIG. 27D. In a preferred embodiment, the client may also target members that have not been designated as "favorites."

Client review job page 2760 provides a review of certain information regarding the job created by the client. If the client is satisfied, link 2761 may be used to complete the job creation and submission process. Preferably, once a client selects link 2761, the job will be listed on client active jobs page 2800 (FIG. 28), and the process of disclosure of the job request or "capsules" to the members will begin.

Once a job has been posted and the job request or capsule disclosure process has begun, it is likely that some clients will want to change the original job posting in some way, or cancel it before the posted deadline. This may occur after some members have already accepted the job as originally posted. In a preferred embodiment, the client is permitted to modify or cancel a job. However, a member who has accepted the job may still be permitted to perform the job under the original terms.

Figure 28:
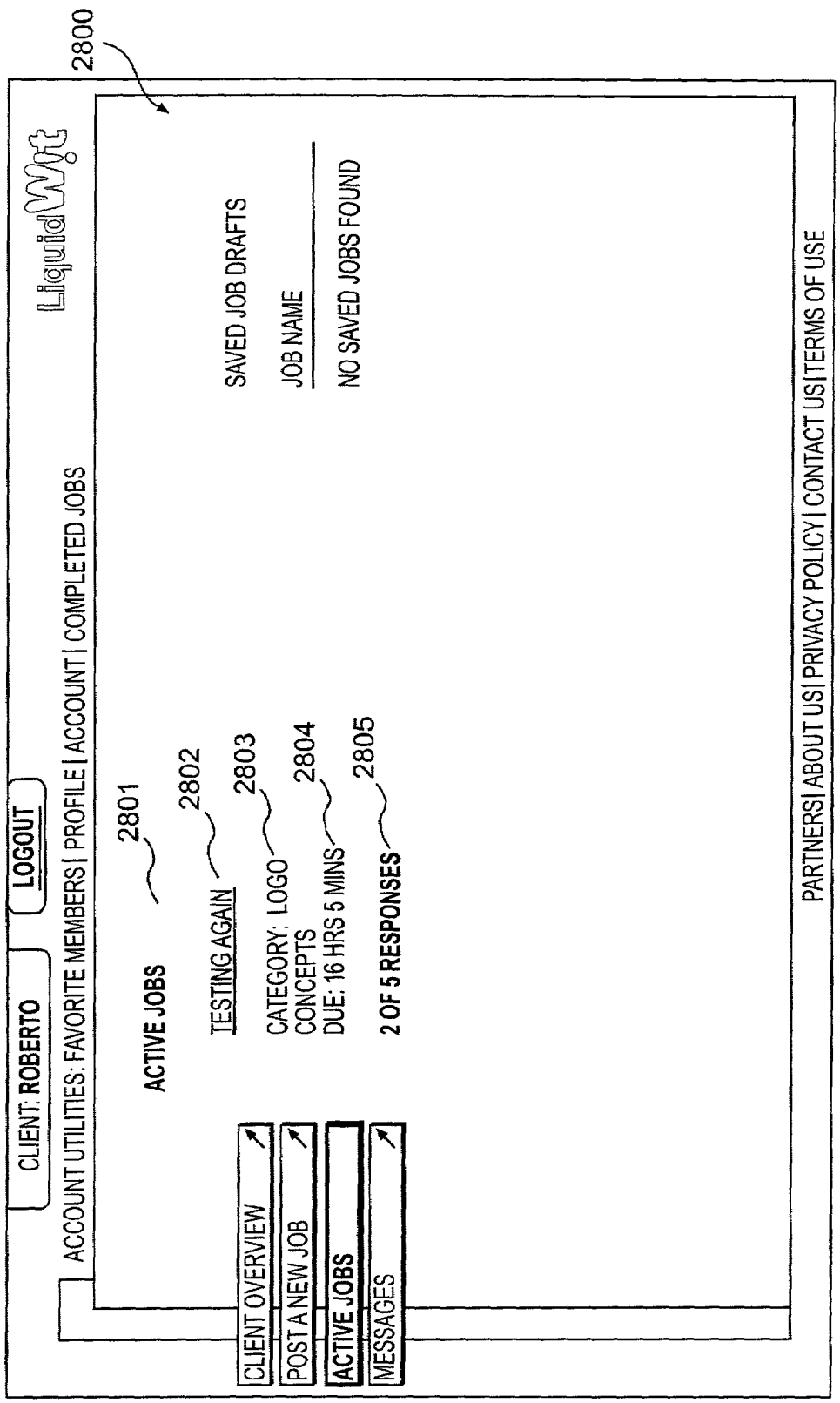
FIG. 28 depicts one embodiment of a client active jobs page for an exchange of the present invention.

Client active jobs page 2800, shown in FIG. 28, contains an active jobs list 2801. Active jobs list 2801 includes information about active jobs such the job name 2802, the category 2803, the time remaining before the due time 2804, and the number of responses received 2805.

Figure 29:
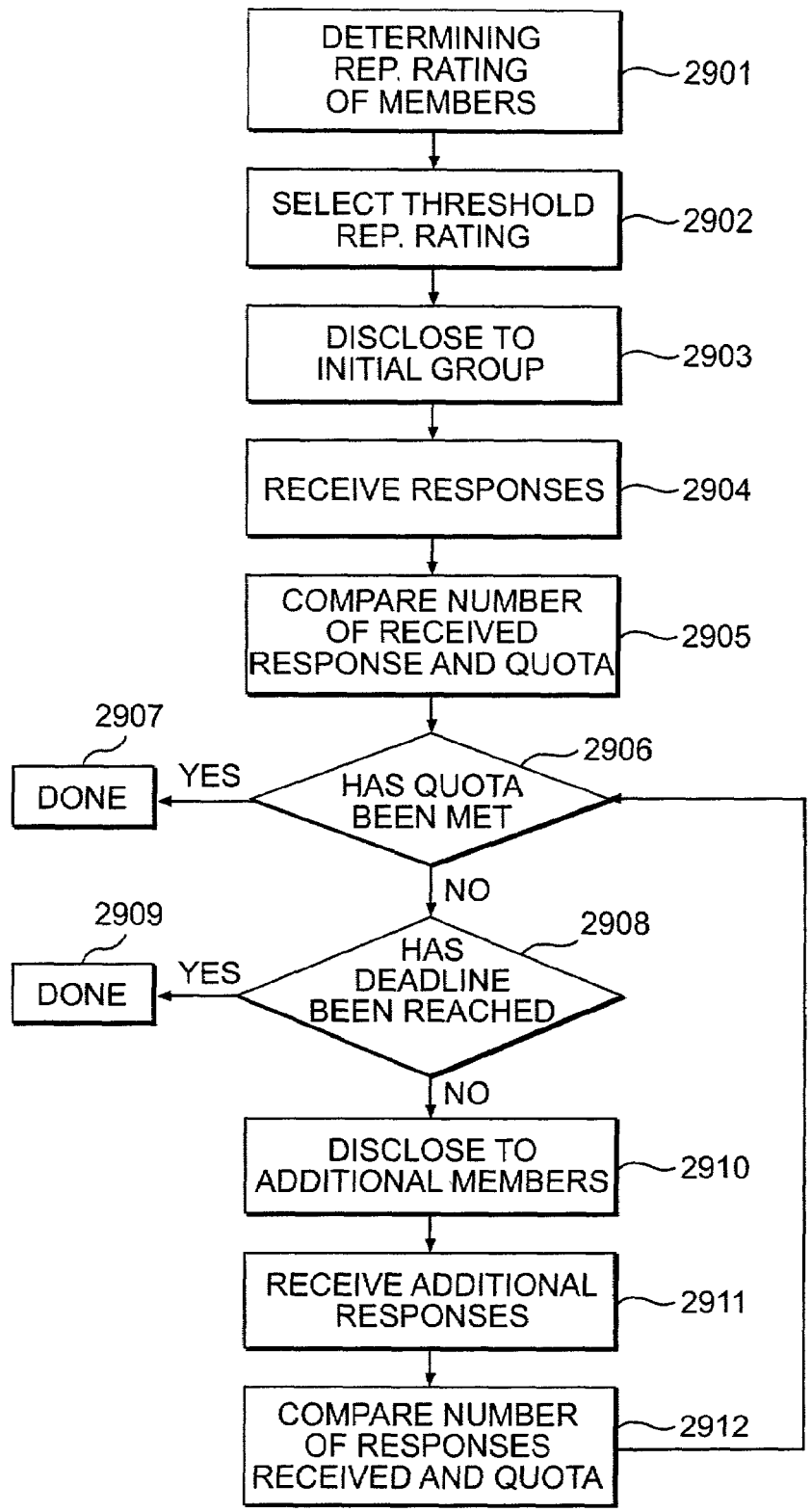
FIG. 29 depicts one embodiment of a staged disclosure process for an exchange of the present invention.

FIG. 29 illustrates a preferred embodiment of a staged disclosure process of the present invention. In this embodiment, a job request submitted to the exchange is disclosed to members in stages. Such a job request may be submitted to the exchange by a client in the manner described above with respect to FIGS. 27A–D. However, the present invention is not limited to job requests submitted in this manner, and may be applied to job requests submitted in any manner as would be apparent to one skilled in the art.

Once the job request that is to undergo staged disclosure is identified, the disclosure process may begin. In this preferred embodiment, the order in which the job request is disclosed to members is based, in part, on member reputation rating or ranking. Thus, an initial step 2901 in the staged disclosure process is determining the reputation rating of the members within the member community. The method for determining the reputation rating of members, as described in detail above, may be based on quality assessments from clients (client ratings) for previously performed jobs and/or on the past occurrence of reputation events. In a preferred embodiment, the reputation rating used to determine the order of disclosure is the category specific reputation rating associated with the category of work identified by the client in the job request.

Having determined the reputation ratings of the members, an initial group of members may be selected. It is to this group that the job request is initially disclosed. In this preferred embodiment, the initial disclosure group is selected on the basis of a threshold reputation rating. The job request will be disclosed to those members with a reputation rating at or above an identified threshold. The job request will not be disclosed to those members with a reputation rating below the threshold. Thus, the second step in the process, step 2902, is the selection of a threshold reputation rating. As would be apparent to one skilled in the art, because the initial group contains members with a reputation rating above a certain threshold, the mean reputation rating of this initial group will exceed the mean reputation rating of the member population as a whole.

A number of factors may be utilized in selecting the reputation rating threshold. These factors include the level of compensation offered by the client, the quota or number of responses desired by the client, the amount of time between the initial posting of the job and the deadline, and the time of day and/or day of week of the initial posting and the deadline. Thus, it is desirable for the client to provide information regarding these factors. Preferably, the reputation rating threshold that is selected will balance two competing interests: 1) the delivery of the number of responses desired by the client prior to the deadline, and 2) maintaining the highest possible quality of responses by ensuring that responses are given by highly rated members.

One preferred way in which these interests may be balanced is to use predictive models, which may be based on empirical data developed through practice of this invention, to estimate an appropriate reputation rating threshold. In order to do so, several functional relationships are important. First, it is desirable to obtain an estimation of the probability that a member with a given reputation rating will accept a job for a given level of compensation. This functional relationship may be represented as:

$$\text{Acceptance Probability Rate} = f(\text{reputation rating, price}).$$

Figure 30A:
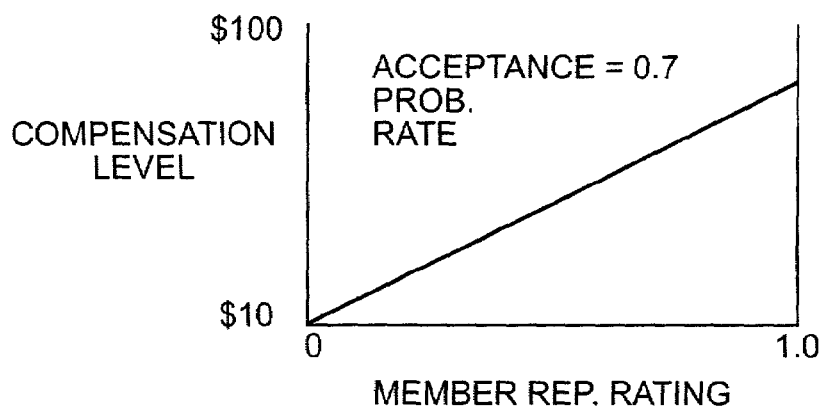
FIG. 30A depicts a graphical representation of an example acceptance probability rate function, based on member reputation rating and price.

FIG. 30A is a graphical representation of an example functional relationship between compensation level and member reputation rating for a given acceptance probability rate (0.7, in this case). This chart could be extrapolated for additional acceptance probability rates to create a three-dimensional graph that would represent the overall functional relationship between acceptance probability rate and reputation rating/price in a given context. As would be readily apparent to one skilled in the art, this particular chart is an example only, and this functional relationship will vary with the context in which the invention is implemented.

In addition to the acceptance probability rate, it is desirable to know the member "traffic rate" as a function of member reputation rating. The traffic rate is essentially the number of members that will encounter a job request at any given time. For example, this may be the number of members that are logged on to the exchange. Member traffic rate may be determined empirically, based on actual usage of the present invention. This functional relationship may be represented as $$\text{Traffic Rate} = f(\text{time, reputation rating}).$$

Figure 30B:
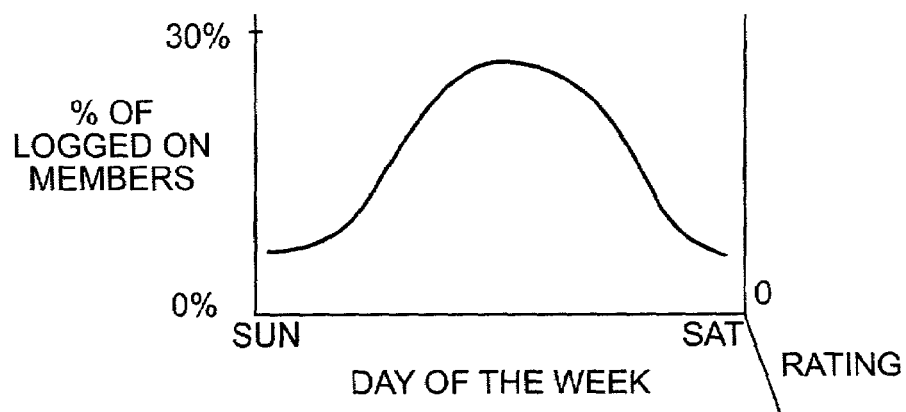
FIG. 30B depicts a graphical representation of an example traffic rate function based on the day of the week and the reputation rating of the member.
Figure 30C:
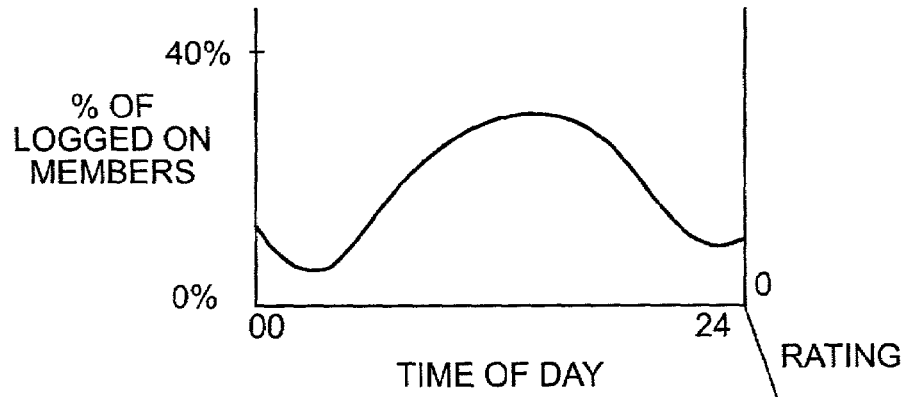
FIG. 30C depicts a graphical representation of an example traffic rate function based on the time of day and the reputation rating of the member.

Preferably, member traffic rate will be determined on a weekly and daily basis. Illustrative traffic rate charts are shown in FIGS. 30B and C, respectively.

By multiplying the probability of acceptance by the traffic rate over a given time period, a prediction may be made regarding the number responses one may expect to receive from members with each reputation rating. For example, it may be determined that there is a 25% probability that members with a 97% reputation rating will perform a particular job for $100, and that 40 such members will likely visit the site when the job request is disclosed. Additionally, it may be determined that there is a 50% probability that members with a 78% reputation rating will perform the same job for the same price, and that 100 such members will likely visit the site when the job request is disclosed. Thus, it may be predicted that 10 responses will be received from members with a 97% percent reputation rating, and that 50 responses will be received from members with a 78% reputation rating. This calculation may be repeated for all reputation rating levels as necessary.

Using the acceptance probability rate and member traffic data, an appropriate reputation rating threshold may be selected. Thus, the reputation rating threshold may be determined such that the predicted number of responses equals the quota.

Once the reputation rating threshold is determined, the next step, step 2903, is the disclosure of the job request or "capsule" to those members with a reputation rating above the threshold. For example, the job request may be posted to members in a manner similar to that described with respect to FIG. 19A above.

After the job requests are disclosed to the members, the members have the option to accept and perform the job described in the job request. As members perform the job, the responses are submitted to the exchange. Thus, the next step in the process, step 2904, is receiving the responses submitted by the members.

At some point prior to the client's deadline, a comparison, step 2905, will be made of the number of responses actually received and the number of responses required to meet the quota. Alternatively, the number of responses received may be compared with the number of responses predicted by the acceptance probability rate. The next step in the process depends upon the result of this comparison step. Thus, in box 2906, a determination is made regarding whether the quota has been met. If the number of responses received meets or exceeds the quota, the process is complete, step 2907. If the number of responses received falls short of the quota, the process continues. If the process continues, the next step, 2908, is a determination of whether the deadline has been reached. If the deadline has been reached, the process is complete, 2909. If the deadline has not been reached, an additional disclosure, step 2910, may be made. Thus, a revised (lower) reputation rating threshold may be determined in a manner similar to that described above with respect to the initial reputation rating threshold. Because the initial group of members contained the most highly rated members, the additional disclosure will be made to members with lesser reputation rating. The degree to which the threshold must be lowered will depend on the difference between the quota and the number of responses received. If the number of responses received is only a few less than the quota, the job will only be disclosed to a few more members. If, on the other hand, the number of responses is well below the quota, the job may be disclosed to a larger number of members.

After the additional disclosure is made, step 2911 is the receipt of responses submitted by members from either the initial group, or from the additional group. Once again, at some point after the additional disclosure, a comparison, step 2912, may be made between the actual number of responses received and the quota. If the number of responses received still falls short of the quota and the deadline has not been reached, step 2910, in which the job request disclosed to additional members, may be repeated. This time the disclosure will be made to even lower rated members. This cycle of disclosure to additional members, receipt of responses, and comparison of the responses received to the quota may continue until either the quota is satisfied, or the deadline is reached.

In the above-described preferred embodiment, the reputation rating threshold is lowered if the number of responses received is less than the quota. Alternatively, the comparison step may reveal that the number of responses received is actually greater than the quota. In such a circumstance, the reputation rating threshold for responses may be increased. Thus, the job request may be "taken away" from those lowest ranked members of the group who had accepted the job request but not yet completed it. This would effectively result in an upward adjustment of the threshold. However, in a preferred embodiment, the reputation rating threshold would not be upwardly adjusted, even if the number of responses received exceeded the quota. Thus, the job request would not be taken from these lowest rated members.

Furthermore, in a preferred embodiment, the due-time or due date that is given to the member may be prior to the actual deadline of the client. This is particularly desirable at the beginning of the disclosure process. By providing these members with a due-time that is prior to the actual client deadline, the exchange service will receive constant "capsule delivery" or job response, and can more accurately assess the rate at which additional disclosures must be made. For example, in making the comparison between the number of responses received and the quota, the exchange service may consider not only the number of responses actually received, but also the number of accepted but not yet delivered responses, so long as the due time has not passed. Similarly, if a member accepts the job, and has not delivered a response prior to the due time set by the exchange service, the exchange service may consider that a non-response when determining whether to disclose the job to additional members.

Any of the above preferred embodiments could be carried out using a private network, such as an intranet, rather than a public network. Such an implementation would be particularly desirable in the context of a large organization with numerous offices in various locations. The present invention could also be carried out using a intranet system that linked two or more organizations, such as organizations involved in a joint venture or other common enterprise. As would be readily apparent to one skilled in the art, the client and member pages described above could be adapted for use on a private network. Similarly, the member reputation rating and staged disclosure embodiments of the present invention could also be readily implemented in an intranet environment.

The intellectual capital exchange described above creates a free market of intellectual capital, where compensation level, quality of responding members, and work time find a point of common value for all constituents involved in the exchange system. The client sets the work time and the compensation level for a given job. The exchange system determines the quality of responders by exposing the job to the member community according to their reputation, such as by staged disclosure, as described above. The free market occurs because each of the capsules (of fixed price and work time) is accepted by the members at a point where they see that it is sufficiently rewarding for them. This will correlate to a particular level of reputation rating. In this fashion, the exchange can accurately value and trade intellectual capital. By tracking and mapping the points at which members of particular rankings accept capsules regarding various types of jobs, the exchange can recommend a price range for that specific job type.

Thus, when a client posts a new job, the exchange can recommend a price range for that job based on past data collected regarding similar jobs. The upper end of the range will reflect the amount that highly rated members would likely demand to complete the job; the lower end will reflect the amount that a low-rated member would accept. For example, if previously collected data shows that a highly-rated member would likely write a tagline for $43 or more, but a lower-rated member would be willing to complete the project for $7, a price range of $7–$43 may be suggested. The client may choose a price somewhere in that range, but will understand that a higher price will likely bring in responses from more highly rated members.

In a preferred embodiment, the exchange is designed and structured in such a way that data cannot be deleted from the exchange. This includes all data transmitted through the exchange. For example, member and client identification information is unique and once created cannot be deleted. Similarly, member job submission and even partial job submission data cannot be deleted. Thus, if a client is partially through a job posting and for some reason has to log out of the exchange or loses the connection, what has been submitted thus far, is automatically filed under the client active jobs page (FIG. 22), where it would appear as a "draft." The client can then return to the specific "draft" at any time and continue posting the job. This feature may be useful for operational assurance of system integrity for clients and members, and particularly system integrity for mapping of exchange transactions, which is described in more detail below.

The types of data stored by the exchange include, but are not limited to, information such as:

specific user login times and behaviors
who posted what job, when and under what time frames, what price, who responded and how, in what behavior pattern (saved as draft, or immediately responded, in what time to work on job)
how many responses from which areas
follow ups
targets
drafts
date and time stamps on everything
blocked and favorite members
reputations and associated data needed to generate it
job exposure engine and patterns associated with job exposure
general exchange utilization times and the extent of such utilization
where users come from geographically
times spent in the exchange and on what pages Data may be aggregated from these logs and used in the mapping of exchange transactions, as described below.

In a preferred embodiment, the exchange includes a "project feedback" feature. This feature enables a client to access the exchange and record the final output from all the intellectual capital received from members relating to a series of related jobs, such as jobs associated with a specific project or initiative.

In order to access the project feedback feature, the client would enter the exchange and would select a link, such as "project feedback" link 2211 (FIG. 22), which navigates the client to a "project feedback" page (not shown). There, the client would be presented with a list of internal reference names related to projects posted by the client, from which the client selects a particular project. The client would then be prompted to enter specific information about the project, relating to the outcome/output of the contributed intellectual capital, which may include but not be limited to a new product or service, a market opportunity, a new design, a new direction for a business, new processes and procedures, revenue generated, cost savings, new business areas, and the like. The client can then post the feedback. Preferably, the exchange will then send to all members who contributed to the particular project, for their review, the information entered by the client. The project can then be archived so that it is available for other members and clients to review as necessary.

In this fashion, the intellectual capital contributed may be correlated with the output from the contribution. This then allows for the correlation between internal knowledge maps and the financial results, thus enabling a true market value to be placed on the intellectual capital within an organization.

In another preferred embodiment of the present invention, "social network" and "knowledge network" maps may be generated from the data collected by the exchange. This embodiment may be particularly well suited for use within a large organization, where the exchange is implemented using an intranet. However this analysis is applicable to any type of deployment of the exchange, public or private.

Figure 31:
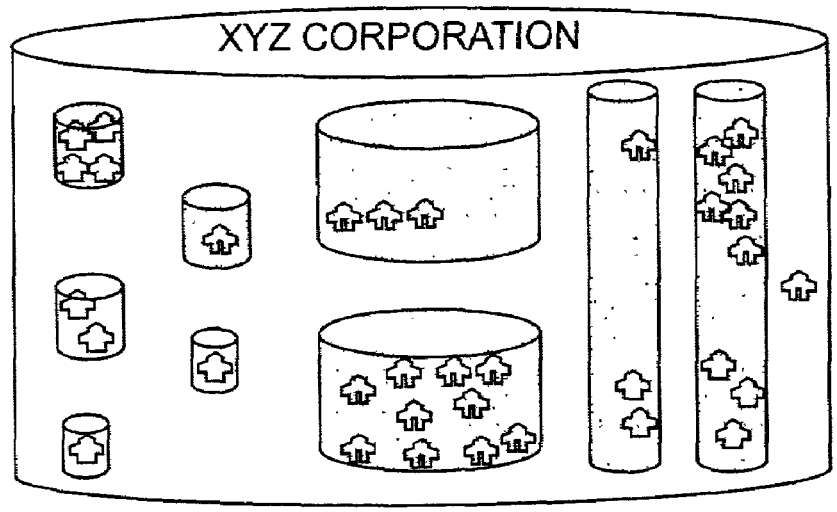
FIG. 31 depicts a graphical representation of an example organizational structure of a company.

Social and knowledge network mapping may be illustrated by the following example of the XYZ Corporation ("XYZ Corp."), a hypothetical large multi-national company. First, XYZ Corp. provides information about its organizational structure. This information may be obtained explicitly from the organization itself, or from the information gathered in the exchange when clients and members log on. FIG. 31 represents the organizational structure of XYZ Corp., where each cylinder may represent a team, division, geographic location, business unit, skill set, function or other specifically defined structure within the business. Once the base information is obtained, such data can be manipulated to create many different representations of the company's organizational structure. These representations form the basis of the social network and knowledge network maps.

Figure 32:
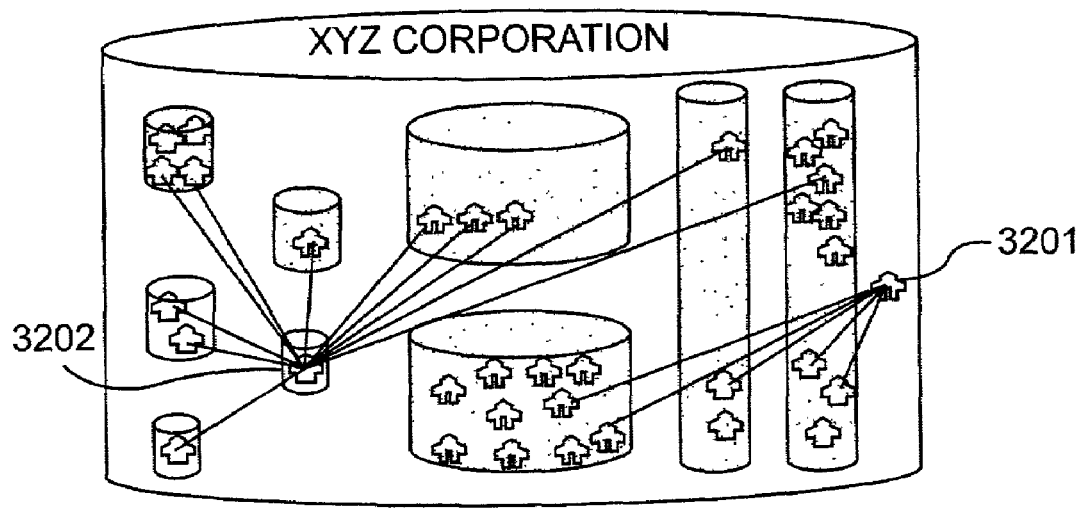
FIG. 32 depicts a graphical representation of an example social network map.

An example social network map is illustrated in FIG. 32. This map is generated based on data gathered from client and member activity on the exchange. In particular, this map indicates particular members who are "connectors." As described above, connectors are those members of an organization who may not be able to provide a response to a particular job themselves, but who are able to identify members within the organization who are able to provide such responses. In this example, members 3201 and 3202 are "connectors," responsible for connecting many people across divisions of the organization and are key conduits for information. Furthermore, individual reports can be produced for individual members and clients to show them how they have connected with the exchange and across the exchange. In a preferred embodiment, the social network map may serve as a strategic management tool and also an employee retention and motivational tool. For example, individuals identified as connectors may receive recognition in the form of additional compensation.

Figure 33:
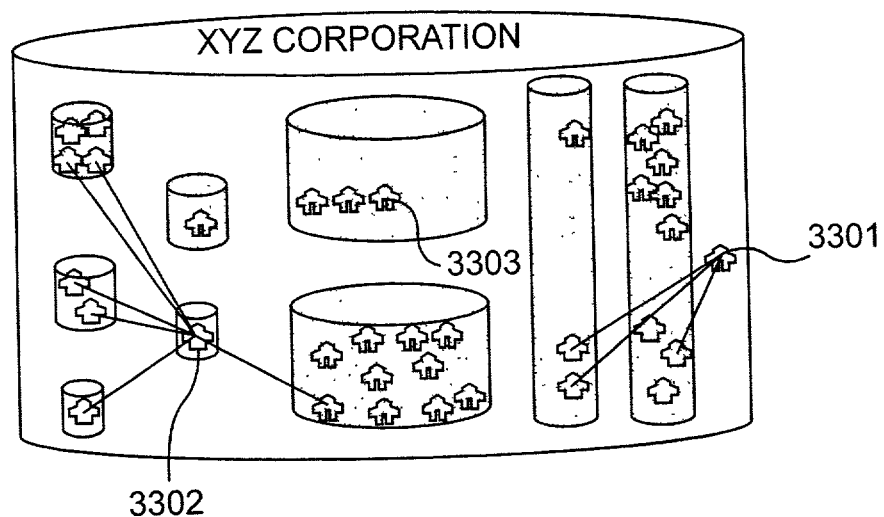
FIG. 33 depicts a graphical representation of an example knowledge network map.

An example knowledge network map is illustrated in FIG. 33. As with the social network map, this map is generated based on data gathered from client and member activity on the exchange. The knowledge network map traces the flow of intellectual capital throughout the organization. In this particular example, members 3301, 3302 and 3303 are primarily responsible for a high level of knowledge contributed. These members would also likely have the highest reputation ratings. Individual reports can be produced for individual members and clients to show them how they have contributed their intellectual capital over the exchange. Once again, those members identified as contributing a high level of intellectual capital may receive recognition within the organization.

Figure 34:
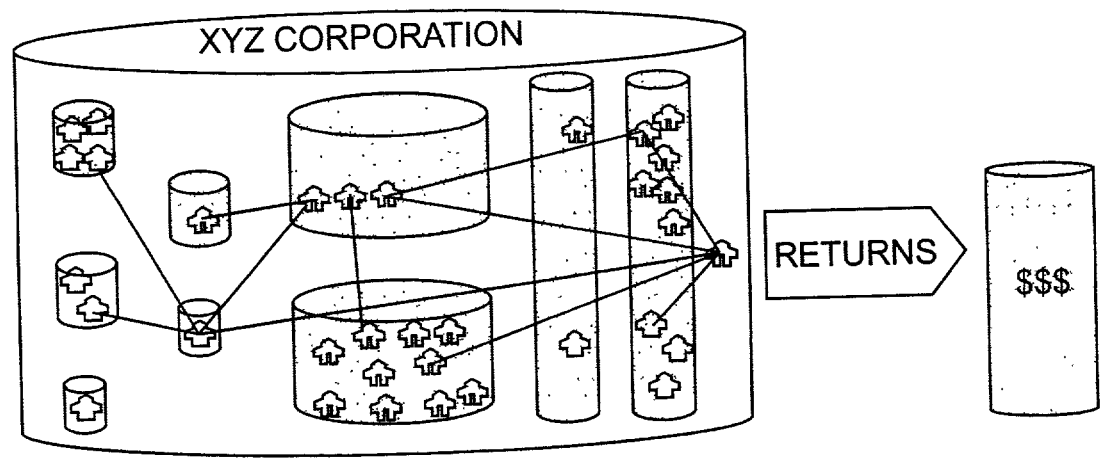
FIG. 34 depicts a graphical representation of a combined social network, knowledge network, and project feedback map.

In combination, social network maps, knowledge network maps and the project feedback processes provide a network of connections and knowledge that may be shown to directly relate to some form of output or to some specific source of revenue for the organization. This combination is represented in FIG. 34. For example, correlation can be drawn between the day to day activities of the organization, the time spent on the exchange of the present invention, including the projects and initiatives on which work was done, and finally a correlation to organizational output. This may enable the organization to place a value on its intellectual capital as a corporate asset. Such value could be placed, for example, on the corporation's balance sheet.

Although particular embodiments of the invention have been described and illustrated herein, it is recognized that modifications and variations may readily occur to those skilled in the art, and consequently it is intended that the claims be interpreted to cover such modifications and equivalents.

The invention claimed is:

1. A method for staged disclosure of a job request, the job request comprising a quota that indicates the number of responses to be received and a deadline for receipt of the responses, the method comprising:
   determining a reputation rating for each of a plurality of service providers; disclosing the job request to a group of service providers, wherein the reputation rating of each of the service providers in the group is higher than a threshold;
   receiving a response to the job request from at least one service provider within the group;
   prior to the deadline, comparing a number of responses received with the quota;
   if the number of responses received is lower than the quota, disclosing the job request to service providers outside the group, wherein the disclosing is carried out in order of decreasing reputation rating.

2. The method of claim 1, further comprising:
   repeating the step of disclosing the job request to service providers outside the group in order of decreasing reputation rating until either the number of responses received equals the quota or until the deadline is reached.

3. The method of claim 1, further comprising:
   repeating the step of disclosing the job request to service providers outside the group in order of decreasing reputation rating until the number of responses received equals the quota.

4. The method of claim 1, further comprising:
   repeating the step of disclosing the job request to service providers outside the group in order of decreasing reputation rating until the deadline is reached.

5. The method of claim 1, wherein the threshold is determined
   as a function of one or more factors comprising,
   the quota,
   an amount of time between disclosing the job request to the group and the deadline,
   a time of day and a day of week of disclosing the job request to the group,
   a time of day and a day of week of the deadline,
   a quantity of compensation to be paid to the service provider for each response received from the service provider, and
   a quantity of service providers having each reputation rating.

6. The method of claim 1, wherein the job request relates to providing intellectual capital.

7. The method of claim 1, wherein the job request relates to providing marketing services.

8. The method of claim 1, wherein the disclosing steps are carried out using a computer network.

9. The method of claim 8, wherein said computer network is a public network.

10. The method of claim 8, wherein said computer network is a private network.

11. The method of claim 1, wherein the determining step is carried out using a quality assessment made by a client.

12. The method of claim 11, wherein the determining step comprises:
    assigning a numeric value for an occurrence of a reputation event.

13. The method of claim 12, wherein the reputation event comprises at least one of,
    designating the service provider as a preferred provider by a client,
    designating the service provider as an unacceptable provider by a client,
    requesting the service provider to perform a particular job,
    refusing to compensate the service provider for services performed, and
    failing to perform a service after accepting a job.

14. The method of claim 1, wherein the determining step comprises:
    assigning a numeric value for an occurrence of a reputation event.

15. The method of claim 14, wherein the reputation event comprises at least one of,
    designating the service provider as a preferred provider by a client,
    designating the service provider as an unacceptable provider by a client,
    requesting the service provider to perform a particular job,
    refusing to compensate the service provider for services performed, and
    failing to perform a service after accepting a job.

16. A method for staged disclosure of a job request, the job request comprising a quota that indicates the number of responses to be received and a deadline for receipt of the responses, the method comprising:
    determining a reputation rating for each of a plurality of service providers;
    determining an acceptance probability rate as a function of service provider reputation rating, the acceptance probability rate indicating the likelihood that a service provider with a given reputation rating will provide a response to the job request;

selecting, based on the acceptance probability rate, a group of service providers of size sufficient to generate a number of responses equal to the quota by the deadline, wherein the group of service providers has the highest possible mean reputation rating;

disclosing the job request to the group;

receiving a response to the job request from at least one service provider within the group;

comparing a number of responses predicted by the acceptance probability rate with a number of responses received;

if the number of responses received is less than the number of responses predicted by the acceptance probability rate, disclosing the job request to service providers outside the group.

17. The method of claim 16, wherein the step of disclosing the job request to service providers outside the group is carried out in order of decreasing reputation rating.

18. The method of claim 17, further comprising:

repeating the step of disclosing the job request to service providers outside the group in order of decreasing reputation rating until either the number of responses received equals the quota or the deadline is reached.

19. The method of claim 17, further comprising:

repeating the step of disclosing the job request to service providers outside the group in order of decreasing reputation rating until the number of responses received equals the quota.

20. The method of claim 17, further comprising:

repeating the step of disclosing the job request to service providers outside the group in order of decreasing reputation rating until the deadline is reached.

21. The method of claim 16, wherein the job request relates to providing intellectual capital.

22. The method of claim 16, wherein the job request relates to providing marketing services.

23. The method of claim 16, wherein the disclosing steps are carried out using a computer network.

24. The method of claim 23, wherein the computer network is a public network.

25. The method of claim 23, wherein the computer network is a private network.

26. The method of claim 16, wherein the step of determining the reputation rating is carried out using a quality assessment made by a client.

27. The method of claim 26, wherein the step of determining the reputation rating comprises:

assigning a numeric value for an occurrence of a reputation event.

28. The method of claim 27, wherein the reputation event comprises at least one of, designating the service provider as a preferred provider by a client, designating the service provider as an unacceptable provider by a client, requesting the service provider to perform a particular job, refusing to compensate the service provider for services performed, and failing to perform a service after accepting a job.

29. The method of claim 16, wherein the step of determining the reputation rating comprises:

assigning a numeric value for an occurrence of a reputation event.

30. The method of claim 29, wherein the reputation event comprises at least one of, designating the service provider as a preferred provider by a client, designating the service provider as an unacceptable provider by a client, requesting the service provider to perform a particular job, refusing to compensate the service provider for services performed, and failing to perform a service after accepting a job.

31. A method for rating service providers, comprising:

receiving a numerical rating from a client for a service performed by a service provider;

determining an occurrence of a reputation event, wherein the reputation event is selected from the group comprising, designating the service provider as a preferred provider by a client, designating the service provider as an unacceptable provider by a client, requesting the service provider to perform a particular job, refusing to compensate the service provider for services performed, and failing to perform a service after accepting a job, assigning a numerical value for the occurrence of each of the reputation events, calculating a reputation rating (RR) for the service provider based on the numerical rating and the numerical value.

wherein the calculating step is carried out using the following formula, $$RR = K*[SNR/NNR] + (1-K)*[N1*RE1 + N2*RE2 + \ldots + Nn*REn]$$ wherein, K is a constant between 0 and 1 inclusive, SNR is a sum of all numerical ratings from clients regarding services performed by the service provider, NNR is a total number of numerical ratings from clients regarding services performed by the service provider, Nn is the number of occurrences of a given reputation event, REn is the numerical value assigned for the occurrence of a given reputation event.

32. A method for rating service providers, comprising:

receiving a numerical rating from a client for a service performed by a service provider;

determining an occurrence of a reputation event, wherein the reputation event is selected from the group comprising, designating the service provider as a preferred provider by a client, designating the service provider as an unacceptable provider by a client, requesting the service provider to perform a particular job, refusing to compensate the service provider for services performed, and failing to perform a service after accepting a job, assigning a numerical value for the occurrence of each of the reputation events, calculating a reputation rating (RR) for the service provider based on the numerical rating and the numerical value, wherein the calculating step is carried out using the following formula, $$RR = K*[SNR + N1*RE1 + N2*RE2 + \ldots + Nn*RNn]$$

wherein,

K is a constant

SNR is a sum of all numerical ratings from clients regarding services performed by the service provider, Nn is the number of occurrences of a given reputation event, REn is the numerical value assigned for the occurrence of a given reputation event.

33. The method of claim 32, wherein the calculating step is carried out for each of a plurality of service categories.

34. The method of claim 32, wherein the calculating step is carried out using the numerical values associated with services performed in more than one service category.

35. The method of claim 32, wherein the reputation event is selected from the group further comprising:
    forwarding a job request to another person.

36. A method for facilitating the buying and selling of services, comprising:
    receiving a job request from a client, the job request comprising a description of a service to be performed and a deadline;
    receiving from the client a quota indicating a number of responses to be provided for the job request;
    selecting a group of service providers, wherein a number of service providers in the group is determined as a function of the number of service providers to whom the job request must be disclosed so that a number of responses received from the service providers equals the quota;
    disclosing the job request to the group;
    receiving a response to the job request from at least one service provider within the group;
    prior to the deadline, comparing a number of responses received and the quota;
    adjusting, based on the comparison of the number of responses received and the quota, the number of service providers in the group.

37. A method for facilitating the buying and selling of services, comprising:
    receiving a job request from a client, the job request comprising a description of a service to be performed and a deadline;
    receiving from the client a quota indicating a number of responses to be provided for the job request;
    determining a reputation rating for each of a plurality of service providers;
    selecting a first group of service providers from the plurality of service providers, wherein a mean reputation rating of the first group is higher than a mean reputation rating of the plurality of service providers;
    disclosing the job request to service providers within the first group;
    receiving a response to the job request from at least one service provider within the first group;
    prior to the deadline, comparing a number of responses received and the quota;
    if the number of responses received is less than the quota, disclosing the job request to a second group of service providers, wherein a mean reputation rating of the second group is less than the mean reputation rating of the first group.

38. The method of claim 37, further comprising:
    repeating the step of disclosing the job request to the second group, wherein the mean reputation rating of the second group is successively lowered, until either the number of responses received equals the quota or the deadline is reached.

39. The method of claim 37, further comprising:
    repeating the step of disclosing the job request to the second group, wherein the mean reputation rating of the second group is successively lowered, until the number of responses received equals the quota.

40. The method of claim 37, further comprising:
    repeating the step of disclosing the job request to the second group, wherein the mean reputation rating of the second group is successively lowered, until the deadline is reached.

41. The method of claim 37, wherein the first group of service providers is selected as a function of one or more factors comprising,
    the quota,
    an amount time between disclosing the job request and the deadline,
    a time of day and a day of week of the disclosure of the job request to the first group of service providers,
    a time of day and a day of week of the deadline,
    a quantity of compensation to be paid to the service provider for each response received from the service provider, and
    a quantity of service providers having each reputation rating.

42. The method of claim 37, wherein the determining step is carried out using a quality assessment made by a client.

43. The method of claim 42, wherein the determining step comprises:
    assigning a numeric value for an occurrence of a reputation event.

44. The method of claim 43, wherein the reputation event comprises at least one of
    designating the service provider as a preferred provider by a client,
    designating the service provider as a unacceptable provider by a client,
    requesting the service provider to perform a particular job,
    refusing to compensate the service provider for services performed, and
    failing to perform a service after accepting a job.

45. The method of claim 37, wherein the determining step comprises:
    assigning a numeric value for an occurrence of a reputation event.

46. The method of claim 45, wherein the reputation event comprises at least one of
    designating the service provider as a preferred provider by a client,
    designating the service provider as a unacceptable provider by a client,
    requesting the service provider to perform a particular job,
    refusing to compensate the service provider for services performed, and
    failing to perform a service after accepting a job.

47. The method of claim 37, wherein the job request relates to providing intellectual capital.

48. The method of claim 37, wherein the job request relates to providing marketing services.

49. The method of claim 37, wherein the disclosing steps are carried out using a computer network.

50. The method of claim 49, wherein the computer network is a public network.

51. The method of claim 50, wherein the computer network is a private network.

52. The method of claim 37, further comprising:
receiving a second job request from the client wherein the second job request identifies a service provider to perform the service;
disclosing the second job request to the identified service provider.

53. The method of claim 37, wherein the job request is not shown to a particular service provider as specified by the client.

54. The method of claim 37, further comprising:
assigning the job request to a category;
wherein the step of selecting the first group of service providers is carried out using a category reputation rating associated with the category, wherein the service providers have a plurality of category reputation ratings, and the category reputation ratings are determined based on services performed in each category.

55. The method of claim 37, wherein the job request further comprises a quantity of compensation to be paid to the service provider for each response received from the service provider.

56. The method of claim 37, further comprising:
suggesting a quantity of compensation to be paid to the service provider for each response responsive to the job request, the quota, and the reputation rating.

57. The method of claim 37, wherein the job request identifies a service provider to perform the service; and wherein the job request is disclosed to the service provider.

58. The method of claim 37, wherein a service provider within the first group of service providers forwards the job request to another person.

59. A method for facilitating the buying and selling of services, comprising:
receiving a plurality of job requests from a plurality of clients, each job request comprising a description of a service to be performed and a deadline;
receiving from each client a quota indicating a number of responses to be provided for the job request;
determining a reputation rating for each of a plurality of service providers;
for each job request, selecting a first group of service providers from the plurality of service providers, wherein a mean reputation rating of the first group is higher than a mean reputation rating of the plurality of service providers;
disclosing capsules describing the job request to the service providers within the first group, whereby service providers may accept the capsule, indicating an intention to provide a response to the job request;
receiving capsule deliveries comprising responses to the job request from the service providers who accepted the capsules;
prior to the deadline, comparing a number of capsules delivered and the quota;
if the number of capsules delivered is less than the quota, disclosing capsules describing the job request to a second group of service providers, wherein a mean reputation rating of the second group is less than the mean reputation rating of the first group.

60. The method of claim 59, further comprising:
repeating the step of disclosing capsules describing the job request to the second group, wherein the mean reputation rating of the second group is successively lowered, until either the number of capsules delivered equals the quota or the deadline is reached.

61. The method of claim 59, further comprising:
repeating the step of disclosing capsules describing the job request to the second group, wherein the mean reputation rating of the second group is successively lowered, until the number of capsules delivered equals the quota.

62. The method of claim 59, further comprising:
repeating the step of disclosing capsules describing the job request to the second group, wherein the mean reputation rating of the second group is successively lowered, until the deadline is reached.

63. The method of claim 59, further comprising:
disclosing, with the capsule, a due-time to the service providers, indicating a time at which the capsule must be delivered, the due-time is at the same time or prior to the deadline.

64. The method of claim 59, wherein the comparing step is modified by adding the number of accepted but not yet delivered capsules to the number of capsules delivered, so long as the due-time has not passed for the accepted but not yet delivered capsules.

65. The method of claim 59 wherein the service provider may accept a plurality of capsules from a plurality of job requests.

66. The method of claim 65, wherein the service provider may not accept a capsule when a number of job requests for which capsules have been accepted but not yet delivered by the service provider exceeds a predetermined capsule limit number.

67. The method of claim 66, wherein the predetermined capsule limit number is a fixed number for all service providers.

68. The method of claim 66, wherein the predetermined capsule limit number is a function of a total number of capsules disclosed but not accepted;
repeating the step of disclosing capsules describing the job request to the second group, wherein the mean reputation rating of the second group is successively lowered, until either the number of capsules delivered equals the quota or the deadline is reached.

69. The method of claim 66, wherein the predetermined capsule limit number is a function of the average time lapse between capsule acceptance and capsule delivery for the service provider.

70. The method of claim 59, further comprising:
receiving a job request modification from a client;
canceling unaccepted capsules;
disclosing modified capsules describing the modified job request to the service providers to whom the capsules were disclosed.

* * * * *